United States Patent
Kim et al.

(10) Patent No.: US 10,397,643 B2
(45) Date of Patent: Aug. 27, 2019

(54) ELECTRONIC DEVICE FOR IDENTIFYING PERIPHERAL APPARATUS AND METHOD THEREOF

(71) Applicant: Samsung Electronics Co., Ltd., Suwon-si, Gyeonggi-do (KR)

(72) Inventors: Yong-ho Kim, Seoul (KR); Joon-ho Son, Suwon-si (KR); Young-ah Seong, Seoul (KR); Chul-ho Han, Seoul (KR); Han-ki Kim, Suwon-si (KR); Byeong-geun Cheon, Anyang-si (KR); Gi-ppeum Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 14/942,283

(22) Filed: Nov. 16, 2015

(65) Prior Publication Data
US 2016/0142763 A1    May 19, 2016

(51) Int. Cl.
| | |
|---|---|
| H04N 21/43 | (2011.01) |
| H04N 21/436 | (2011.01) |
| H04N 21/41 | (2011.01) |
| H04N 21/422 | (2011.01) |
| H04L 12/64 | (2006.01) |
| H04L 12/24 | (2006.01) |
| H04N 21/4223 | (2011.01) |

(52) U.S. Cl.
CPC ... *H04N 21/43615* (2013.01); *H04L 12/6418* (2013.01); *H04L 41/0853* (2013.01); *H04N 21/4131* (2013.01); *H04N 21/42202* (2013.01); *H04L 41/0813* (2013.01); *H04N 21/4126* (2013.01); *H04N 21/4223* (2013.01)

(58) Field of Classification Search
CPC ............ H04N 21/4126; H04N 21/4223; H04L 41/0813; H04L 12/6418; H04L 41/0853
See application file for complete search history.

(56) References Cited

U.S. PATENT DOCUMENTS

| | | | |
|---|---|---|---|
| 7,777,642 B2 | 8/2010 | Kim et al. | |
| 8,928,961 B2* | 1/2015 | Tanaka | H04N 1/484 358/482 |
| 9,870,123 B1* | 1/2018 | Pope | H05K 999/99 |

(Continued)

FOREIGN PATENT DOCUMENTS

| | | |
|---|---|---|
| KR | 10-0811701 B1 | 3/2008 |
| WO | 2012-118302 A2 | 9/2012 |

OTHER PUBLICATIONS

European Search Report dated Oct. 23, 2017, issued in the European Application No. 15860515.4-1905 / 3221768.

(Continued)

*Primary Examiner* — Henry Tsai
*Assistant Examiner* — Christopher A. Daley
(74) *Attorney, Agent, or Firm* — Jefferson IP Law, LLP

(57) ABSTRACT

A method performed at the electronic device for identifying an electronic device and peripheral apparatuses is provided. The method acquires image data regarding emitters of the peripheral apparatuses, determines emitting colors emitted from the emitters based on the acquired image data, and acquires identification information of the peripheral apparatuses mapped with the emitting colors.

24 Claims, 55 Drawing Sheets

(56) References Cited

U.S. PATENT DOCUMENTS

| | | | |
|---|---|---|---|
| 2007/0019843 A1* | 1/2007 | Chou | G06K 9/00026 |
| | | | 382/124 |
| 2007/0096283 A1* | 5/2007 | Ljung | H04N 7/17318 |
| | | | 257/686 |
| 2008/0303643 A1 | 12/2008 | Ishida | |
| 2011/0069841 A1 | 3/2011 | Angeloff et al. | |
| 2012/0114137 A1 | 5/2012 | Tsurumi | |
| 2012/0173767 A1* | 7/2012 | Kim | G06F 9/4411 |
| | | | 710/11 |
| 2013/0324031 A1 | 12/2013 | Loureiro | |
| 2014/0056172 A1 | 2/2014 | Lee et al. | |
| 2014/0098076 A1* | 4/2014 | Yoon | H04N 21/4126 |
| | | | 345/204 |
| 2014/0118631 A1* | 5/2014 | Cho | G02B 27/017 |
| | | | 348/836 |
| 2014/0119734 A1 | 5/2014 | Lundgren et al. | |
| 2016/0020155 A1* | 1/2016 | Kim | G01R 31/2635 |
| | | | 438/16 |

OTHER PUBLICATIONS

European Search Report dated Feb. 12, 2018, issued in the European Application No. 15860515.4-1905 / 3221768.

* cited by examiner

FIG. 5
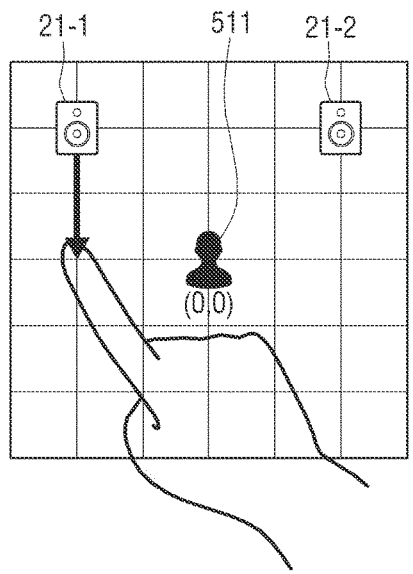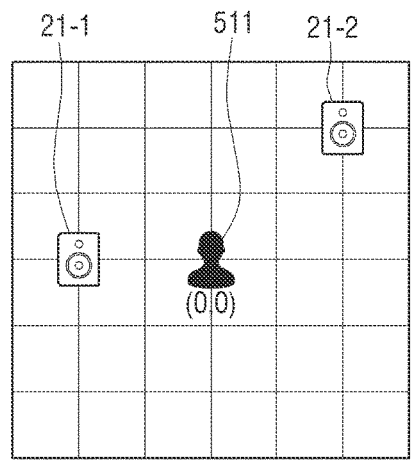

FIG. 9
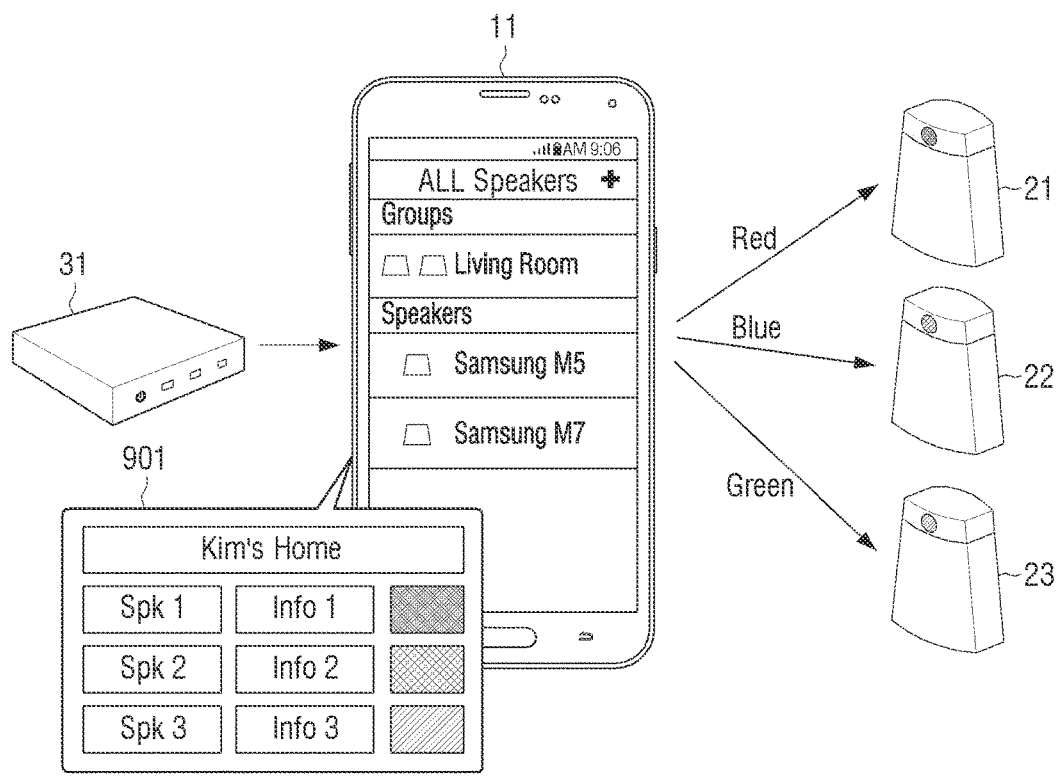
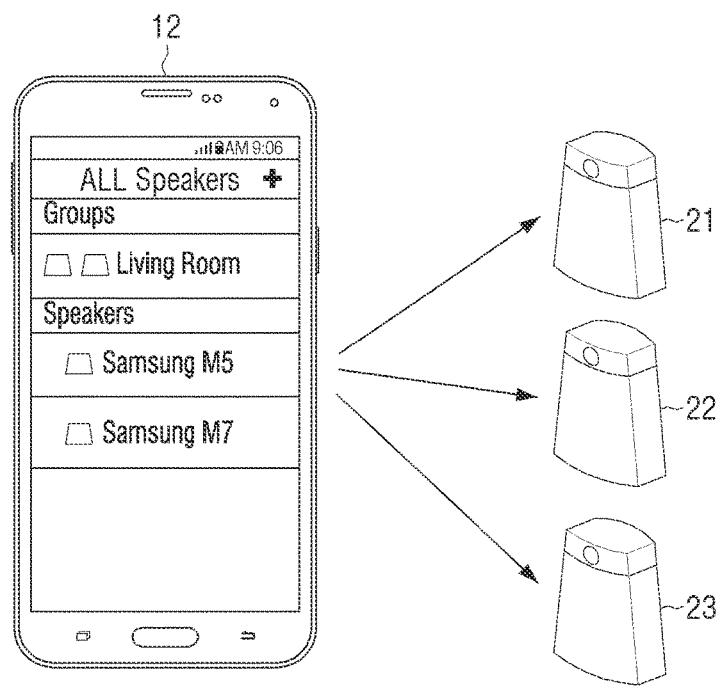

FIG. 12
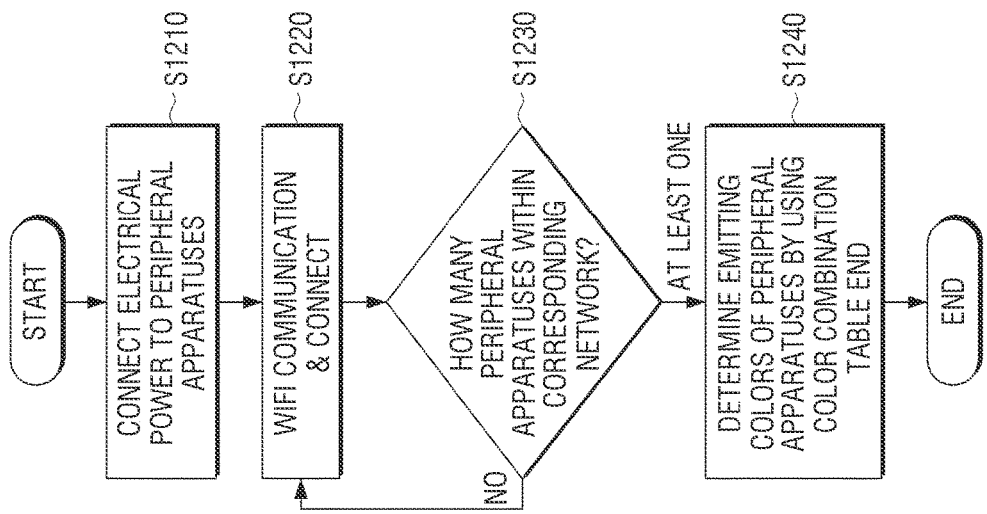
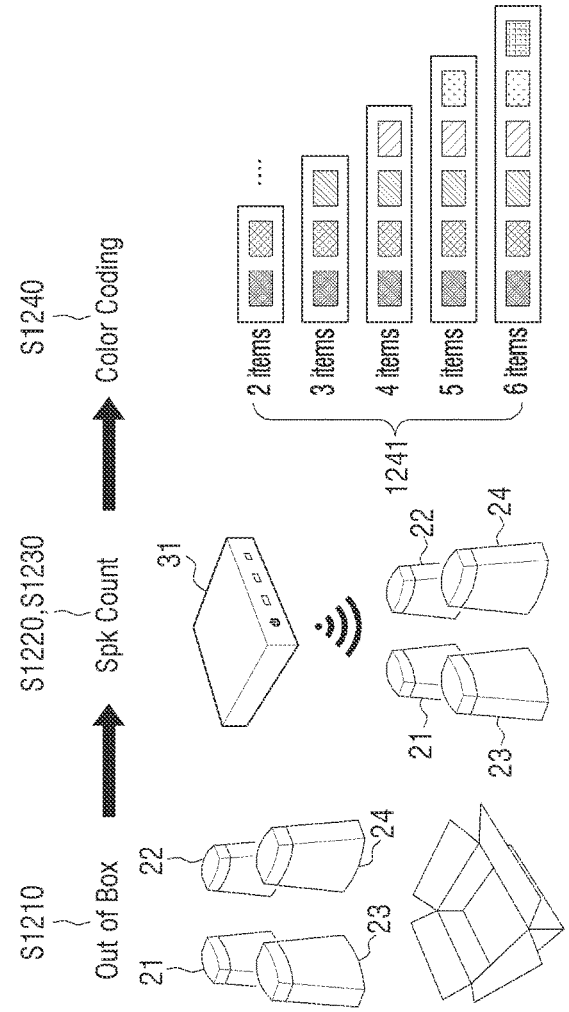

FIG. 14
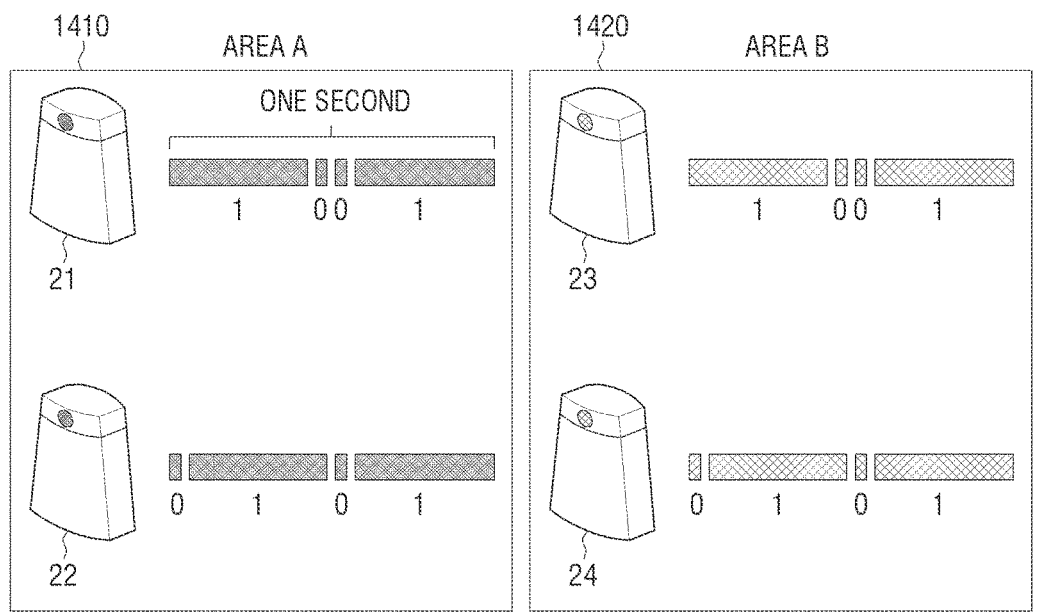
1430
Color + Blinking
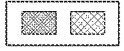 1431 — 2 items  + 1001/1001
 1432 — 3 items  + 1001/1101/1101
 1433 — 4 items  + 1110/1110/0011/0101
 1434 — 5 items  + 1111/0010/0101/0000/0111
 1435 — 6 items  + 1110/1110/1010/0001/1110/0111

FIG. 19
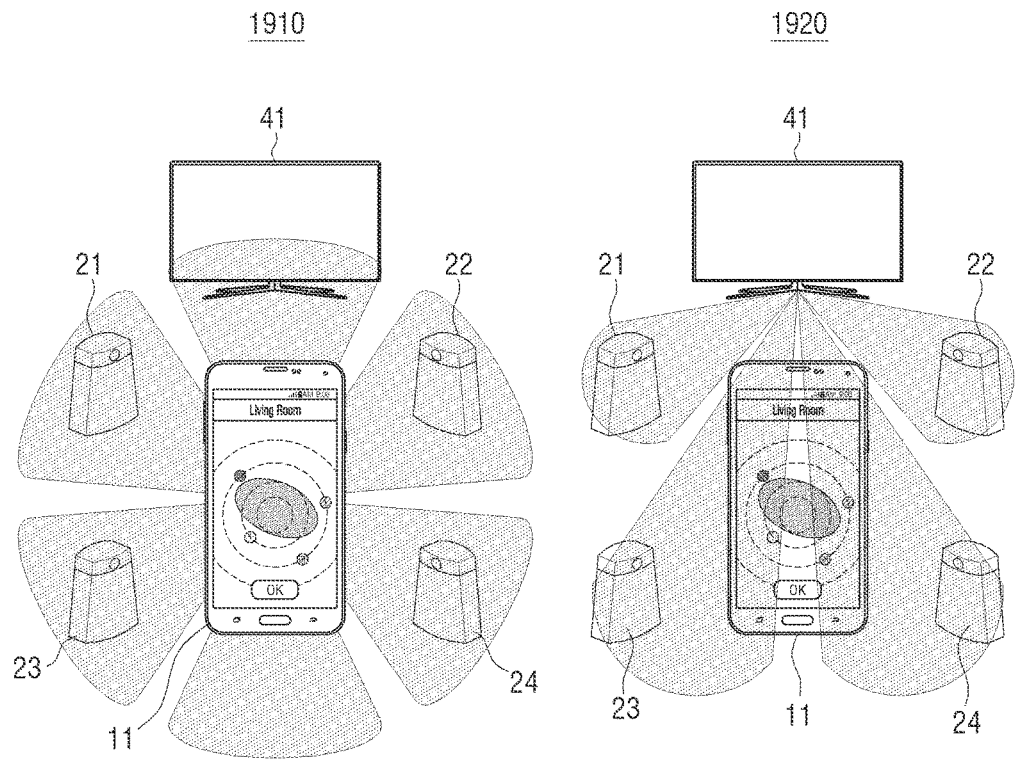
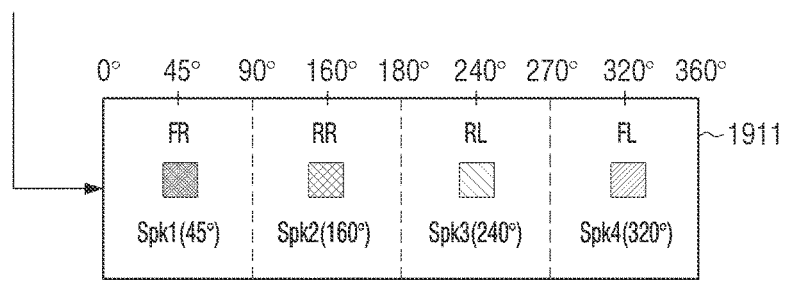

FIG. 24
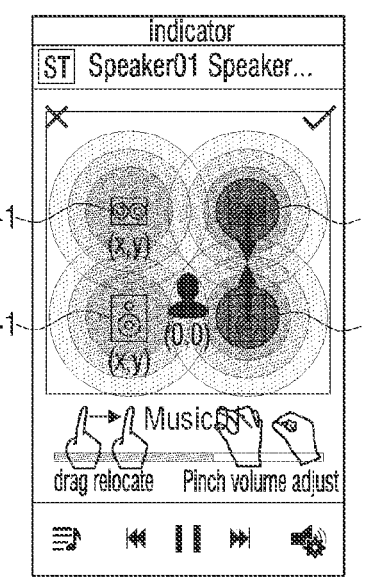
2410
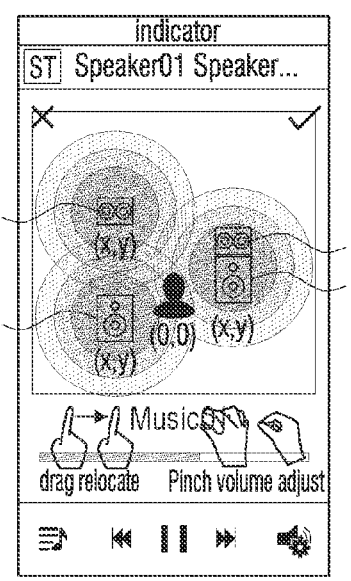
2420
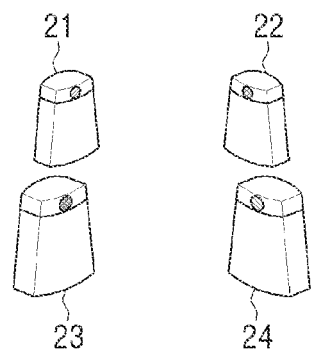
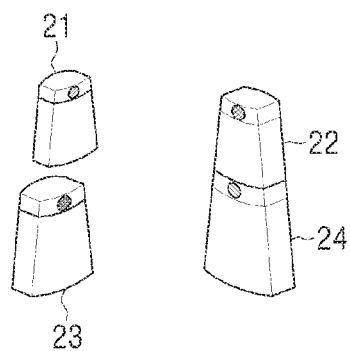

FIG. 27
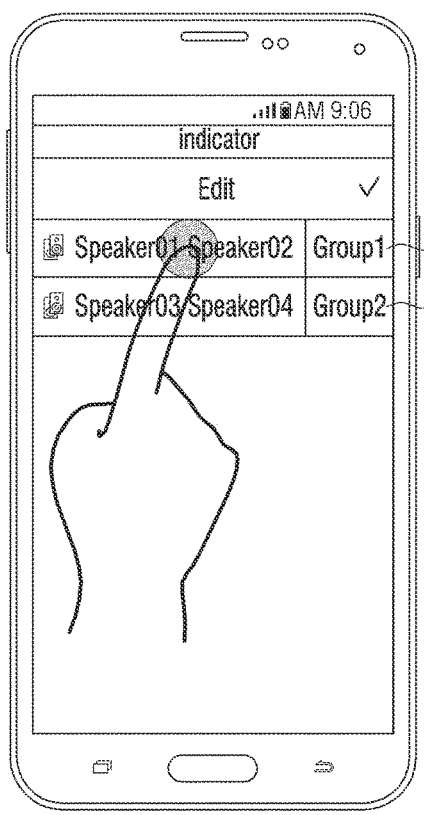
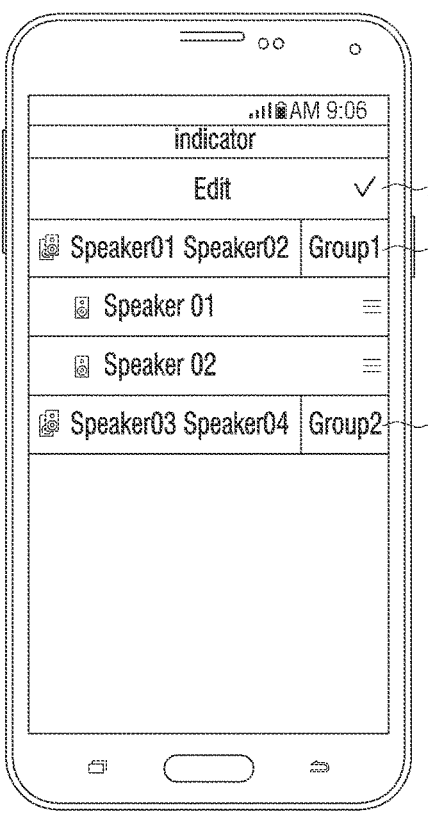
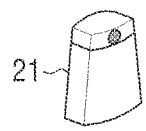 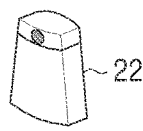
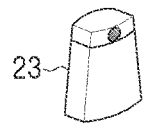 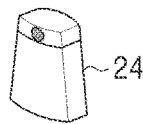
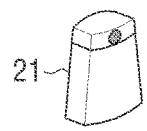 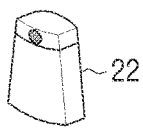
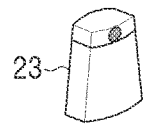 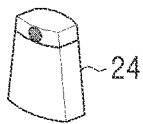

FIG. 34
3410           3420           3430
  
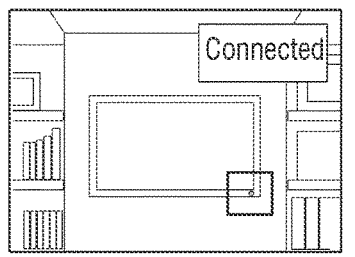 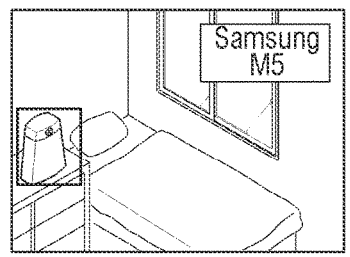 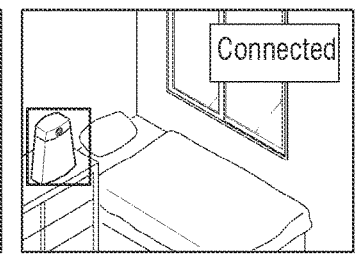

FIG. 36A
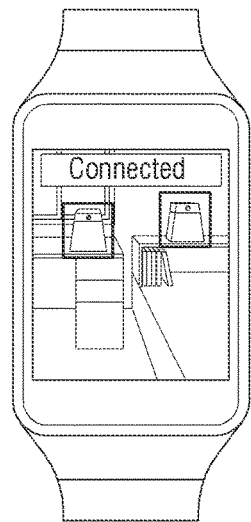
3610
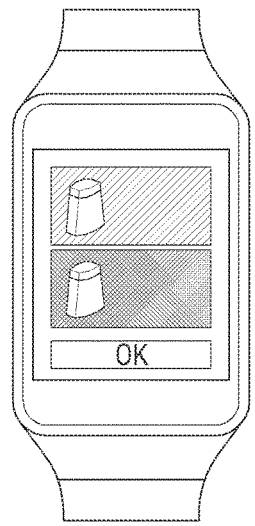
3620

FIG. 36B
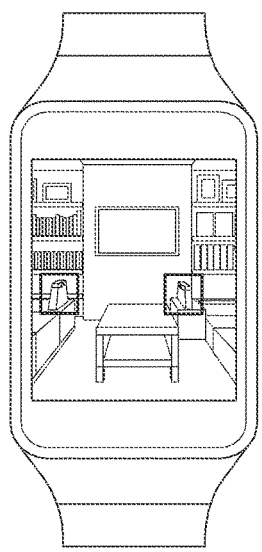
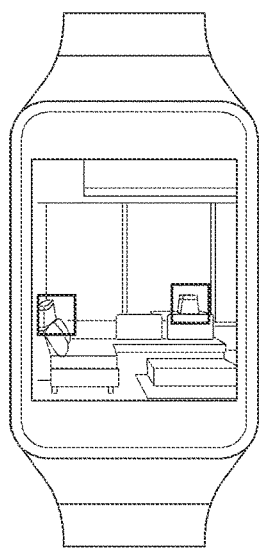
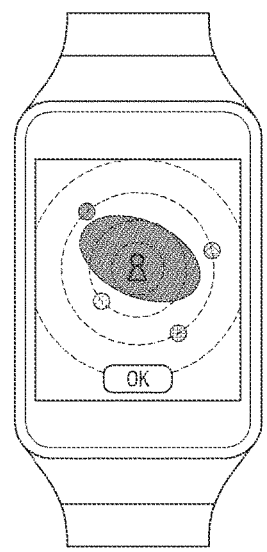

FIG. 37
3710 3720
 
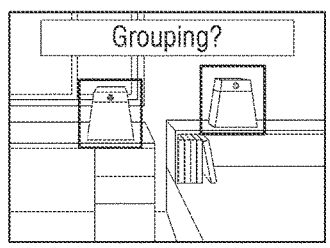 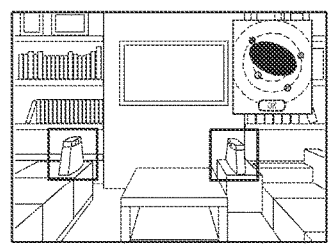

FIG. 38A
3810                3820
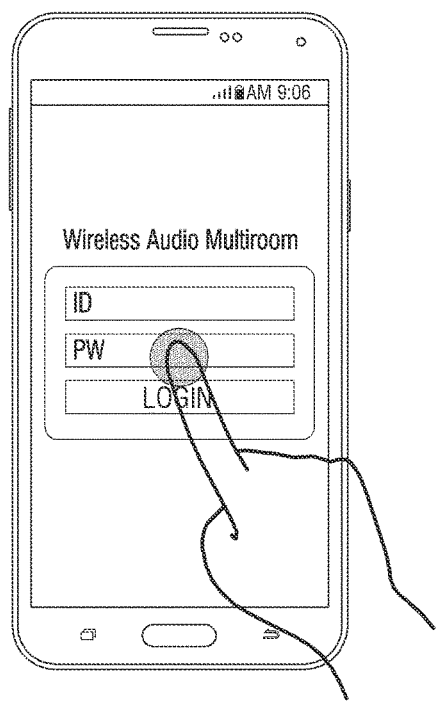
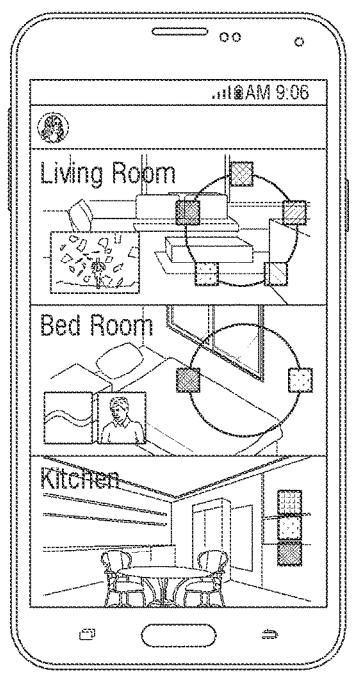

3850

FIG. 39B
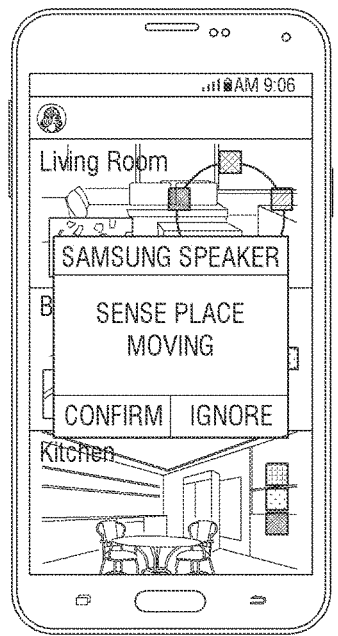 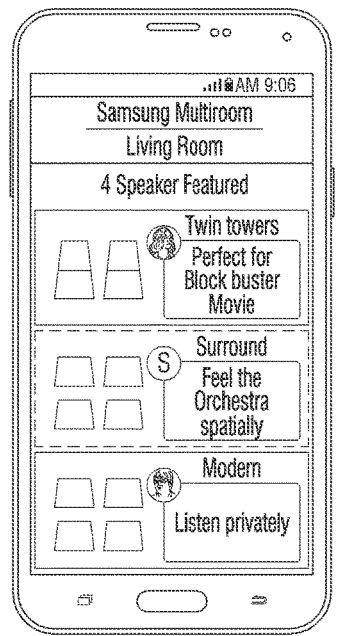

FIG. 39C
3950 3960
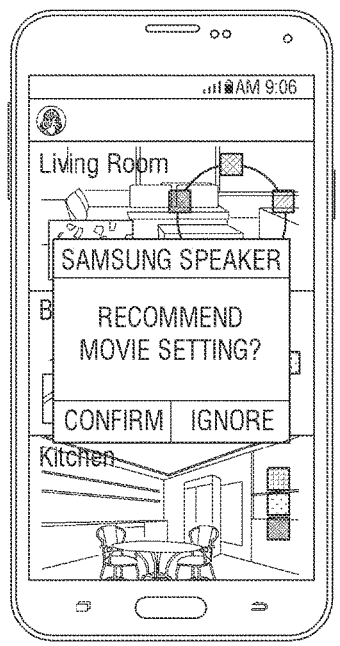 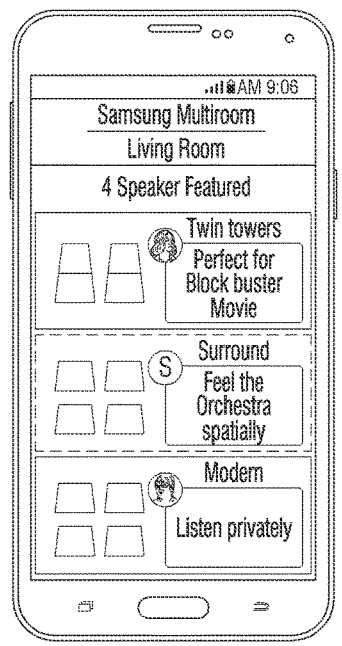

FIG. 39D
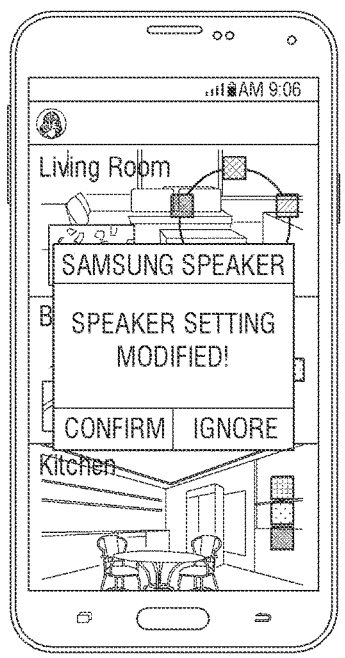
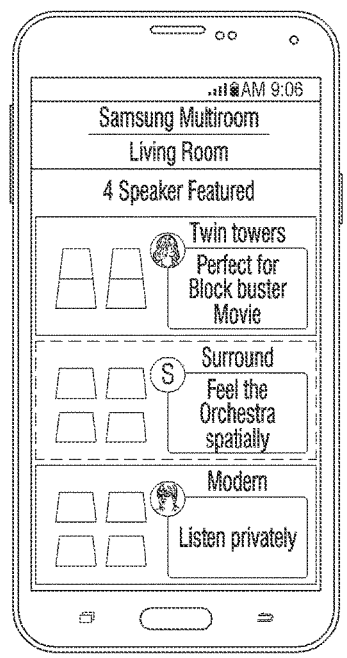

ELECTRONIC DEVICE FOR IDENTIFYING PERIPHERAL APPARATUS AND METHOD THEREOF

CROSS-REFERENCE TO RELATED APPLICATION(S)

This application claims the benefit under 35 U.S.C. § 119(a) of a Korean patent application filed on Nov. 17, 2014 in the Korean Intellectual Property Office and assigned Serial number 10-2014-0160249, the entire disclosure of which is hereby incorporated by reference.

TECHNICAL FIELD

The present disclosure relates to an electronic device for identifying peripheral apparatuses and a method thereof. More particularly, the present disclosure relates to a method for identifying peripheral apparatuses by using image data of photographed peripheral apparatuses.

BACKGROUND

Development of the wire and the wireless communication networks has enabled an electronic device and peripheral apparatuses to be connected with each other and transmit and receive various types of data there between. For example, a content controlling apparatus and a speaker for outputting the sounds of the content may be connected and transmit and send various types of data with each other.

The connecting between an electronic device and peripheral apparatuses may be performed one by one according to the wireless communication method (e.g., Bluetooth and Wi-Fi). Further, an electronic device and peripheral apparatuses may be connected to each other by using the wireless communication method through a hub including access point (AP). Such communication method may be proper for the environment such as wireless home theater or multi room speakers.

The connecting method between an electronic device and peripheral apparatuses are fast developing according to the performance enhancement of the inter-device communication technology. Further, the connecting method are widely developing so as to be applied to every type of the electronic device that can output a screen, such as portable computer such as laptop computer, net book, or tablet personal computer (PC), portable terminal such as Moving Picture Experts Group phase 1 or phase 2 (MPEG-1 or MPEG-2) audio layer 3 (MP3) player, smart phone or personal digital assistant (PDA), or television (TV).

The above information is presented as background information only to assist with an understanding of the present disclosure. No determination has been made, and no assertion is made, as to whether any of the above might be applicable as prior art with regard to the present disclosure.

SUMMARY

When an electronic device is connected to at least one or more peripheral apparatus, there may be a need to set the peripheral apparatus. For example, when a content controlling apparatus is connected to a plurality of speakers outputting sounds of a content, multi-channel setting and audio adjusting may be necessary for the plurality of speakers in order to set the sound listening environment proper for the user preference.

Specifically, as the number of peripheral apparatuses connected to the electronic device increases, and as the communication methods and the setting environment become diversified, the number of processes for setting peripheral apparatuses and the number of performing the setting may increase.

Aspects of the present disclosure are to address at least the above-mentioned problems and/or disadvantages and to provide at least the advantages described below. Accordingly, an aspect of the present disclosure is to provide a method with which a user can easily set peripheral apparatuses. Specifically, an aspect of the present disclosure is to provide a user with a method for easily setting peripheral apparatuses by using intuitive visual element.

In accordance with an aspect of the present disclosure, a method for identifying peripheral apparatuses performed at an electronic device is provided. The method includes acquiring image data regarding emitters of the peripheral apparatuses, determining emitting colors emitted from the emitters based on the acquired image data, and acquiring identification information of the peripheral apparatuses mapped with the determined emitting colors in order to identify the peripheral apparatuses.

The acquiring image data may include acquiring image data regarding the emitters of the peripheral apparatuses in response to a user input to photograph the emitters of the peripheral apparatuses.

The acquiring identification information of the peripheral apparatuses may include acquiring identification information of the peripheral apparatuses mapped with the determined emitting colors among the plurality of peripheral apparatuses in a state in which different emitting colors from each other are mapped respectively regarding the plurality of peripheral apparatuses.

The determining emitting colors may include determining blinking patterns emitted from the emitters based on the acquired image data, and the acquiring identification information of the peripheral apparatuses may include acquiring identification information of the peripheral apparatuses mapped with the emitting colors and with the blinking patterns.

The method may include determining adjustment values of the output data outputted from the peripheral apparatuses, and transmitting the determined adjustment values to at least one among the peripheral apparatuses, a hub that can communicate with the peripheral apparatuses, and a server which shares the determined adjustment values with a third party.

The method may include displaying representative information representing the peripheral apparatuses, and determining adjustment values of output data outputted from the peripheral apparatuses based on a user input to move the representative information.

The method may include determining adjustment values of the output data outputted from the peripheral apparatuses by considering positions of the emitters in the peripheral apparatuses included within the image data.

The method may include transmitting information regarding at least one of the emitting colors and blinking patterns to be mapped with the peripheral apparatuses to the peripheral apparatuses or to a hub connected to the peripheral apparatuses before the acquiring image data.

The method may additionally include displaying representative information representing the peripheral apparatuses, and transmitting a signal to control the emitters of the peripheral apparatuses to the peripheral apparatuses or to a hub that can communicate with the peripheral apparatuses in response to a user input to select the representative information.

The method may additionally include displaying notice information indicating that the peripheral apparatuses are perceived.

The adjustment values may be values to adjust at least one among a volume size and a delay time regarding the output data outputted from the peripheral apparatuses.

The identification information of the peripheral apparatuses may be at least one among an image, a model name, and an original identifier (ID) regarding the peripheral apparatuses.

In accordance with another aspect of the present disclosure, an electronic device for identifying peripheral apparatuses is provided. The electronic device includes an image acquirer configured to acquire image data regarding emitters of the peripheral apparatuses, and a controller configured to acquire identification information of the peripheral apparatuses mapped with emitting colors emitted from the emitters based on the image data acquired from the image acquirer.

The image acquirer may acquire image data regarding the emitters of the peripheral apparatuses in response to a user input to photograph the emitters of the peripheral apparatuses.

The controller may acquire identification information of the peripheral apparatuses mapped with the determined emitting colors among the plurality of peripheral apparatuses in a state in which different emitting colors from each other are mapped respectively regarding the plurality of peripheral apparatuses.

The controller may acquire identification information of the peripheral apparatuses mapped with the emitting colors and with the blinking patterns emitted from the emitters based on the acquired image data.

The controller may determine adjustment values of the output data outputted from the peripheral apparatuses, and the electronic device may further include a communicator configured to transmit the determined adjustment values to at least one among the peripheral apparatuses, a hub that can communicate with the peripheral apparatuses, and a server which shares the determined adjustment values with a third party.

The electronic device may further include a display configured to display representative information representing the peripheral apparatuses. The controller may determine adjustment values of the output data outputted from the peripheral apparatuses based on a user input to move the representative information on the display.

The controller may determine adjustment values of the output data outputted from the peripheral apparatuses by considering positions of the emitters in the peripheral apparatuses included within the image data.

The electronic device may further include a communicator configured to transmit information regarding at least one of the emitting colors and the blinking patterns to be mapped with the peripheral apparatuses to the peripheral apparatuses or the hub connected to the peripheral apparatuses before acquiring image data.

The electronic device may further include a display configured to display the representative information representing the peripheral apparatuses, and a communicator configured to transmit a signal to control the emitters of the peripheral apparatuses to the peripheral apparatuses or the hub that can communicate with the peripheral apparatuses in response to a user input to select the representative information.

The electronic device may further include a display configured to display notice information indicating that the peripheral apparatuses are perceived.

The adjustment values may be values to adjust at least one among the volume size and the delay time regarding the output data outputted from the peripheral apparatuses.

The identification information of the peripheral apparatuses may be at least one among an image, a model name and an original ID regarding the peripheral apparatuses.

According to the above various embodiments of the present disclosure, setting the peripheral apparatuses can be simplified and the utilization of the peripheral apparatuses can be enhanced.

Specifically, when there is a plurality of peripheral apparatuses, a user can intuitively and easily perform setting regarding the plurality of peripheral apparatuses (e.g., multi-channel setting of speakers).

Further, because different emitting colors or blinking patterns from each other are mapped respectively regarding the plurality of peripheral apparatuses, a user can divide and set the plurality of peripheral apparatuses more visually and intuitively.

The other effects that may be resulted or expected from the various embodiments are directly described or implied in the detailed description of the present disclosure. Accordingly, various effects anticipated from the various embodiments will be disclosed in the detailed description below.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4 and 5 are diagrams illustrating the overall process according to various embodiments of the present disclosure;

FIGS. 6, 7, 8, 9. 10, 11, and 12 are diagrams illustrating a process of providing emitting colors to peripheral apparatuses according to various embodiments of the present disclosure;

FIGS. 13 and 14 are diagrams illustrating a process in which emitters of the peripheral apparatuses emit the light according to various embodiments of the present disclosure;

FIGS. 19 and 20 are diagrams illustrating a process in which positions of the peripheral apparatuses are perceived according to various embodiments of the present disclosure;

FIGS. 22, 23, 24, 25, 26, 27, and 28 are diagrams illustrating a method for setting the perceived peripheral apparatuses according to various embodiments of the present disclosure;

FIGS. 32, 33, 34, 35A, 35B, 36A, 36B, and 37 are diagrams illustrating various examples in which a system is configured according to various embodiments of the present disclosure;

FIGS. 38A, 38B, 38C, and 38D are diagrams illustrating various examples of applying manual presetting according to various embodiments of the present disclosure;

FIGS. 39A, 39B, 39C, and 39D are diagrams illustrating various examples of applying automatic presetting according to various embodiments of the present disclosure;

Throughout the drawings, like reference numerals will be understood to refer to like parts, components, and structures.

DETAILED DESCRIPTION

Figure 1A:
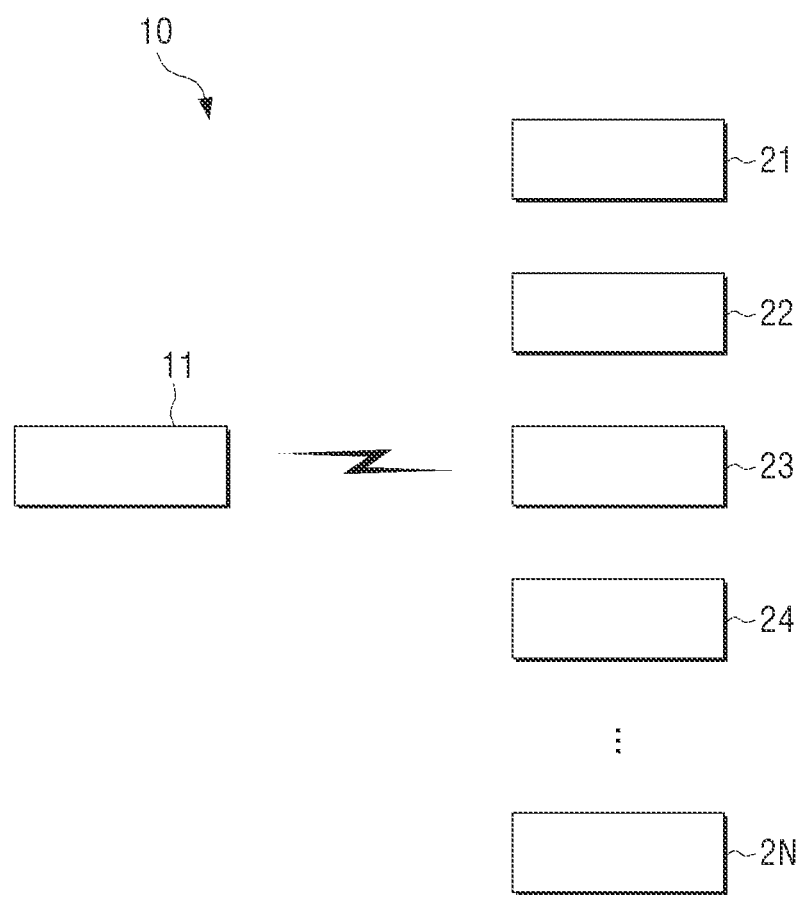
FIGS. 1A, 1B, 1C, and 1D are block diagrams of a system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While the terms used herein are selected from those that are currently most widely as possible in consideration of the functions in the present disclosure, these are subject to change depending on intents of those skilled in the art, precedents, or introduction of new technologies, etc. Further, in certain circumstances, some terms may be arbitrarily chosen by the Applicant, in which case the corresponding meaning will be defined in detail in the corresponding part of the description. Accordingly, the terms used herein should be defined based on the meanings thereof and the overall content of the disclosure, rather than simply based on what these terms are called.

While the expression such as "first" or "second" may be used to describe various constituent elements, these do not limit the constituent elements in any way. The wordings are used only for the purpose of distinguishing one constituent element from the other.

The expression such as "comprise" or "consist of" as used in the disclosure is used to designate existence of characteristic, number, operation, constituent element, component or a combination thereof described herein, but not to be understood as foreclosing existence or possibility of adding one or more other characteristics, numbers, operations, constituent elements, components or a combination thereof.

In describing certain embodiments of the present disclosure, "module" or "portion" may be provided to perform at least one or more functions or operations, and may be implemented as hardware or software, or a combination of hardware and software. Further, a plurality of "modules" or "portions" may be implemented as at least one processor (not illustrated) which is integrated into at least one module, except for a "module" or "portion" that has to be implemented as a specific hardware.

In the present disclosure, when a certain portion is "connected" with another portion, this includes not only an instance where the portions are "directly connected", but also an instance where the portions are "electrically connected" with an intervention of another element therebetween. Further, when a certain portion "comprises" a certain element, unless otherwise specified, this should be understood as indicating that additional element may be included, rather than foreclosing such additional element.

In the following description, same drawing reference numerals are used for the same elements even in different drawings. The matters defined in the description, such as detailed construction and elements, are provided to assist in a comprehensive understanding of the present disclosure. Accordingly, it is apparent that the various embodiments of the present disclosure can be carried out without those specifically defined matters.

Further, according to an embodiment of the present disclosure, a user input may include at least one among touch input, bending input, voice input, button input and multi-modal input, although not limited thereto.

Further, according to an embodiment of the present disclosure, the "touch input" may indicate touch gestures performed on a display and a cover by a user to control a device. Further, the touch input may include touches displaced by a certain distance (e.g., floating or hovering) without contacting the display. The touch input may be touch & hold gesture, tap gesture to lift off after the touching, double tap gesture, panning gesture, flick gesture, touch drag gesture to move toward one direction after the touching, or pinch gesture, although not limited thereto.

Further, according to an embodiment of the present disclosure, the "button input" may indicate the input by a user to control a device by using a physical button attached on a device.

Further, according to an embodiment of the present disclosure, the "motion input" may indicate the motion performed on a device by a user to control a device. For example, the motion input may include an input to rotate, tilt or move a device toward upper, lower, left and right directions.

Further, according to an embodiment of the present disclosure, the "multimodal input" may indicate a combination of at least two input manners. For example, a device may receive a touch input and a motion input together from a user, or receive a touch input and a voice input together from a user.

Further, according to an embodiment of the present disclosure, an "application" may indicate a series of computer program groups designated for performing specific work. According to an embodiment of the present disclosure, various applications may be provided. For example, there may be game application, video playing application, map application, memo application, calendar application, phone book application, broadcasting application, exercise supporting application, payment application, or picture folder application, although not limited thereto.

Further, according to an embodiment of the present disclosure, "application identification information" may refer to unique information to distinguish an application from another application. For example, the application identification information may be icon, index item, or link information, although not limited thereto.

Further, according to an embodiment of the present disclosure, a user interaction (UI) element may indicate an element capable of interacting with a user and thus providing visual, auditory, or olfactory feedbacks according to a user input. The UI element may be expressed as at least one form among image, text, and the video. Further, when there is one area that can provide feedbacks according to a user input without displaying the above information, this area may be referred to as the UI element. Further, the UI element may be application identification information described above, for example.

Referring to the attached drawings, the various embodiments of the present disclosure will be described in detail below.

FIGS. 1A to 1D are block diagrams illustrating a system 10 according to various embodiments of the present disclosure.

Referring to FIG. 1A, the system 10 may include an electronic device 11 and peripheral apparatuses 21~2N placed near to the electronic device 11. The electronic device 11 and the peripheral apparatuses 21~2N may be connected to each other through various communication methods. For example, the communication may be performed between the devices by using the wireless communication module such as Bluetooth or Wi-Fi.

The electronic device 11 is configured to control the peripheral apparatuses 21~2N. For example, the electronic device 11 may be a mobile or non-mobile computing device such as smart phone, Moving Picture Experts Group phase 1 or phase 2 (MPEG-1 or MPEG-2) audio layer 3 (MP3) player, laptop computer, desktop person computer (PC), personal digital assistant (PDA), electronic book terminal, digital broadcasting terminal, kiosk, electronic frame, navigation, digital television (TV), or wearable device such as a wrist watch or head-mounted display (HMD). The peripheral apparatuses 21~2N may be placed near to the electronic device 11 and controlled by the electronic device 11. For example, the peripheral apparatuses 21~2N may be speakers, but not limited thereto. Herein, the peripheral apparatuses 21~2N may be devices including the examples of the electronic device 11 mentioned above. Furthermore, when used for room setting, the peripheral apparatuses 21~2N may be light emitting diode (LED) lighting device, a temperature adjusting device, a smart home sensor or a plug. When the peripheral apparatuses 21~2N are used as media devices, a digital TV, a laptop computer, a desktop PC, a camera or an external hard disk may be the peripheral apparatuses. When the peripheral apparatuses 21~2N are used as air conditioning devices, an air conditioner, an air fresher, or an air fan may be the peripheral apparatuses. Further, when the peripheral apparatuses 21~2N are used at a shop, a beacon signal transmitter or an electro shelf labeling device (ESL) may be the peripheral apparatuses. Further, when being used in the logistics field, a logistics tracking attaching sensor or a loss preventing smart tag may be the peripheral apparatuses. When being used at a farm, a plant attaching sensor, a pot attaching senor or a stock attaching sensor may be peripheral apparatuses.

Meanwhile, referring to FIG. 1A, the electronic device 11 may be operated as controlling device to control content (e.g., image content or music content). In this case, the peripheral apparatuses 21~2N may be operated as output devices which output the data related with the controlling of the content. For example, when the electronic device 11 is smart phone to play the music content, the peripheral apparatuses 21~2N may be speakers which output the sounds of the music content.

Figure 1B:
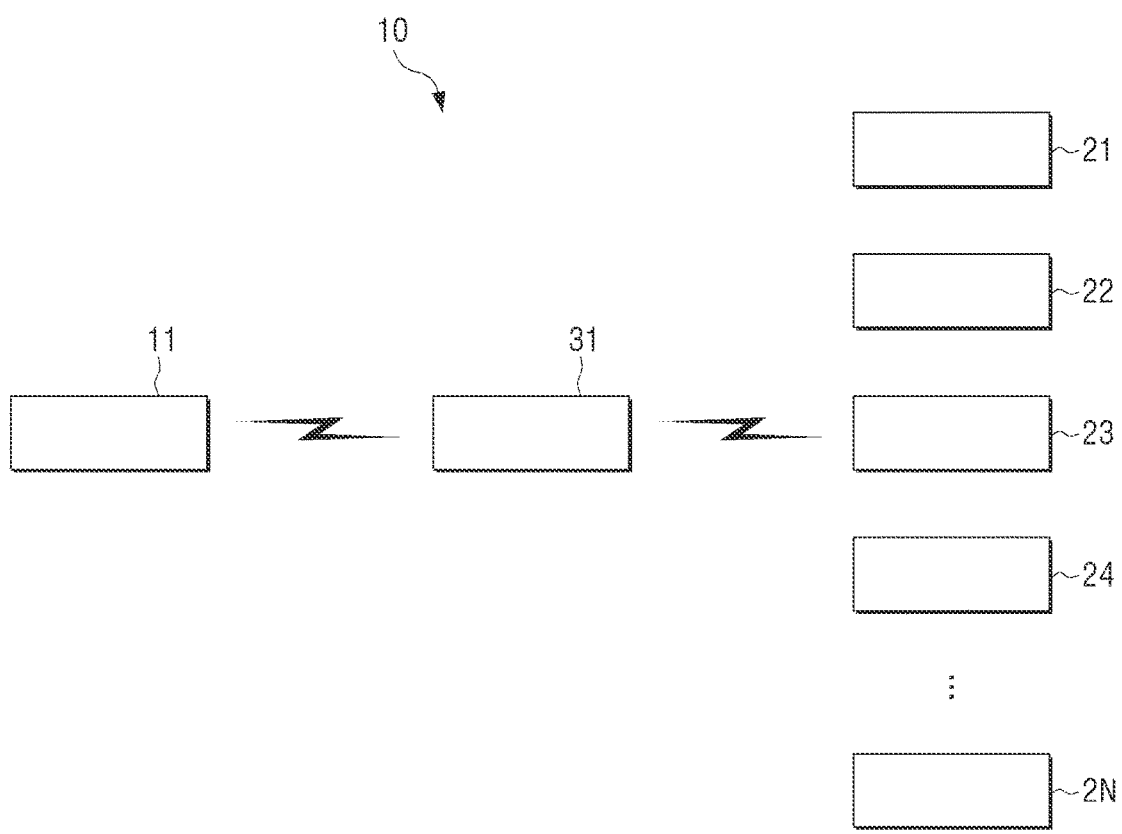

Referring to FIG. 1B, the system 10 may further include the electronic device 11, the peripheral apparatuses 21~2N placed near to the electronic device 11, or a hub 31 communicating with the electronic device 11 by being connected with the peripheral apparatuses 21~2N.

The hub 31 may receive the controlling information transmitted from the electronic device 11 or the data related with the playing of the content, and transmit to the peripheral apparatuses 21~2N. Further, the hub 31 may store identification information of the peripheral apparatuses 21~2N and provide to the electronic device 11 when being necessary.

Figure 1C:
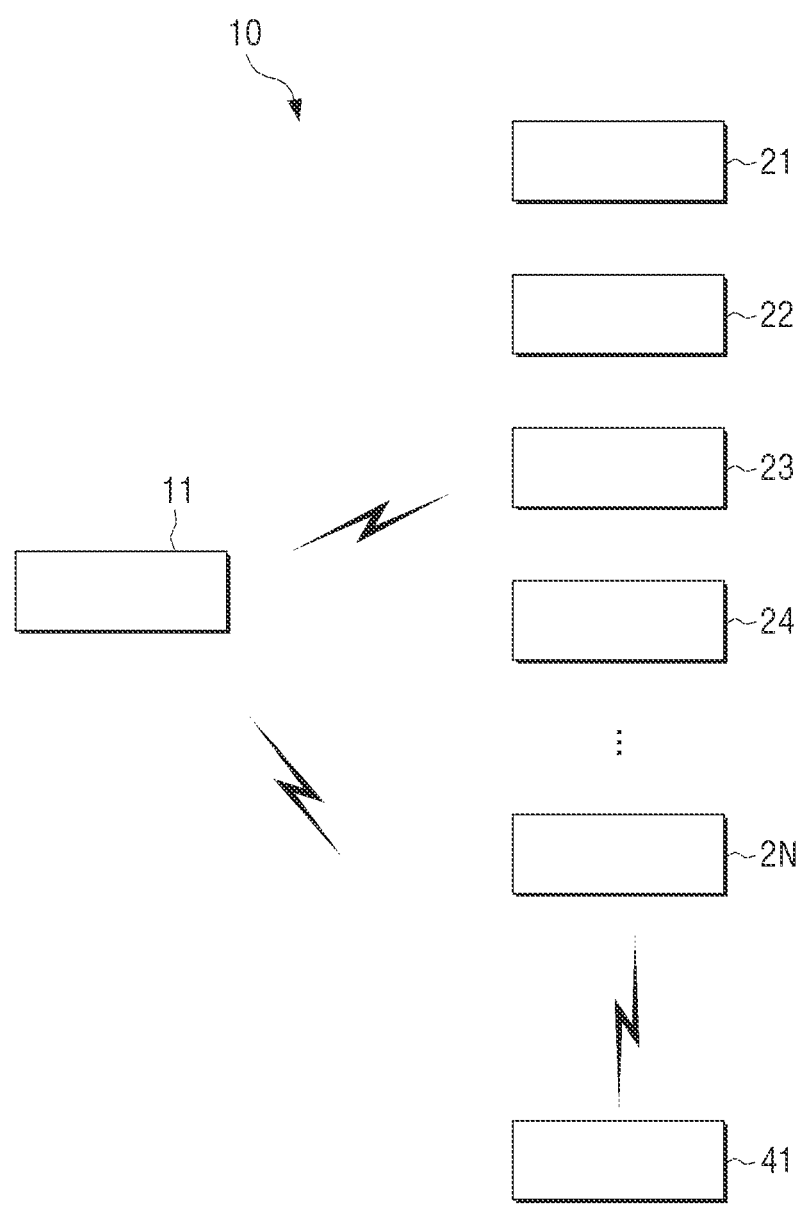

Referring to FIG. 1C, the system 10 may include the electronic device 11, the peripheral apparatuses 21~2N placed near to the electronic device 11, and a controlling device 41. The controlling device 41 may operate to store or control content, and transmit the data related with the playing of the content to the peripheral apparatuses 21~2N. In this case, the peripheral apparatuses 21~2N may operate as an output device to output the data related with the playing of the content, and the electronic device 11 may be a device to set the data output of the peripheral apparatuses 21~2N. Specifically, the electronic device 11 may be device to determine adjustment values of the output data outputted from the peripheral apparatuses 21~2N. The electronic device 11 and the peripheral apparatuses 21~2N may be connected to each other through the various communication methods. Further, the electronic device 11 may communicate with the controlling device 41, and provide the information of setting the peripheral apparatuses 21~2N to the controlling device 41. Herein, the type of the controlling device 41 may include the examples of the electronic device 11 described above.

Figure 1D:
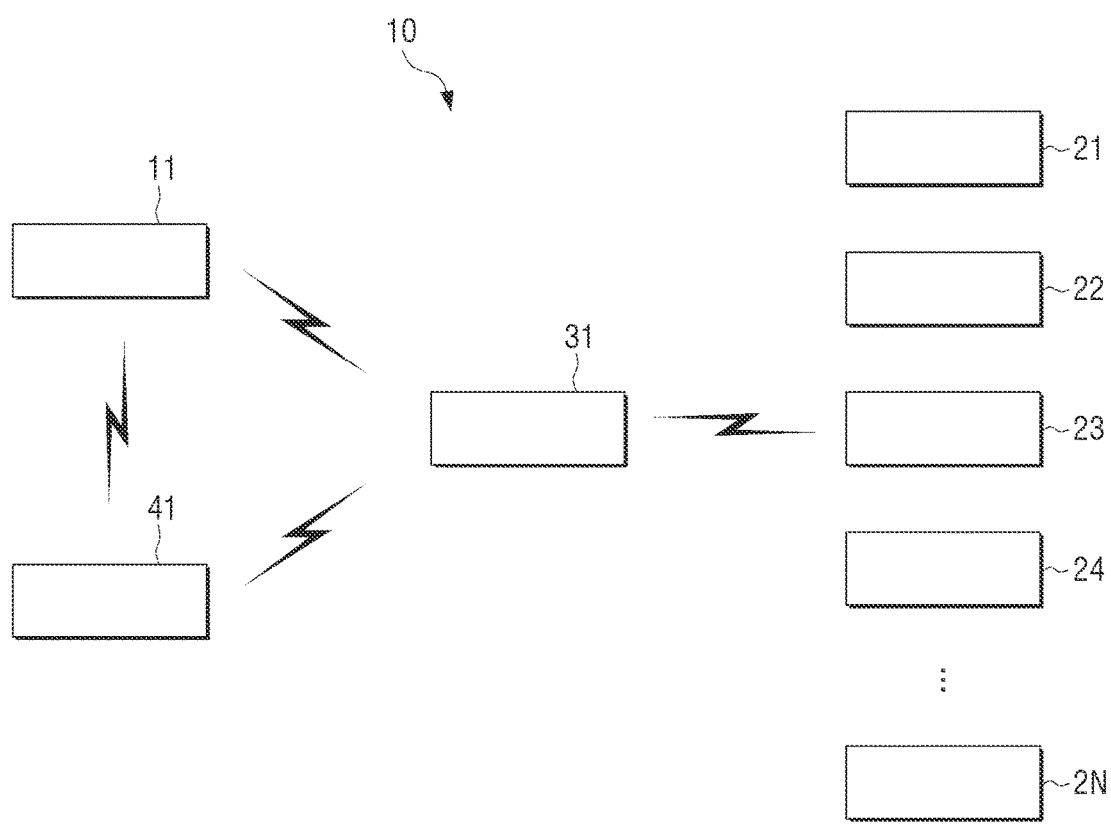

Referring to FIG. 1D, the system 10 may include the electronic device 11, the peripheral apparatuses 21~2N placed near to the electronic device 11, the hub 31 and the controlling device 41. The electronic device 11 may set the data output of the peripheral apparatuses 21~2N by communicating with the peripheral apparatuses 21~2N through the hub 31. Further, the information of setting the peripheral apparatuses 21~2N may be transmitted to the controlling device 41. The controlling device 41 may transmit the data related with the playing of the content to the peripheral apparatuses 21~2N through the hub 31. Herein, the controlling device 41 may select or modify the data related with the playing of the content by using the result values to set the peripheral apparatuses 21~2N received from the electronic device 11, and transmit to the peripheral apparatuses 21~2N through the hub 31. The peripheral apparatuses 21~2N may operate as output device to output the received data related with the playing of the content from the hub 31.

The above mainly describes that the electronic device 11 is portable terminal, the peripheral apparatuses 21~2N are speakers, and the controlling device 41 is portable terminal or digital TV. However, this is merely one of various embodiments of the present disclosure. The electronic device 11, the peripheral apparatuses 21~2N and the controlling device 41 may not be limited to the above, and may be various types of devices, as mentioned above.

Figure 2:
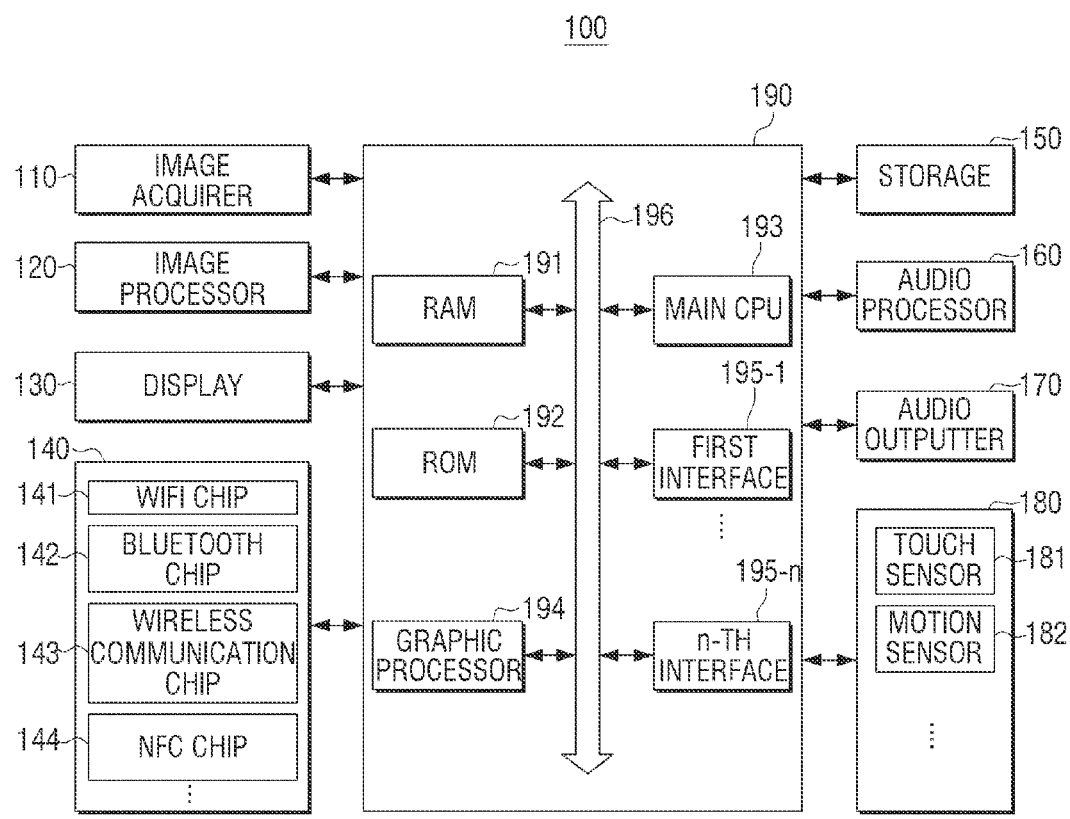
FIG. 2 is a block diagram of an electronic device according to an embodiment of the present disclosure.

FIG. 2 is a block diagram of the electronic device 100 according to an embodiment of the present disclosure. The constitution of the electronic device 100 in FIG. 2 may be applied to at least one of the electronic device 11, the peripheral apparatuses 21~2N, and the controlling device 41 in FIG. 1.

Referring to FIG. 2, the electronic device 100 may include at least one among an image acquirer 110, an image processor 120, a display 130, a communicator 140, a storage 150, an audio processor 160, an audio outputter 170, a sensor 180 and a controller 190. Meanwhile, the constitution of the electronic device 100 in FIG. 2 is merely one of embodiments of the present disclosure, and may not be limited to the above block diagram. Thus, some units may be excluded, modified or added according to the type or the purpose of the electronic device 100.

The image acquirer 110 may acquire image data through various sources. For example, the image acquirer 110 may receive broadcasting data from an external broadcasting station, video on demand (VOD) data from an external server at real time, and image data from an external device.

Further, the image acquirer 110 may acquire image data by photographing the external environment. For example, the image acquirer 110 may be implemented to be camera which photographs the external environment of the electronic device 100. In this case, the image acquirer 110 may include a lens (not illustrated) in which an image is penetrated, and an image sensor (not illustrated) in which the image penetrated through the lens is sensed. The image sensor (not illustrated) may be implemented to be charged coupled device (CCD) image sensor or complementary metal oxide semiconductor (CMOS) image sensor. The image data acquired through the image acquirer 110 may be processed in the image processor 120.

The image processor 120 is unit to process the image data received by the image acquirer 110. The image processor 120 may perform various image processing regarding the image data such as decoding, scaling, noise filtering, frame rate converting, and resolution converting.

The display 130 may display at least one among the image frames in which the image data are processed in the image processor 120 and the various screens generated in a graphic processor 194.

The implementing method of the display 130 may not be limited. For example, the display 130 may be implemented to be various forms such as liquid crystal display (LCD), organic LED (OLED) display, active-matrix OLED (AM-OLED), and plasma display panel (PDP).

The display 130 may include additional units according to the implementing method. For example, when the display 130 is liquid crystal method, the display 130 may include LCD display panel (not illustrated), a backlight unit (not illustrated) providing the light, and a panel driving plate (not illustrated) driving a panel (not illustrated). The display 130 may be combined with a touch sensor 181 of the sensor 180 and provided as touch screen.

The display 130 may be also combined with the front area, the sectioned area and the rear area of the electronic device 100 in the bended display form. The bended display may be implemented to be flexible display or normal display that cannot be flexible. For example, the bended display may be implemented by connecting the plurality of flat displays.

When the bended display is implemented to be flexible display, the flexible display may be featured to bended, curved or rolled without the damage through a thin and flexible plate such as a paper. The flexible display may be produced by using the plastic plate as well as glass plate which is normally used. When the plastic plate is used, the flexible display may be formed by using the low temperature producing processor without using the related producing processor in order to prevent the damage on the plate. Further, the flexible display may be provided with the flexibility that can be bended and spread by substituting the glass plate covering the liquid crystal in LCD, OLED display, AM-OLED, and PDP with the plastic film. The flexible display may be durable for the shock as well as thin and light. Further, the flexible display may have an advantage in which it can be curved or bended, and manufactured in the various forms.

The communicator 140 is unit to perform the communication with various types of external devices according to various forms of the communication methods. The communicator 140 may include at least one among Wi-Fi chip 141, Bluetooth chip 142, the wireless communication chip 143, and near field communication (NFC) chip 144. The controller 190 may perform the communication with various external devices by using the communicator 140.

Specifically, Wi-Fi chip 141 and Bluetooth chip 142 may respectively perform the communication according to Wi-Fi communication method and Bluetooth communication method. When Wi-Fi chip 141 and Bluetooth chip 142 are used, various connecting information such as service set identifier (SSID) and session key may be first transmitted and received, the communication may be connected by using the connecting information, and various types of information may be transmitted and received. The wireless communication chip 143 indicates chip to perform the communication according to the various communication standards such as Institute of Electrical and Electronics Engineers (IEEE), ZigBee, $3^{rd}$ generation (3G), $3^{rd}$ generation partnership project (3GPP), and long term evolution (LTE). The NFC chip 144 indicates chip to operate in NFC method using 13.56 MHz bandwidth among various RF-ID frequency bandwidths such as 135 kHz, 13.56 MHz, 433 MHz, 860~960 MHz, and 2.45 GHz.

The storage 150 may store various programs and data used for the operation of the electronic device 100. The storage 150 may be implemented to be non-volatile memory, volatile memory, flash memory, hard disk drive (HDD) or solid state drive (SSD). The storage 150 may be accessed by the controller 190, and the controller 190 may perform the reading, the recording, the revising, the deleting, and the updating of the data. According to an embodiment of the present disclosure, the term of the storage may include the storage 150, read-only memory (ROM) (not illustrated) and random access memory (RAM) (not illustrated) within the controller 190, and a memory card (not illustrated) attached to the electronic device 100 (e.g., micro secure digital (SD) card or memory stick). Specifically, the storage 150 may store programs and data to generate various screens to be displayed on the display area.

Figure 3:
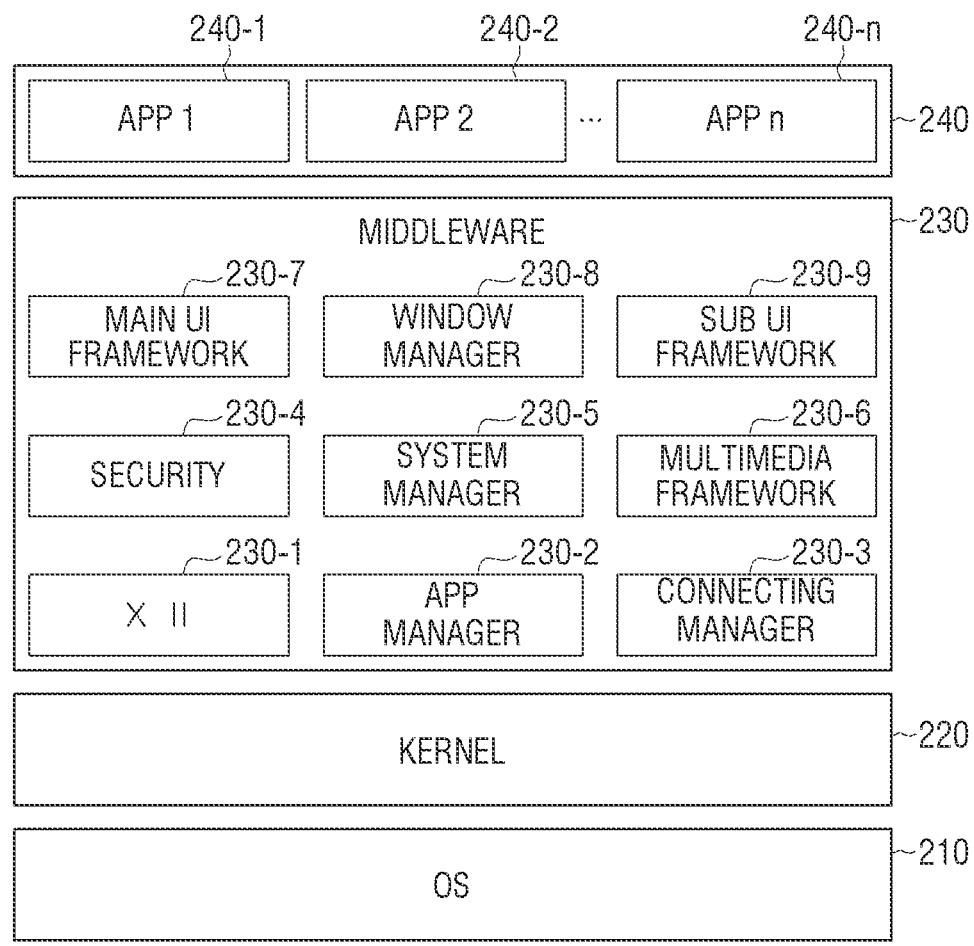
FIG. 3 is a diagram provided to explain structure of the software stored in an electronic device according to an embodiment of the present disclosure.

The following will explain structure of the software stored in the electronic device 100 by referring to FIG. 3.

FIG. 3 is a diagram provided to explain structure of the software stored in an electronic device according to an embodiment of the present disclosure.

Referring to FIG. 3, the storage 150 may store the software including operating system (O/S) 210, kernel 220, middleware 230, and application 240.

O/S 210 may control and manage general operation of the hardware. Thus, O/S 210 may be class to manage basic functions such as hardware management, memory, and security.

The kernel 220 may play a path role to deliver various signals including a touch signal sensed in the sensor 180 to the middleware 230.

The middleware 230 may include various software modules to control operation of the electronic device 100. Referring to FIG. 2, the middleware 230 may include X11 module 230-1, application (APP) manager 230-2, connecting manager 230-3, security module 230-4, system manager 230-5, multimedia framework 230-6, main UI framework 230-7, window manager 230-8, and sub UI framework 230-9.

The X11 module 230-1 is module to receive various event signals from various units of the hardware provided on the electronic device 100. Herein, the event may be variously set such as event to sense user gestures, event to occur the system alarm, and event to implement or complete a specific program.

The APP manager 230-2 is module to manage the implementing situation of the various application 240 installed in the storage 150. When the event to implement an application is sensed by X11 module 230-1, APP manager 230-2 may call and implement the application corresponding to the event.

The connecting manager 230-3 is module to support the wire or the wireless network connection. The connecting manager 230-3 may include various detailed modules such as DNET module and universal plug and play (UPnP) module.

The security module 230-4 is module to support the hardware certification, the request permission and the secure storage.

The system manager 230-5 may monitor situation of each unit within the electronic device 100, and provide the monitoring results to the other modules. For example, when the battery is short, the error occurs, or the communication disconnects, the system manager 230-5 may provide the monitoring results to the main UI framework 230-7 or the sub UI framework 230-9, and output a notice message or a notice sound.

The multimedia framework 230-6 is module to play the multimedia content stored in the electronic device 100 or provided from external sources.

The multimedia framework 230-6 may include player module, camcorder module, and sound processing module. Thereby, the multimedia framework may perform the operation to reproduce various multimedia content, generate and reproduce screens and sounds.

The main UI framework 230-7 is module to provide various UIs to be displayed on the main area of the display 130, and the sub UI framework 230-9 is module to provide various UIs to be displayed on the sub area. The main UI framework 230-7 and the sub UI framework 230-9 may include image compositor module to constitute various UI elements, coordinate compositor module to calculate the coordinate in which UI elements will be marked, rendering module to render the configured UI elements on the calculated coordinates, and two-dimensional (2D)/three-dimensional (3D) UI toolkit to provide tools for constituting UI in 2D or 3D form.

The window manager 230-8 may sense a touch event with the user body or a pen or other input events. The window manger 230-8 may deliver the event signal to the main UI framework 230-7 or the sub UI framework 230-9 when the event is sensed, and perform the operation corresponding to the event.

Besides, various program modules may be stored such as writing module to draw a line according to the dragging tacks when a user touches and drags the screen and angle calculating module to calculate pitch angle, roll angle, and yaw angle based on the sensor value sensed in a motion sensor 182.

The application module 240 may include applications 240-1~1240-n to support various functions. For example, the application module 240 may include program modules to provide various services such as navigation program module, game module, electronic book module, calendar module, and alarm management module. The applications may be installed as being default, or may be voluntarily installed and used by a user when being used. A main central processing unit (CPU) 193 may implement the application corresponding to the selected UI element by using the application module 240 when UI element is selected.

The software structure illustrated in FIG. 3 is merely one of various embodiments of the present disclosure; it may not be limited to herein. Thus, some units may be excluded, modified or added according to the type or the purpose of the electronic device 100.

Referring to FIG. 2, the audio processor 160 is unit to perform the processing regarding the audio data of the image content. The audio processor 160 may perform various processing regarding the audio data such as decoding, amplifying, and noise filtering. The audio data processed in the audio processor 160 may be outputted through the audio outputter 170.

The audio outputter 170 is unit to output various notice sounds or voice messages as well as audio data in which various processing are performed such as decoding, amplifying and noise filtering by the audio processor 160. Specifically, the audio outputter 170 may be implemented to be speaker; this is merely one of various embodiments of the present disclosure. The audio outputter 170 may be implemented to be output component that can output the audio data.

The sensor 180 may sense various user interactions. The sensor 180 may be configured with various sensors, more specifically, configured by including at least one device among every form of the sensing devices that can extract the situation changes in the electronic device 100. For example, the sensor 180 may be configured by including at least one sensor among the various sensing devices such as touch sensor, acceleration sensor, gyro sensor, illumination sensor, proximity sensor, pressure sensor, noise sensor (e.g., microphone), image sensor (e.g., camera module), and timer.

The sensor 180 may be divided into the touch sensor 181 and the motion sensor 182 according to the sensing purpose, as illustrated in FIG. 2. However, it may not be limited to herein; the sensor may be further divided according to the other various purposes. The dividing may not indicate the physical dividing; at least one sensor may be combined with each other, which may perform the functions of the touch sensor 181 and the motion sensor 182. Further, according to the implementing method, a part regarding the constitution or the functions of the sensor 180 may be included in the controller 190.

For example, the touch sensor 181 may sense a user touch input by using the touch sensor attached on the rear area of the display panel. The controller 190 may acquire information such as touch coordinates and touch times from the touch sensor 181, and determine the type of the touch input (e.g., tap gesture, double tap gesture, panning gesture, flick gesture, touch drag gesture). Further, the controller 190 may directly determine the type of the touch input by using the touch coordinates and touch times acquired by the touch sensor 181.

The motion sensor 182 may sense the motion of the electronic device 100 (e.g., rotating or tilting) by using at least one among the acceleration sensor, the tilt sensor, the gyro sensor, and the 3-axis magnetic sensor. Further, the motion sensor 182 may deliver the generated electrical signal to the controller 190. For example, the motion sensor 182 may measure the acceleration added the motion acceleration of the electronic device 100 with the gravity acceleration. However, when the electronic device 100 has no motion, the motion sensor 182 may only measure the gravity acceleration.

The controller 190 may control general operation of the electronic device 100 by using the various programs stored in the storage 150.

As illustrated in FIG. 2, the controller 190 may be configured with RAM 191, ROM 192, a graphic processor 194, the main CPU 193, a first to a n interface 195-1~195-n, and a bus 196. Herein, RAM 191, ROM 192, the graphic processor 194, the main CPU 193, and the first to the n interface 195~1195-n may be connected to each other through the bus 196.

The RAM 191 may store O/S and application programs. Specifically, RAM 191 may store O/S and the application data selected by a user when the electronic device 100 boots.

The ROM 192 may store command sets for the system booting. When a turn-on command is inputted and the electrical power is provided, the main CPU 193 may copy the stored O/S in the storage 150 to RAM 191 according to the stored command in ROM 192, and boot the system by implementing O/S. When the booting completed, the main CPU 193 may copy the various application programs stored in the storage 150 to RAM 191, and perform various operation by implementing the application programs copied in RAM 191.

The graphic processor 194 may generate screen including various objects such as item, image and text by using a calculator (not illustrated) and a renderer (not illustrated). Herein, the calculator may be configured to calculate attribute values such as coordinate values, shape, size or color in which each object will be displayed according to the layout of the screen by using the controlling command received from the sensor 180. Further, the renderer may be configured to generate various layouts of screens including objects based on the attribute values calculated at the calculator. The screen generated at the renderer may be displayed within the display area of the display 130.

The main CPU 193 may access to the storage 150 and perform the booting by using the stored O/S in the storage 150. Further, the main CPU 193 may perform various operation by using the various programs, content and data stored at the storage 150.

The first to the n interface 195-1 to 195-n may be connected to the above described units. One of the first to the n interface 195-1 to 195-n may be network interface connected with an external device through network.

Specifically, the controller 190 may determine the emitting color emitted from the emitter based on the image data including an emitter of the peripheral apparatus 21 which is acquired through the image acquirer 110. Further, the controller 190 may acquire the identification information of the peripheral apparatus mapped with the emitting color in order to identify the peripheral apparatus 21.

Specifically, when the different emitting colors are respectively mapped with the plurality of peripheral apparatuses 21~2N, the controller 190 may acquire the identification information of the peripheral apparatus mapped with the determined emitting color among the plurality of peripheral apparatuses 21~2N.

Further, the controller 190 may determine the emitting color and the blinking pattern emitted from the emitter based on the image data including the emitter of the peripheral apparatus which is acquired through the image acquirer 110. The controller 190 may acquire the identification of the peripheral apparatus mapped with the emitting color and the blinking pattern in order to identify the peripheral apparatus 21.

Further, the controller 190 may determine adjustment values of the output data outputted from the perceived peripheral apparatus 21, and transmit the determined adjustment values to the perceived peripheral apparatus 21 or the hub 31 that can communicate with the perceived peripheral apparatus 21.

Figure 4:
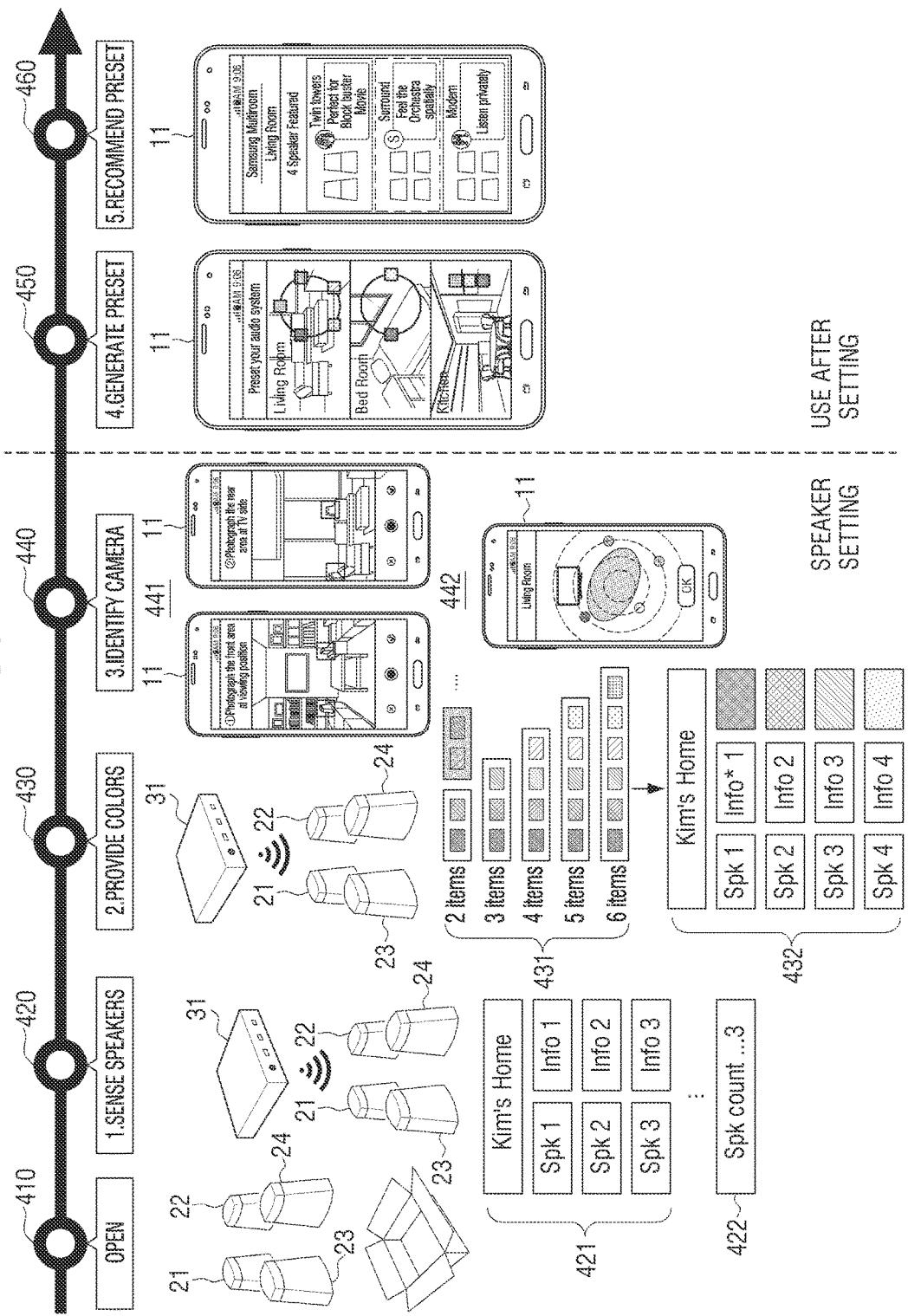

FIG. 4 is a diagram illustrating the overall process according to an embodiment of the present disclosure.

Referring to FIG. 4, a user may purchase and open speakers as peripheral apparatuses 21~24 at operation 410.

At operation 420, the hub 31 (e.g., audio hub) may sense the peripheral apparatuses 21~24 (e.g., speakers). The case in which the hub 31 senses the peripheral apparatuses 21~24 may be case in which the sensing may be performed according to a user manipulation on the hub 31, the peripheral apparatuses 21~24 may be connected to the electrical power, or the positions of the peripheral apparatuses 21~24 may be sensed to be moved. Herein, the hub 31 may be purchased together when purchasing the peripheral apparatuses 21~24 or may be separately purchased by a user. Further, at least one of the peripheral apparatuses 21~24 may play the role of the hub 31.

When the hub 31 senses the peripheral apparatuses 21~24, the hub 31 may acquire the identification information 421 of the peripheral apparatuses 21~24 and a number 422 of the peripheral apparatuses 21~24 from the server (not illustrated), the electronic device 11 or the peripheral apparatuses 21~24. Further, the hub 31 may previously store the identification information 421 of the peripheral apparatuses 21~24. The identification information 421 of the peripheral apparatuses may be at least one among a product name of the peripheral apparatuses (e.g., speaker), a model name, an original ID (e.g., Mac Address), a product image and a model image.

At operation 430, the hub 31 may determine at least one of the emitting colors and the blinking patterns respectively mapped with the peripheral apparatuses 21~24 in order to provide the emitting colors to the peripheral apparatuses 21~24, and transmit at least one information regarding the determined emitting colors and blinking patterns to the electronic device 11 or the peripheral apparatuses 21~24. For example, the hub 31 may transmit the information regarding the different emitting colors, the information regarding the different blinking patterns, or the information regarding the different combination forms of the emitting colors and the blinking patterns to the electronic device 11 or the peripheral apparatuses 21~24. Specifically, the hub 31 may store a color combination table 431 per number of the peripheral apparatuses 21~24. The hub 31 may determine the color combination related with the number of the sensed peripheral apparatuses 21~24 by referring to the color combination table 431, and store the table 432 in which the colors (e.g., different colors) are mapped per identification information of the peripheral apparatuses 21~24. Further, the hub 31 may transmit the table 432 in which the colors are mapped respectively regarding the peripheral apparatuses 21~24 to the electronic device 11.

When at least one is provided from the hub 31 among the emitting colors and the blinking patterns, the peripheral apparatuses 21~24 may drive the emitters with the provided emitting colors or the provided blinking patterns. Herein, the emitters may be arranged in the unified form of the peripheral apparatuses or detachable form from the peripheral apparatuses. When the emitters are arranged in the detachable form from the peripheral apparatuses, the manufactures or sellers of the peripheral apparatuses and the emitters may be different to each other. Otherwise, even when being uniform to each other, the peripheral apparatuses and the emitters may be provided in the different packages to each other. In the following, the peripheral apparatuses according to an embodiment of the present disclosure may be named as peripheral apparatuses including the emitters in the detachable form in addition to the unified form.

Next, the electronic device 11 may acquire the image data by photographing the emitting colors or the blinking patterns emitted from the peripheral apparatuses 21~24 through the image acquirer 110. Further, the electronic device 11 may respectively distinguish and identify the peripheral apparatuses according to the difference in the emitting colors or the blinking patterns based on the acquired image data at operation 440.

Specifically, as illustrated in 441 of FIG. 4, the electronic device 11 may photograph the emitters of the peripheral apparatuses 21~24 on the near area of the electronic device 11 by considering the position of a user or the position of the controlling device 41 through the camera.

Further, as illustrated in 442 of FIG. 4, the electronic device 11 may display representative information representing the peripheral apparatuses 21~24 (e.g., icon) as a result of identifying the emitting colors of the emitters. Next, the electronic device 11 may group the peripheral apparatuses 21~24 according to a user input (e.g., touch or touch drag) toward the representative information of the peripheral apparatuses 21~24, or determine the adjustment values of the output data outputted from the peripheral apparatuses 21~24. The electronic device 11 may adjust the output data of the peripheral apparatuses 21~24 by transmitting the determined adjustment values to the peripheral apparatuses 21~24. Further, when the electronic device 11 transmits the determined adjustment values to the hub 31, the hub 31 may adjust the output data of the peripheral apparatuses 21~24 by transmitting the values to the peripheral apparatuses 21~24. Herein, the adjustment values may be determined by considering the position coordinate of the representative information which is modified according to a user input on the representative information.

FIG. 5 is a diagram illustrating the overall process according to an embodiment of the present disclosure.

For example, referring to 510 of FIG. 5, the electronic device 11 may display the representative information 21-1, 21-2 representing the peripheral apparatuses 21, 22 which are distinguished with the emitting colors through the peripheral apparatus setting screen. In this case, the first representative information 21-1 may be placed on the coordinate of (−2, 2) and the second representative information 21-2 may be placed on the coordinate of (2, 2) based on the coordinate of (0, 0) regarding a listener 511. The positions of the representative information 21-1, 21-2 representing the peripheral apparatuses may be moved according to a user input. In response to the user input, the first representative information 21-1 may be moved and placed on (−2, 0) as illustrated in 520 of FIG. 5. When the first representative information 21-1 is moved, the controller 190 may calculate the difference in the distances between the initial position and the moved position regarding the first representative information 21-1. Further, according to the calculating result, the controller 190 may determine the adjustment values of the output parameters based on the difference value such as volume size and delay time (or, phase size) regarding the output data to be outputted from the peripheral apparatuses. For example, when the position of the representative information corresponding to the peripheral apparatus 21 becomes nearer to the position of a listener, the volume size of the output data may increase and the delay time may decrease. Further, when the position of the representative information corresponding to the peripheral apparatus becomes farther from the position of a listener, the volume size of the output data may decrease and the delay time may increase. Herein, the adjustment values of the output parameters may be determined by considering the focal points of the output data according to the combination of the output data between the peripheral apparatuses when there are a plurality of peripheral apparatuses.

For another example, through the peripheral apparatus setting screen may be displayed the representative information 21-1, 21-2 representing the peripheral apparatuses 21, 22 which are distinguished with the emitting colors. In this case, the position of a listener 511 may be moved according to a user input. The controller 190 may determine the adjustment values of the output parameters to be outputted from the peripheral apparatuses based on the difference in the distances between the position of a listener 511 and the positions of the representative information 21-1, 21-2.

Meanwhile, the positions of the representative information 21-1, 21-2 displayed on the peripheral apparatus setting screen may be periodically updated. When the positions of the peripheral apparatuses 21, 22 are modified, the positions of the representative information 21-1, 21-2 may be also modified on the peripheral apparatus setting screen.

Referring to FIG. 4, the electronic device 11 may generate the preset information based on the information to respectively set the peripheral apparatuses 21~24 at operation 450. For example, the preset information may be provided by generating the information of setting the peripheral apparatuses per user, setting time, or setting place in the previously determined form. The generated preset information may be stored in the electronic device 11 or the server (not illustrated) connected to the electronic device 11.

At operation 460, a user may recommend the preset information to a third party. The preset information may be provided to a third party by one to one or to a plurality of third parties by uploading on the server providing blogs.

FIGS. 6 to 12 are diagrams illustrating a process for providing the emitting colors to the peripheral apparatuses 21~2N according to various embodiments of the present disclosure.

Figure 6:
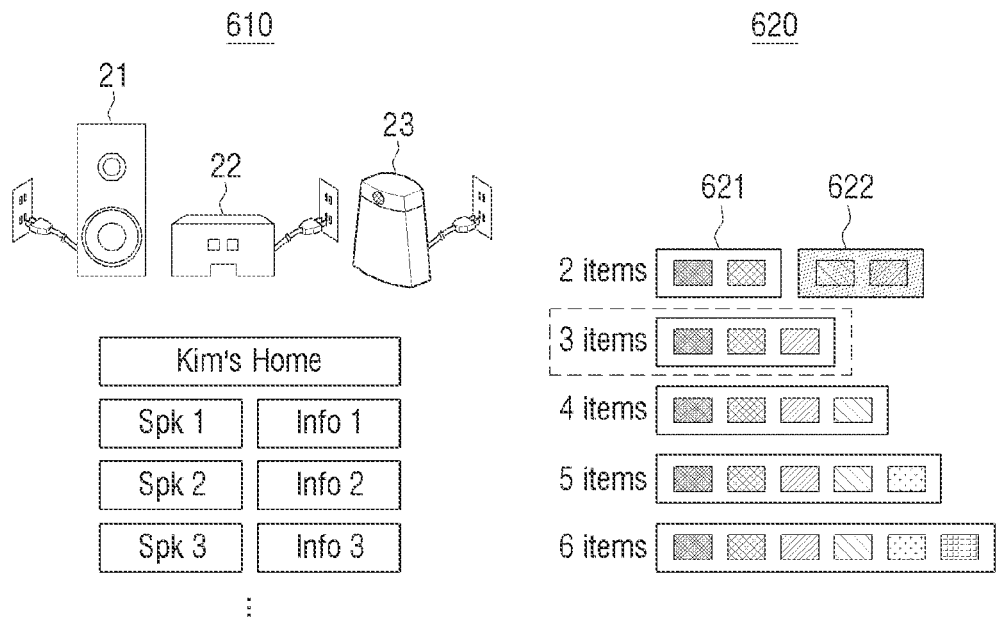

Referring to 610 of FIG. 6, when the electrical power is provided to the peripheral apparatuses 21~23, the communicator 140 of the electronic device 11 may acquire the identification information of the peripheral apparatuses 21~23 from the peripheral apparatuses 21~23, and determine the number of the peripheral apparatuses 21~23. Further, when the electrical power is provided to the peripheral apparatuses 21~23, the communicator 140 of the electronic device 11 may acquire the number of the peripheral apparatuses 21-23 and the identification information of the peripheral apparatuses 21~23 from the hub 31. The communicator 140 of the electronic device 11 may acquire the above information by using Bluetooth low energy (BLE) communication method.

When the number of the peripheral apparatuses 21~23 and the identification information of the peripheral apparatuses 21~23 are acquired, the controller 190 of the electronic device 11 may store the identification information respectively regarding the peripheral apparatuses 21~23 at the storage 150, and determine the color combination respectively regarding the number of the peripheral apparatuses 21~23 by using the color combination table per number which is stored at the storage 150, as illustrated in 620 of FIG. 6. The color combination per number of the peripheral apparatuses 21~23 may not be limited to the combination of specific colors. Rather, the color combination may be configured by using various colors.

For example, when the number of the peripheral apparatuses 21~22 are two, the controller 190 of the electronic device 11 may determine the color combination 621 configured with the red and the blue or the color combination 622 configured with the red and the yellow. Further, when the number of the peripheral apparatuses 21~23 are three, the controller 190 of the electronic device 11 may determine the color combination configured with the red, the blue, and the green. Further, the controller 190 may determine the color combination configured with the red, the blue, and the yellow.

When at least one color combination that can be mapped with the peripheral apparatuses 21~23 are determined, the controller 190 may control the display 130 to display at least one color combination 632, 633, 634 in which the colors are mapped respectively regarding the peripheral apparatuses 21~23 through the peripheral apparatus setting screen 631, as illustrated in 630 of FIG. 6. Next, the sensor 180 of the controller 190 may sense a user input to select one 633 among at least one recommended combination 632, 633, 634. The peripheral apparatus setting screen 631 may be screen implemented by using the peripheral apparatus setting application, or screen implemented to be a part in the implementing screen of another application and displayed while performing another application.

When a user selects one color combination 633 mapped per peripheral apparatuses 21~23, the electronic device 11 may store the table 641 in which the colors are mapped respectively regarding the identification information of the peripheral apparatuses 21~24, as illustrated in 640 of FIG. 6. The communicator 140 of the electronic device 11 may transmit the color information related with the mapped colors so that the mapped colors are respectively provided to the peripheral apparatuses 21~23, and the emitters of the peripheral apparatuses 21-23 may emit the mapped colors based on the received color information.

Figure 7:
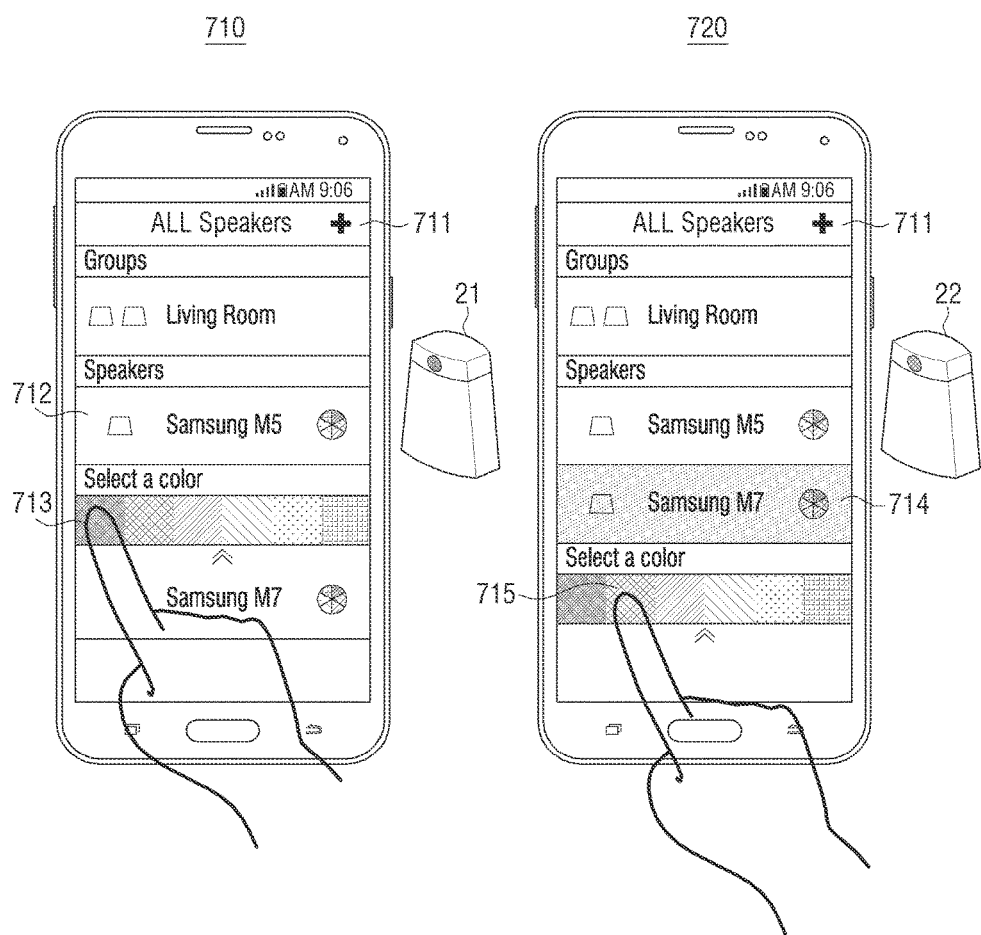

According to an embodiment of the present disclosure, referring to 710 of FIG. 7, because the number of the peripheral apparatuses 21, 22 and the identification information of the peripheral apparatuses are acquired, the controller 190 of the electronic device 11 may control the display 130 to display the identification information of the peripheral apparatuses 21, 22 through the peripheral apparatus setting screen 711 to determine the colors of the peripheral apparatuses 21, 22. Further, while the identification information 712 of one peripheral apparatus 21 is selected, the sensor 180 of the electronic device 11 may sense a user input to select the color 713 mapped with one peripheral apparatus 21. Because the color to be mapped with one peripheral apparatus 21 is selected, the communicator 140 of the electronic device 11 may deliver the color information related with the mapped color to one peripheral apparatus 21, and the emitter of one peripheral apparatus 21 may emit the mapped color based on the received color information. When the color is mapped with one peripheral apparatus 21, a user may determine the color to be mapped with another peripheral apparatus 22. For example, referring to 720 of FIG. 7, while the identification information 714 of another peripheral apparatus 22 is selected, the sensor 180 of the electronic device 11 may sense a user input to select the color 715 to be mapped with another peripheral apparatus 22. Because the color to be mapped with another peripheral apparatus 22 is selected, the communicator 140 of the electronic device 11 may transmit the color information related with the mapped color to another peripheral apparatus 22, and the emitter of another peripheral apparatus 22 may emit the mapped color based on the received color information.

Figure 8:
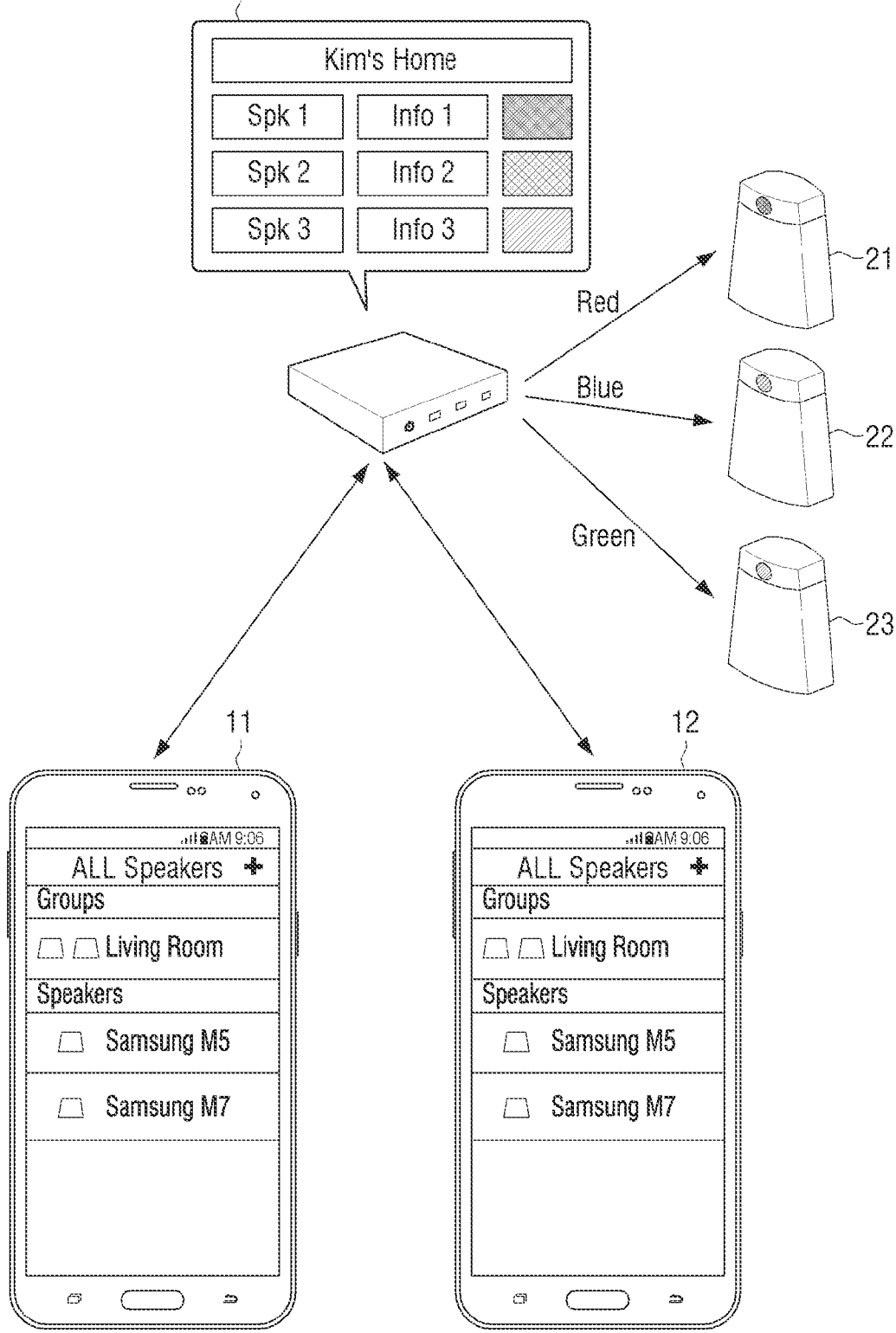

According to an embodiment of the present disclosure, referring to FIG. 8, the hub 31 may store the table 811 in which the colors are mapped respectively regarding the identification information of the peripheral apparatuses 21~23. For example, in order to determine the emitting colors of the peripheral apparatuses 21~23, the table in which the colors are mapped respectively regarding the identification information of the peripheral apparatuses 21~23 may be acquired from the electronic device 11, one combination may be voluntarily selected from the color combination previously stored at the hub 31, or the emitting colors of the peripheral apparatuses 21~23 may be determined by considering the relations between the hub 31 and the peripheral apparatuses 21~23 (e.g., distance or connecting order). The hub 31 may transmit the color information related with the mapped colors respectively to the peripheral apparatuses, and the emitters of the peripheral apparatuses 21~23 may emit the mapped colors based on the received color information.

Further, the hub 31 may transmit the identification information and the color information respectively regarding the peripheral apparatuses 21~23 to the electronic device 11, and update the table allocated to the peripheral apparatus setting application and stored at the storage 150 of the electronic device 11 in which the colors are mapped respectively regarding the identification information of the peripheral apparatuses 21~23. Thereby, because the hub 31 manages the identification information and the color information respectively regarding the peripheral apparatuses 21~23, the electronic devices 11, 12 accessing to the hub 31 may acquire the uniform color information per identification information of the peripheral apparatuses 21~23.

According to an embodiment of the present disclosure, referring to FIG. 9, the electronic device 11 may acquire the identification information of the peripheral apparatuses 21~23 from the hub 31. Further, as described above in FIGS. 6 and 7, the emitting colors to be mapped with the identification information of the peripheral apparatuses 21~23 may be determined according to a user selecting. The table 901 in which the colors are mapped respectively regarding the identification information of the peripheral apparatuses 21~23 may be stored at the storage 150 of the electronic device 11.

In this case, the communicator 140 of the electronic device 11 may transmit the color information to the peripheral apparatuses 21~23, and the emitters of the peripheral apparatuses 21~23 may emit the mapped colors based on the received color information.

Specifically, when the plurality of electronic devices 11, 12 respectively manage the table 901 in which the colors are mapped respectively regarding the identification information of the peripheral apparatuses 21~23, the emitters of the peripheral apparatuses 21~23 may emit the different colors to each other according to the connected electronic devices 11, 12.

Figure 10:
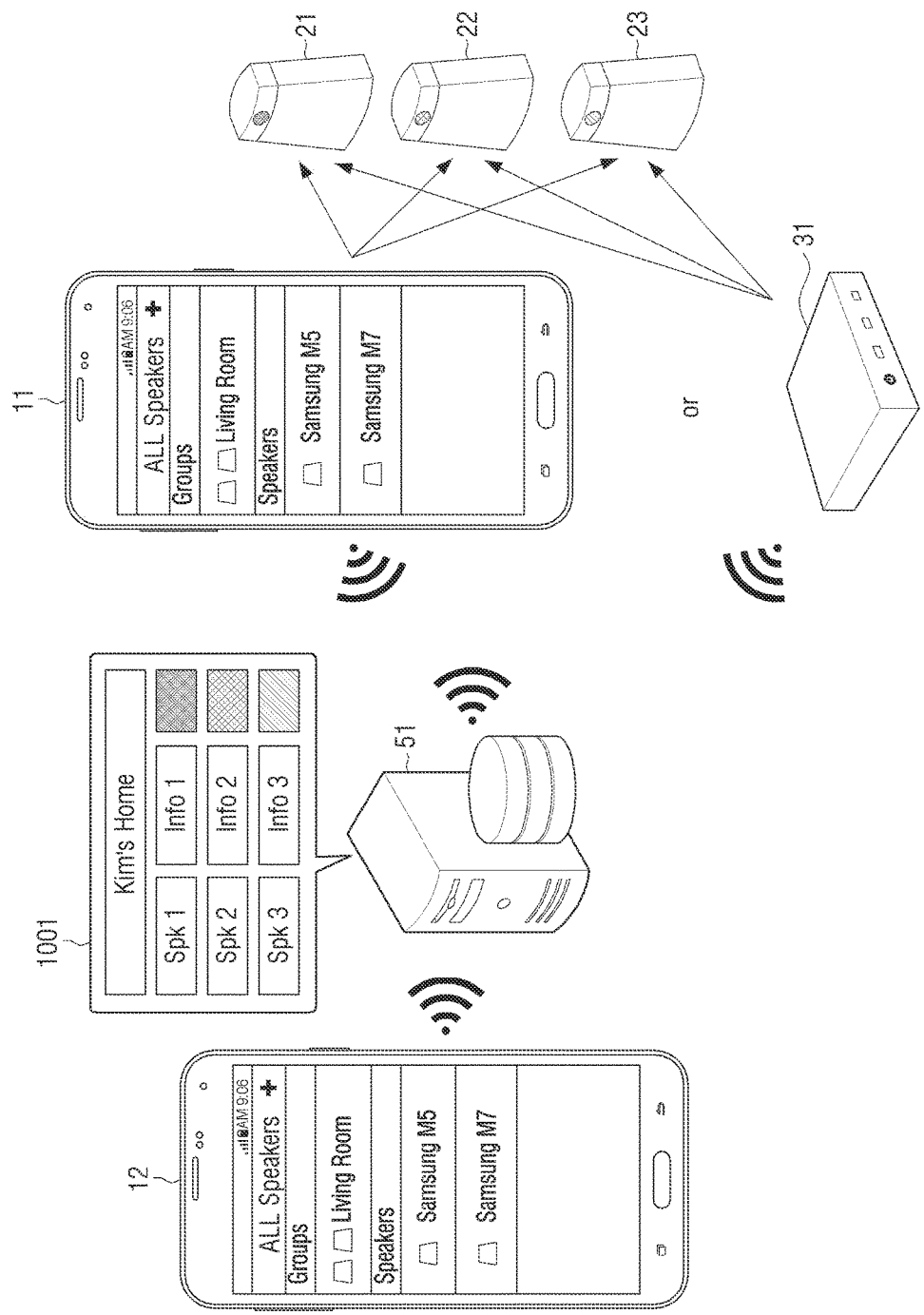

According to an embodiment of the present disclosure, referring to FIG. 10, the server 50 placed on the external area of the electronic device 11 may store the table 1001 in which the colors are mapped respectively regarding the identification information of the peripheral apparatuses 21~23. In this case, the electronic device 11 or the hub 31 may acquire the emitting color information of the peripheral apparatuses 21~23 by being connected to the server 51. Further, the communicator 140 of the electronic device 11 or the hub 31 may transmit the color information to the peripheral apparatuses 21~23, and the emitters of the peripheral apparatuses 21~23 may emit the mapped colors based on the received color information.

In this case, another electronic device 21 connected to the server 51 may acquire the emitting color information uniform to the electronic device 11 or the hub 31.

Figure 11:
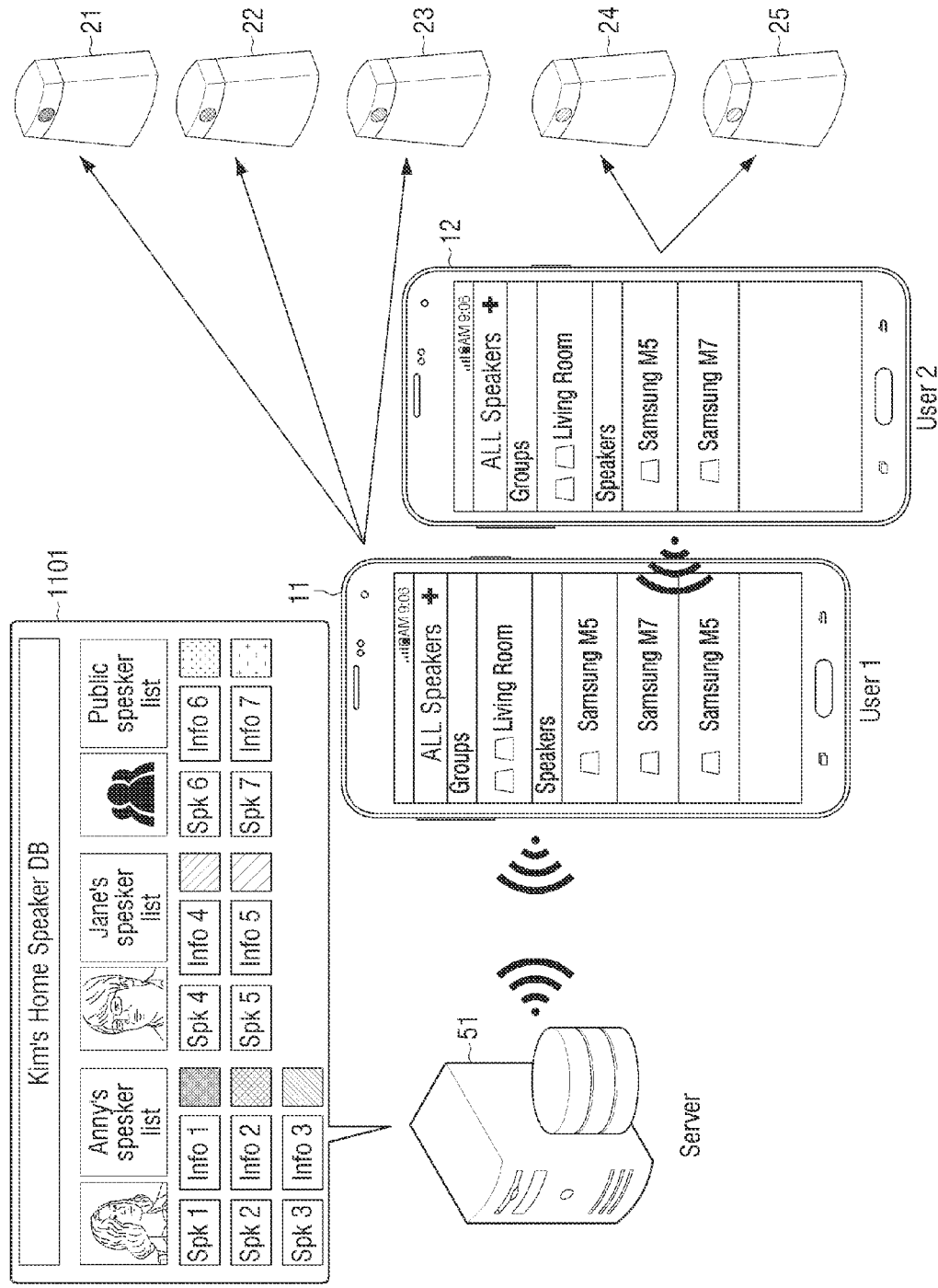

According to an embodiment of the present disclosure, referring to FIG. 11, the server 51 placed on the external area of the electronic device 100 may store the table 1101 in which the colors are mapped respectively regarding the identification information of the peripheral apparatuses 21~27. Herein, the server 51 may store the color information respectively regarding the peripheral apparatuses 21~25 which are divided per user account. When the electronic device 11 or the hub 31 is connected with one user account, the electronic device 11 or the hub 31 may acquire the color information respectively regarding the peripheral apparatuses 21~23 which are allocated to one user. In this case, the communicator 140 of the electronic device 100 or the hub 31 may transmit the color information to the peripheral apparatuses 21~23, and the emitters of the peripheral apparatuses 21~23 may emit the mapped colors based on the received color information.

Meanwhile, another electronic device 12 may be connected with another user account, and acquire the color information respectively regarding the peripheral apparatuses 24~25 which are allocated to another user. In this case, the communicator 140 of another electronic device 12 may transmit the color information to the peripheral apparatuses 24~25, and the emitters of the peripheral apparatuses 24~25 may emit the mapped colors based on the received color information.

Thereby, because the electronic devices 11, 12 and the hub 31 acquire the color information respectively regarding the peripheral apparatuses with the user account, the peripheral apparatuses 21~25 may be distinguished and used per user account.

According to an embodiment of the present disclosure, referring to FIG. 12, the peripheral apparatuses 21~24 may be opened and connected to the electrical power at operation S1210. In this case, the hub 31 may communicate with the peripheral apparatuses 21~24 placed within the network by using the NFC method (e.g., Wi-Fi) and may be connected at operation S 1220. At operation S 1230, the hub 31 may identify the number of the peripheral apparatuses 21~24 within the network. When the number of the peripheral apparatuses is at least one, the hub 31 may determine the emitting colors of the peripheral apparatuses 21~24 by using the color combination related with the number of the peripheral apparatuses 21~24 on the color combination table 1241 at operation S 1240. Further, the hub 31 may transmit the determined color information respectively regarding the peripheral apparatuses 21~24. Meanwhile, when there is no peripheral apparatus within the range of the network, the hub 31 may continue to periodically perform the searching the peripheral apparatuses.

Figure 13:
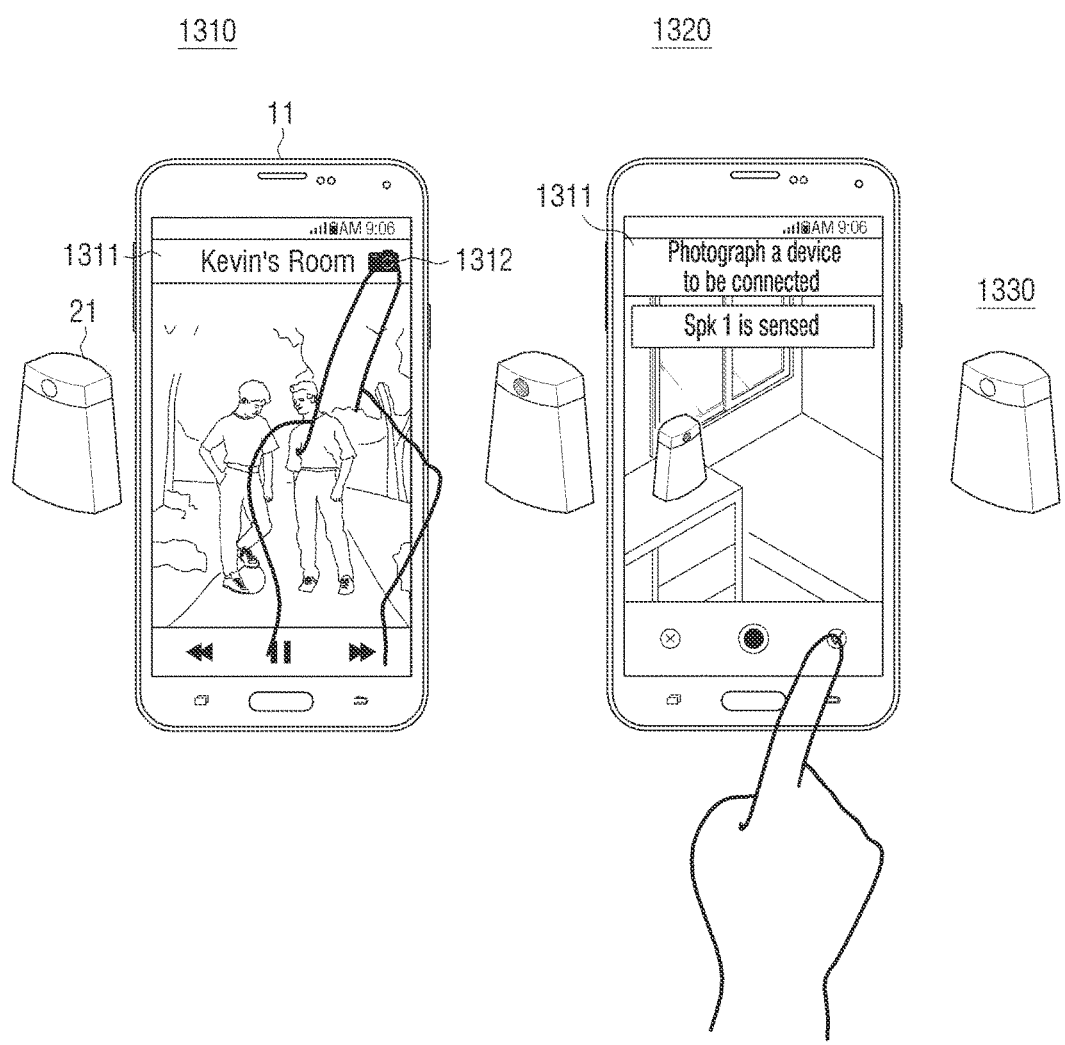

FIGS. 13 to 14 are diagrams illustrating a process in which the emitters of the peripheral apparatuses 21~2N emit the light according to various embodiments of the present disclosure.

Referring to FIG. 13, the emitter of the peripheral apparatus 21 may be turned off as in 1310 of FIG. 13. In this case, the controller 190 may control the display 130 to display the peripheral apparatus setting screen 1311. Next, the sensor 180 of the electronic device 11 may sense a user input to select the camera icon 1312 on the peripheral apparatus setting screen 1311 in order to identify the peripheral apparatus 21.

In response to the user input, the communicator 140 of the electronic device 11 may transmit a trigger signal to turn on the emitter of the peripheral apparatus 21 to the peripheral apparatus 21 or the hub 31 as in 1320 of FIG. 13. Further, the peripheral apparatus 21 receiving the trigger signal may emit the mapped color by turning on the emitter. Next, the electronic device 11 may sense a user input to photograph the emitter of the peripheral apparatus 21 by using the image acquirer 110. Herein, the state in which the emitter of the peripheral apparatus 21 is photographed may include at least one state among the state in which the electronic device 11 displays the preview image including the emitter of the peripheral apparatus 21 through the display 130, the state in which the image or the image including the emitter is temporarily stored at the storage 150, and the state in which the image or the image including the emitter of the peripheral apparatus 21 is compressed and stored in a file form at the storage 150.

When the image data regarding the emitter of the peripheral apparatus 21 is acquired or when the controller 190 acquires the identification information of the peripheral apparatus 21, the communicator 140 of the electronic device 11 may transmit a trigger signal to turn off the emitter to the peripheral apparatus 21. Thereby, the peripheral apparatus 21 receiving the trigger signal may turn off the emitter as in 1330 of FIG. 13.

Besides, the case in which the emitter of the peripheral apparatus 21 is turned on may include the case in which the peripheral apparatus setting screen 1311 is displayed, the case in which the electronic device 11 or the hub 31 is connected so as to perform the communication with the peripheral apparatus 21, and the case in which a user directly turns on the emitter through the inputter provided on the peripheral apparatus 21.

The peripheral apparatuses 21~2N may be distinguished according to the emitting colors or the blinking patterns. For example, while the number of the colors that can be emitted by the emitter is limited, when the number of the installed peripheral apparatuses 21~2N is more than a certain number (e.g., 8), the peripheral apparatus 21~2N may be distinguished by considering the blinking patterns as well as emitting colors.

Referring to FIG. 14, the peripheral apparatuses 21~24 may be grouped to each other by considering positions, model names, sizes, and images regarding the peripheral apparatuses 21~24. In FIG. 14, the peripheral apparatuses 21~24 may be distinguished into area A and area B by considering positions of the peripheral apparatuses 21~24. For example, the peripheral apparatuses 21~22 placed in the sitting room may be distinguished to be area A, and the peripheral apparatuses 23~24 placed in the main room may be distinguished to be area B.

In this case, the peripheral apparatuses 21~24 placed within the uniform areas may be mapped with the uniform emitting colors, respectively. For example, the peripheral apparatuses 21~22 placed on the area A may be mapped with the red and the peripheral apparatuses 23~24 placed on the area B may be mapped with the blue. Further, the peripheral apparatuses 21~24 within the areas having the uniform emitting colors may be distinguished with the blinking patterns which are defined with the time of 0 and 1 at one second period. Herein, 0 is about 100 ms when the short blinking is performed, and 1 is about 400 ms when the long blinking is performed.

Referring to 1410 of FIG. 14, the blinking pattern of the peripheral apparatus 21 on the area A may have 1001 pattern per one second period. Thus, the peripheral apparatus 21 may blink by 400 ms interval, blink twice per 100 ms interval, and blink again per 400 ms interval. Further, the blinking pattern of the peripheral apparatus 22 may have '0101' pattern per one second period. Thus, the peripheral apparatus 22 may blink per 100 ms interval, blink per 400 ms interval, blink per 100 ms interval, and blink again per 400 ms interval.

According to a similar method to the above, the peripheral apparatuses 23, 24 on the area B may blink according to the previously set blinking patterns as in 1420 of FIG. 14.

The table 1440 in FIG. 14 shows the blinking patterns in which the peripheral apparatuses 21~26 can be perceived and distinguished when the emitting colors of the emitters are limited to two.

For example, when the number of the peripheral apparatuses 21, 22 is two as 1431 of FIG. 14, the peripheral apparatus 21 may emit the red light with the blinking pattern '1001', and the peripheral apparatus 22 may emit the green light with the blinking pattern '1001'.

For another example, when the number of the peripheral apparatuses 21, 22, 23 is three in 1432 of FIG. 14, the peripheral apparatus 21 may emit the red light with the blinking pattern '1001', the peripheral apparatus 22 may emit the green light with the blinking pattern '1001', and the peripheral apparatus 23 may emit the red light with the blinking pattern '1101'.

For another example, when the number of the peripheral apparatuses 21, 22, 23, 24 is four in 1433 of FIG. 14, the peripheral apparatus 21 may emit the red light with the blinking pattern '1110', the peripheral apparatus 22 may emit the green light with the blinking pattern '1110', the peripheral apparatus 23 may emit the red light with the blinking pattern '0011', and the peripheral apparatus 24 may emit the green light with the blinking pattern '0101'. According to a similar method to the above, the peripheral apparatuses may be respectively perceived and distinguished with the blinking patterns of the peripheral apparatuses in 1434 and 1435 of FIG. 14.

FIGS. 15 to 18 are diagrams illustrating a process in which the electronic device identifies the peripheral apparatuses according to various embodiments of the present disclosure.

Figure 15:
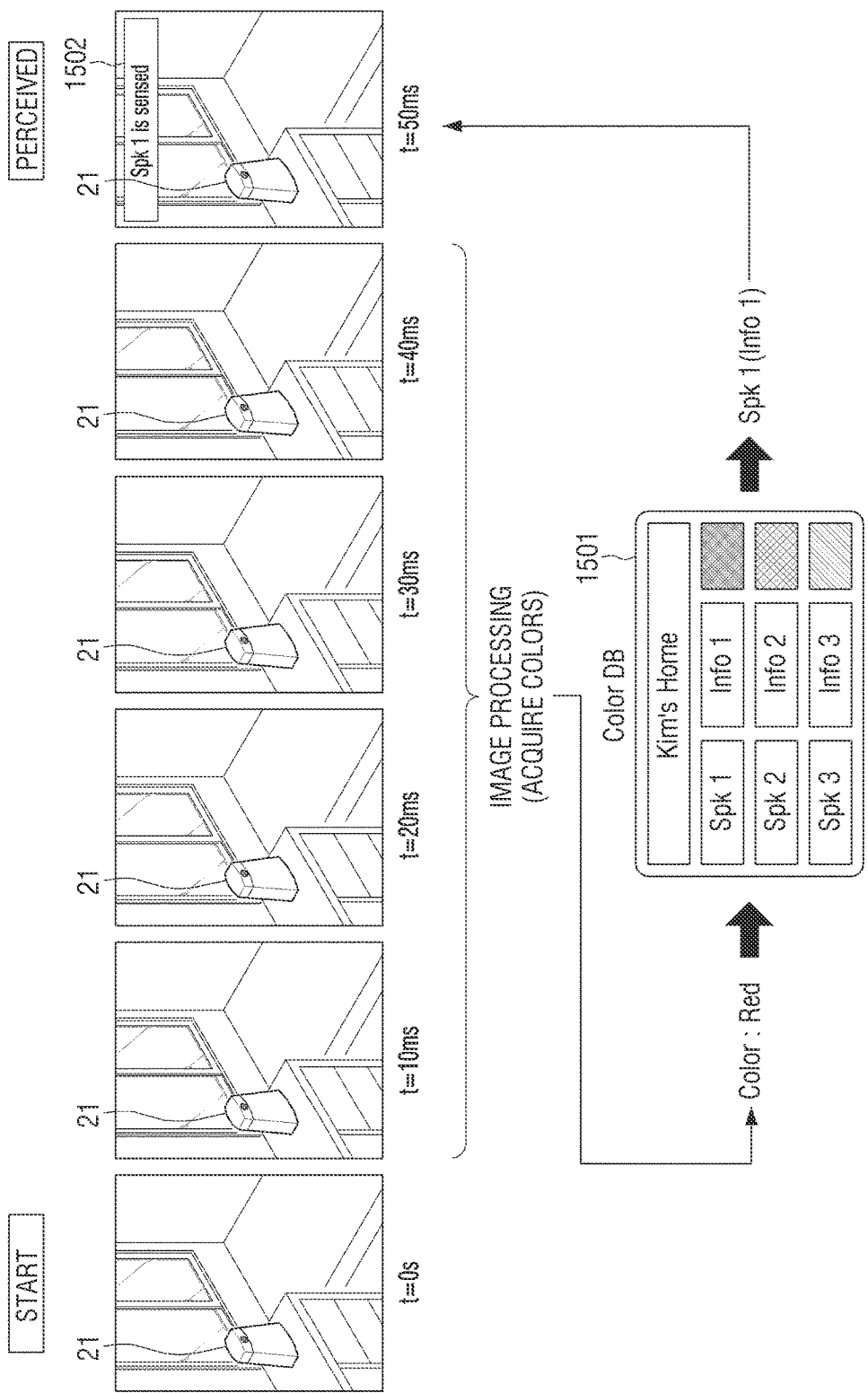
FIGS. 15, 16, 17, and 18 are diagrams illustrating a process in which an electronic device identifies the peripheral apparatuses according to various embodiments of the present disclosure.

Referring to FIG. 15, when a user photographs the emitter of the peripheral apparatus 21, the image acquirer 110 may acquire the image data regarding the emitter of the peripheral apparatus 21. For example, while the preview image including the emitter of the peripheral apparatus 21 acquired through the image acquirer 110 of the electronic device 11 is displayed on the display 130, the preview image may be temporarily stored at the storage 150 of the electronic device 11. In this case, the controller 190 may extract the area which is fast modified by being distinguished from the other areas according to the blinking of the emitter on the preview image, and determine the extracted area as emitting area of the peripheral apparatus 21. Further, the controller 190 may determine the representation color of the emitting area to be emitting color emitted from the emitter.

Next, the controller 190 may acquire the identification information of the peripheral apparatus 21 with the determined emitting color by using the table 1501 of the electronic device 11 in which the colors are mapped per identification information regarding the plurality of peripheral apparatuses. Herein, the controller 190 may identify the peripheral apparatus 21 by acquiring the identification information, and control the display 130 to display the notice information 1502 indicating that the peripheral apparatus 21 is perceived.

Next, the controller 190 may determine the adjustment values of the output data outputted from the peripheral apparatus 21, and transmit the determined adjustment values to the peripheral apparatus 21 or the hub 31 connected to the peripheral apparatus 21. Meanwhile, before the adjustment values of the output data are transmitted, input a password and reconfirming the peripheral apparatus 21 may be further added.

Figure 16:
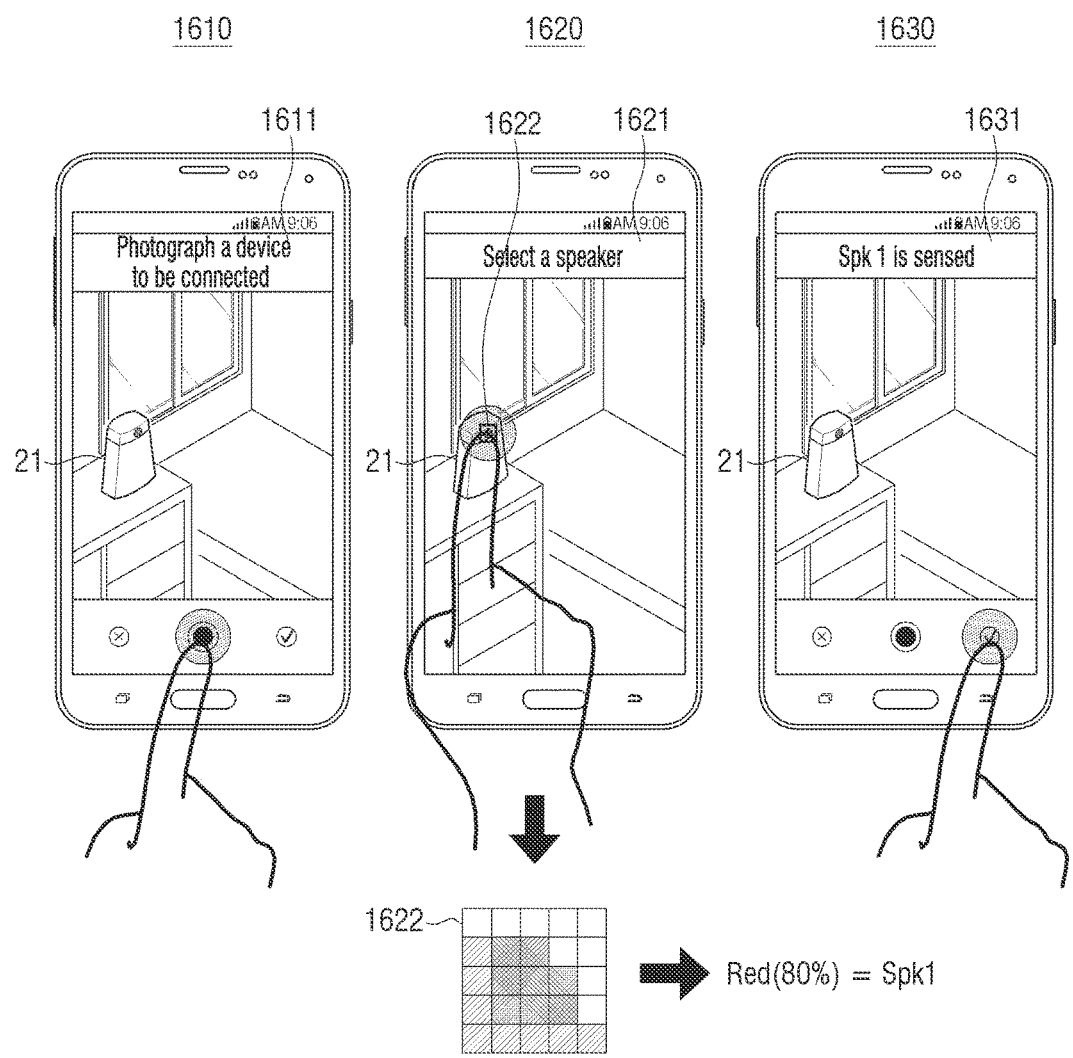

According to an embodiment of the present disclosure, referring to 1610 of FIG. 16, a user may photograph the emitter of the peripheral apparatus 21, and the image acquirer 110 may acquire the image data regarding the emitter of the peripheral apparatus 21. Herein, the guide information 1611 guiding to a user so as to photograph the emitter of the peripheral apparatus 21 may be previously displayed.

Next, referring to 1620 of FIG. 16, the sensor 180 of the electronic device 11 may sense a user input to select the emitter from the photographed image data. A user input may be input to touch the emitting area 1622, for example. Herein, the notice information 1621 guiding a user so as to touch the emitting area 1622 may be previously displayed. In response to the user input, the controller 190 may acquire the representation color on the emitting area. For example, the controller 190 may acquire the red color as representation color when about 80% of the pixels on the emitting area 1622 are red color series. Next, the controller 190 may identify the photographed peripheral apparatus by comparing the representation color with the mapped color information respectively regarding the plurality of peripheral apparatuses. Thus, the identification information of the peripheral apparatus may be acquired.

The controller 190 may identify the peripheral apparatus 21 by acquiring the identification information, and control the display 130 to display the notice information 1631 indicating that the peripheral apparatus 21 is perceived, as in 1630 of FIG. 16.

Next, the controller 190 may determine the adjustment values of the output data outputted from the peripheral apparatus 21, and transmit the determined adjustment values to the peripheral apparatus 21 or the hub 31 connected to the peripheral apparatus 21. Meanwhile, before the adjustment values of the output data are transmitted, input a password and reconfirming the peripheral apparatus 21 may be further added.

According to an embodiment of the present disclosure, may be acquired the image data regarding the emitters of the peripheral apparatuses 21~24 photographed by considering the position of the controlling device 41 (e.g., digital TV).

Figure 17:
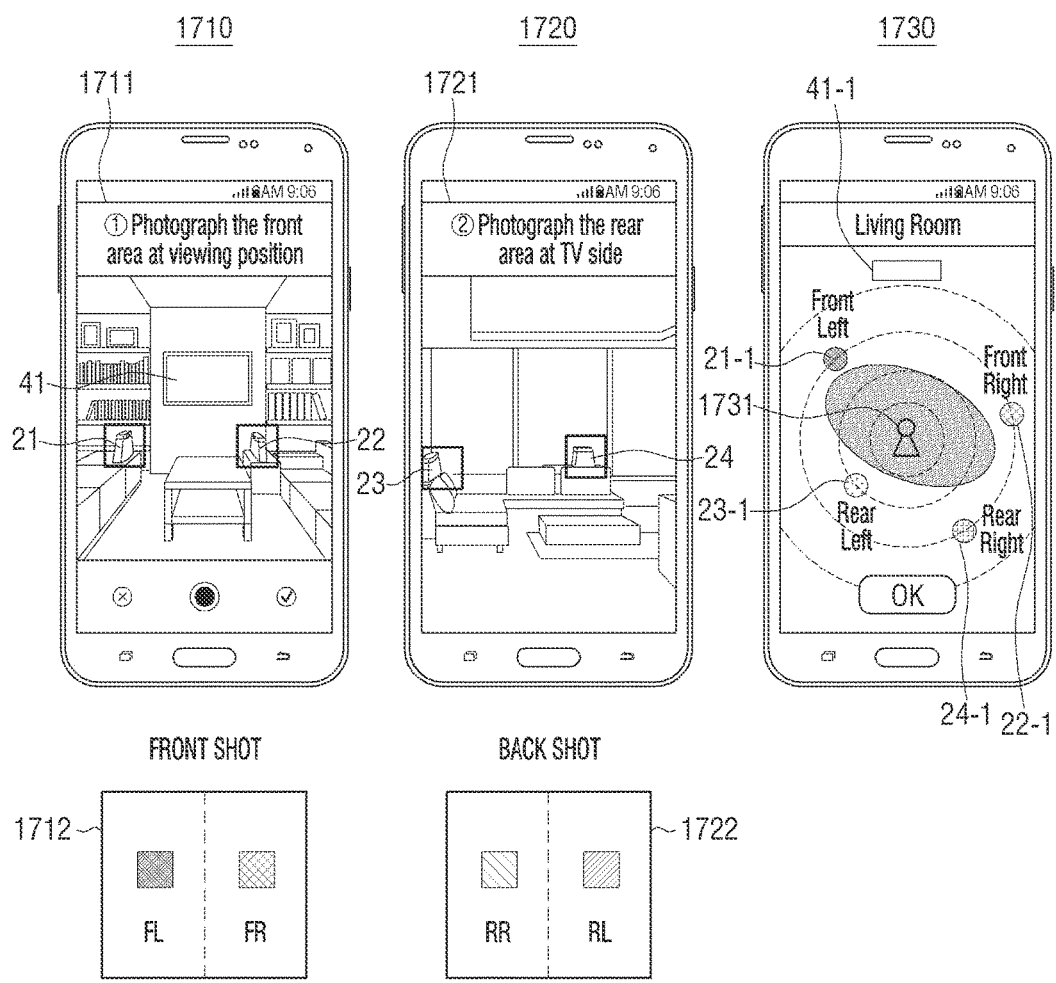

For example, referring to 1710 of FIG. 17, when a user photographs the front area of the viewing position 1731 where the controlling device 41 is viewed, the image acquirer 110 may acquire the image data 1712 regarding the emitters of the peripheral apparatuses 21~22 placed toward one direction of the controlling device 41 (e.g., front area). Herein, the controller 190 may control the display 130 to display the notice information 1711 guiding the photographing position of a user. Next, referring to 1720 of FIG. 17, when a user photographs the rear area of the viewing position 1731 where the controlling device 41 is turned back, the image acquirer 110 may acquire the image data 1722 regarding the emitters of the peripheral apparatuses 2324 placed toward one direction of the controlling device 41 (e.g., rear area). Herein, the controller 190 may control the display 130 to display the notice information 1721 guiding the photographing position of a user.

The controller 190 may acquire the relative positions of the peripheral apparatuses 21~24 based on the identification information of the peripheral apparatuses 21~24 and the controlling device 41 from the acquired image data 1712, 1722. Next, the controller 190 may provide channel information respectively to the peripheral apparatuses 21~24 (e.g., speakers) by considering the identification information and the positions of the peripheral apparatuses 21~24. For example, referring to 1730 of FIG. 17, the controller 190 may, relative to the representative information of controlling device 41-1, provide Front Left channel to the representative information 21-1 of the peripheral apparatus 21 placed on the most left side from the front area of the viewing position 1731, Front Right channel to the representative information 22-1 of the peripheral apparatus 22 placed on the most right side from the front area of the viewing position 1731, Rear Right channel to the representative information 24-1 of the peripheral apparatus 24 placed on the most left side on the rear area of the viewing position 1731, and Rear Left channel to the representative information 23-1 of the peripheral apparatus 23 placed on the most right side from the rear area of the viewing position 1731.

In this case, the positions of the representative information 21-1~24-1 regarding the peripheral apparatuses 21~24 may be further correctly determined by considering the distances or the direction angles between the controlling device 41 and the peripheral apparatuses 21~24. For the above, the directivity communication technology or the indoor positioning technology (e.g., 60 GHz directivity antenna technology and BLE technology) may be further used. The examples for using the above technologies will be specifically explained below by referring to FIGS. 19 and 20.

According to an embodiment of the present disclosure, a user may panoramic-photograph the emitters of the peripheral apparatuses 21~24 placed near to the controlling device 41. The panoramic photographing may be method for photographing the wide area of the scene by consecutively moving the image acquirer 110 from one direction to another direction.

Figure 18:
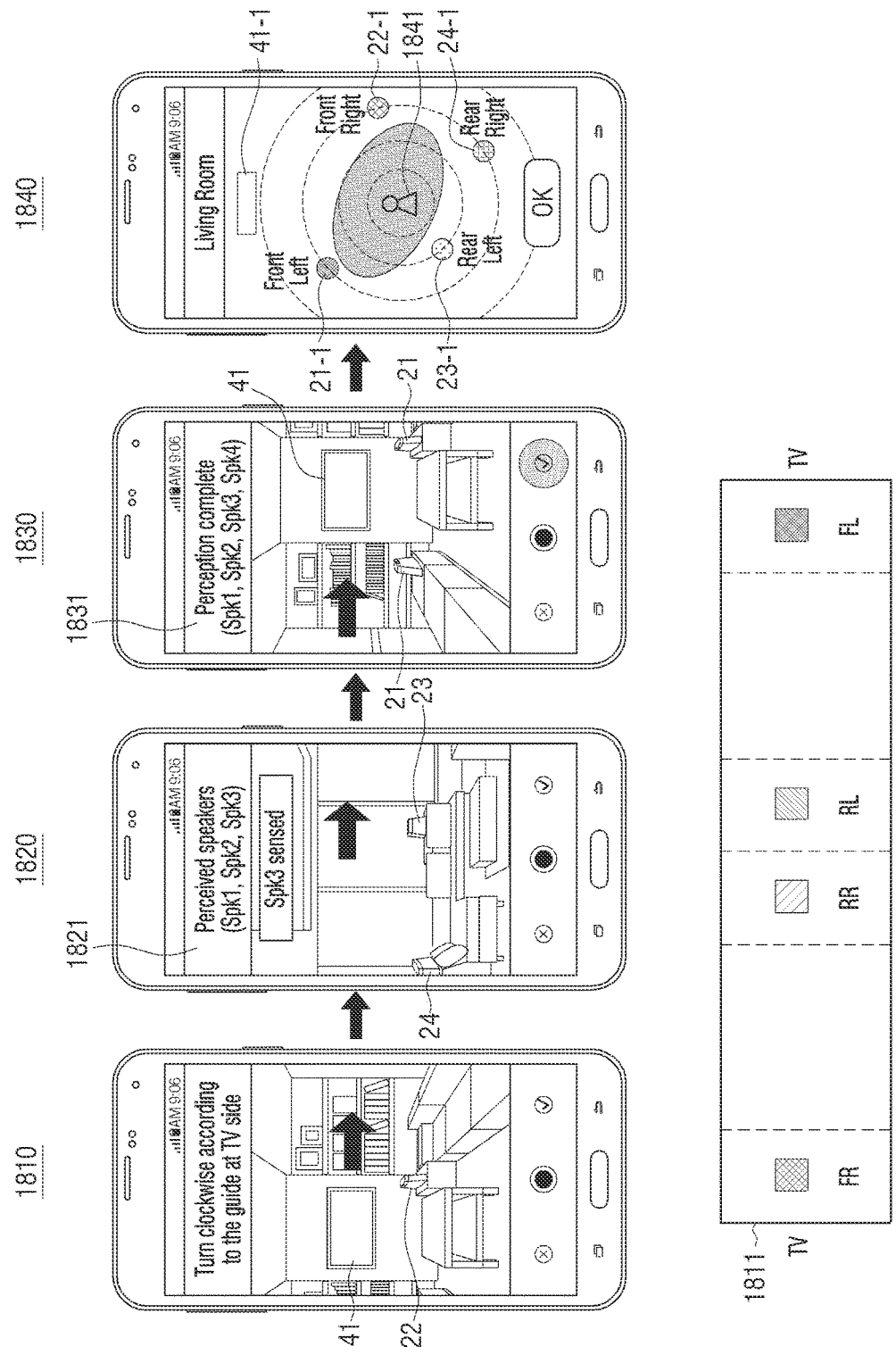

For example, referring to 1810, 1820, and 1830 of FIG. 18, a user may consecutively move the image acquirer 110 toward one direction based on the controlling device 41 for the panoramic photographing, and the image acquirer 110 may acquire the image data 1811 in which the peripheral apparatuses 21-24 are consecutively photographed. The controller 190 may determine the emitting colors emitted from the emitters of the peripheral apparatuses 21~24 from the photographed image data 1811, and acquire the identification information and the positions of the peripheral apparatuses 21~24 by using the emitting colors. In this case, whenever the peripheral apparatuses 21~24 are perceived, the controller 190 may provide the notice information 1821, 1831 indicating that the peripheral apparatuses 21~24 are perceived.

Next, the controller 190 may provide the channel information respectively to the peripheral apparatuses 21~24 by considering the identification information and the positions of the peripheral apparatuses 21~24. For example, as in 1840 of FIG. 18, the controller 190 may, relative to the representative information of controlling device 41-1, provide Front Left channel to the representative information 21-1 of the peripheral apparatus 21 placed on the most left side from the front area of the viewing position 1841 among the peripheral apparatuses 21~24, Front Right channel to the representative information 22-1 of the peripheral apparatus 22 placed on the most right side from the front area of the viewing position 1841, Rear Right channel to the representative information 24-1 of the peripheral apparatus 24 placed on the most left side from the rear area of the viewing position 1841, and Rear Left channel to the representative information 23-1 of the peripheral apparatus 23 placed on the most right side from the rear area of the viewing position 1841.

Figure 20:
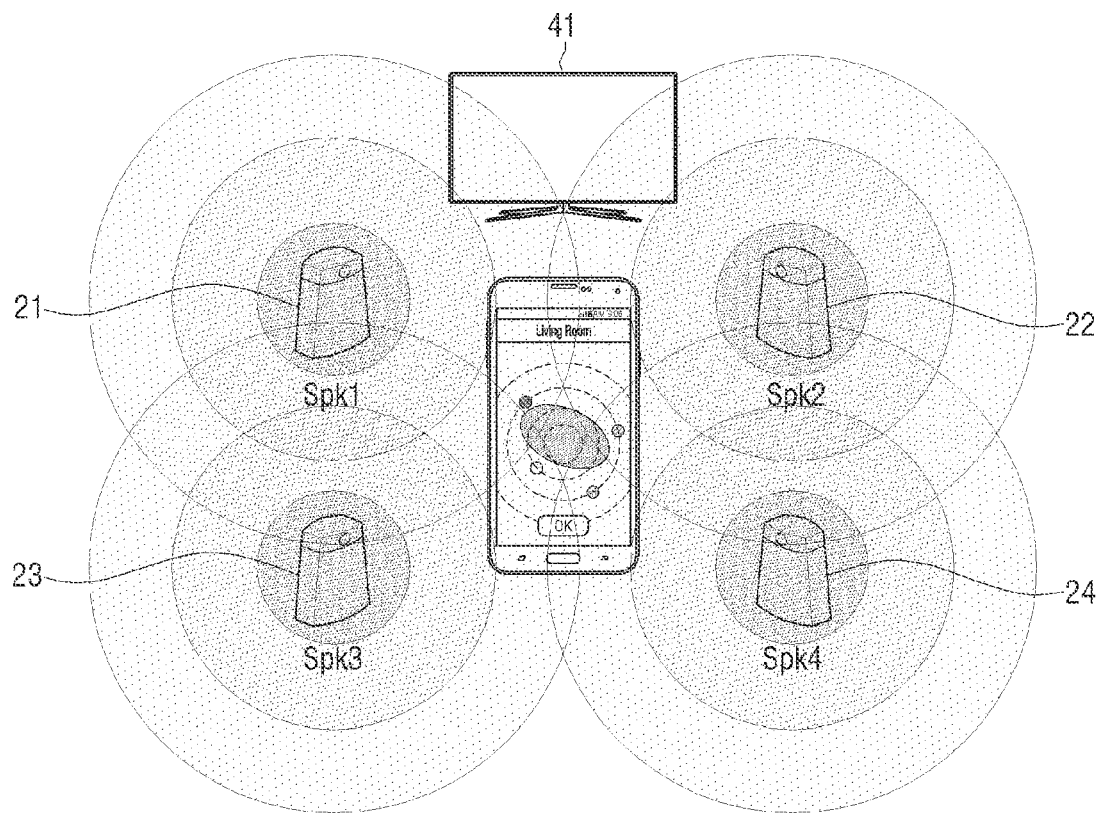

FIGS. 19 and 20 are diagrams illustrating a process in which the positions of the peripheral apparatuses are perceived according to various embodiments of the present disclosure.

Referring to 1910 of FIG. 19, the communicator 140 of the electronic device 11 may include the communication module to use the directivity communication technology (e.g., 60 GHz directivity antenna module, ultrasound technology, and (infrared (IR)). In this case, when the setting of the peripheral apparatuses is necessary, the communicator 140 of the electronic device 11 may transmit directivity signals by various angles toward the surrounded area of the electronic device 11 according to the intention or the order. In this case, the communicator 140 of the electronic device 11 may acquire response signals from the peripheral apparatuses 21~24 receiving the directivity signals. Further, the controller 190 may generate the image data 1911 by considering the direction angle between the electronic device 11 and the controlling device 41 based on the response signals and the image data in which the emitters of the peripheral apparatuses 21~24 are photographed. Next, the controller 190 may respectively provide Front Right channel to the peripheral apparatus 22 perceived near to 45°, Rear Right channel to the peripheral apparatus 23 perceived near to 160°, Rear Left channel to the peripheral apparatus 24 perceived near to 240°, and Front Left channel to the peripheral apparatus 21 perceived near to 320° based on the image data 1911 in which the direction angle is considered.

Further, referring to 1920 of FIG. 19, the controlling device 41 may include the communication module using the directivity communication technology (e.g., 60 GHz directivity antenna module, ultrasound technology, and IR). In this case, when the setting of the peripheral apparatuses is necessary, the controlling device 41 may transmit the directivity signals by various angles to the surrounded area of the controlling device 41 according to the intention or the order. The controlling device 41 may acquire the response signals from the peripheral apparatuses 21-24 receiving the directivity signals, and transmit the response signals which are divided per direction angle to the electronic device 11. Further, the electronic device 11 may directly acquire the response signals from the peripheral apparatuses 21~24 receiving the directivity signals. The controller 190 of the electronic device 11 may provide channels respectively to the peripheral apparatuses 21~24 based on the response signals which are divided per direction angle and the image data in which the emitters of the peripheral apparatuses 21~24 are photographed.

For another example, referring to FIG. 20, the communicator 140 of the electronic device 11 may include the communication module to use the indoor positioning technology (e.g., BLE technology). In this case, when the setting of the peripheral apparatuses 21~24 is necessary, the communicator 140 of the electronic device 11 may receive the beacon signals (e.g., BLE Beacon) from the peripheral apparatuses 21~24. Further, the controller 190 of the electronic device 11 may determine the distances between the electronic device 11 and the peripheral apparatuses 21~24 based on the intensity of the beacon signals transmitted from the peripheral apparatuses 21~24 and the identification information of the peripheral apparatuses 21~24 included in the beacon signals.

For example, as illustrated in 2001 of FIG. 20, the controller 190 may determine the distances between the electronic device 11 and the peripheral apparatuses 21~24 by using the table values including the estimated distance values according to the intensity of the beacon signals.

For another example, the communicators of the peripheral apparatuses may include the communication module to use the directivity communication technology or the indoor positioning technology. In this case, when the setting of the peripheral apparatuses 21~24 is necessary, the communicators of the peripheral apparatuses may determine the distances between the electronic device 11 or the controlling device 41 and the peripheral apparatuses 21~24, and transmit the determined values to the electronic device 11.

Figure 21:
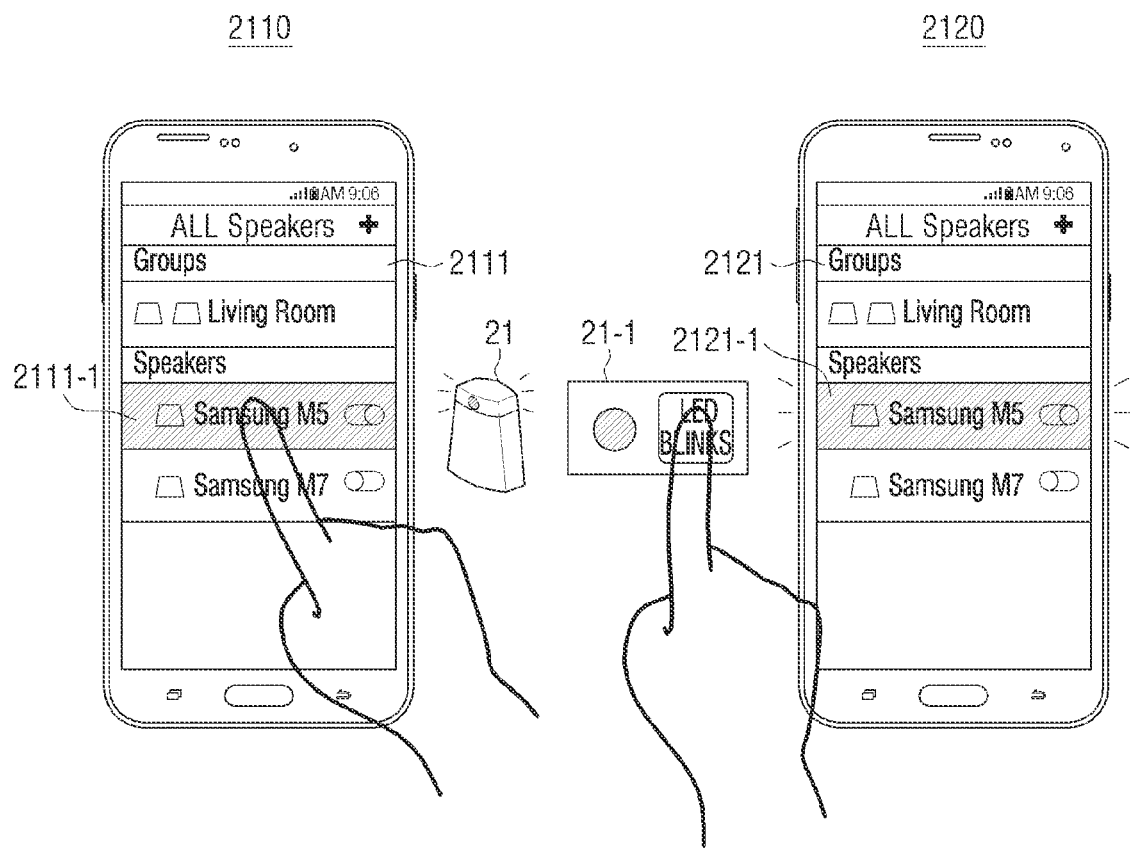
FIG. 21 is a diagram illustrating a method for confirming the perceived peripheral apparatuses according to an embodiment of the present disclosure.

FIG. 21 is a diagram illustrating a method in which the perceived peripheral apparatuses 21~2N are confirmed according to an embodiment of the present disclosure.

Referring to 2110 of FIG. 21, the controller 190 may control the display 130 to display the peripheral apparatus setting screen 2111 including the peripheral apparatus list in which the emitting colors are mapped. Herein, the representative information 2111-1 representing the peripheral apparatus included in the peripheral apparatus list (e.g., field including the peripheral apparatus information, and image or text representing the peripheral apparatus) may be expressed with the color related with the emitting color (e.g., emitting color or the similar color to the emitting color). In this case, when a user selects the representative information 2111-1 of one peripheral apparatus 21 on the peripheral apparatus list, the controller 190 may control the communicator 140 to transmit a signal to control the emitter of the peripheral apparatus (e.g., signal to blink the emitter) to one peripheral apparatus 21 or the hub 31 that can communicate with one peripheral apparatus 21 in response to a user input to select the representative information 2111-1.

The emitter of the peripheral apparatus 21 may emit the mapped color. Meanwhile, when the emitting color is mapped with the blinking pattern in the peripheral apparatus 21, the emitter of the peripheral apparatus 21 may emit the mapped emitting color according to the blinking pattern.

Further, referring to 2120 of FIG. 21, the controller 190 may control the display 130 to display the peripheral apparatus setting screen 2121 including the peripheral apparatus list in which the emitting colors are mapped. In this case, a user may select a user inputter 21-1 (e.g., LED blinking button) to operate the emitter of the peripheral apparatus 21. When a user inputter is selected, the peripheral apparatus 21 may transmit a signal indicating that the emitter of the peripheral apparatus is blinking to the electronic device 11. In response to the above signal, the controller 190 may control the display 130 to display the representative information 2121-1 representing the peripheral apparatus 21 of which the user inputter is selected on the peripheral apparatus list (e.g., field including the peripheral apparatus information, and image or text representing the peripheral apparatus) with the color related with the emitting color (e.g., emitting color or similar color to the emitting color). Herein, the representative information 2121-1 representing the peripheral apparatus 21 may blink with the emitting color and may be displayed. Otherwise, the representative information 2121-1 of the peripheral apparatus 21 and the emitter of the peripheral apparatus may simultaneously blink with the emitting color and may be displayed.

According to the above method, a user can intuitively confirm the peripheral apparatuses to be connected when a user moves into another place and manipulates the peripheral apparatuses, when a user using the peripheral apparatuses is changed, or when the peripheral apparatuses are used again after a long time. Thus, because the representative information representing the peripheral apparatuses and the peripheral apparatuses are simultaneously displayed with the uniform colors or the uniform blinking patterns on the electronic device manipulated by a user, a user can easily confirm the peripheral apparatuses to be connected.

FIGS. 22 to 28 are diagrams illustrating a method in which the perceived peripheral apparatuses 21~2N are set according to various embodiments of the present disclosure.

Figure 22:
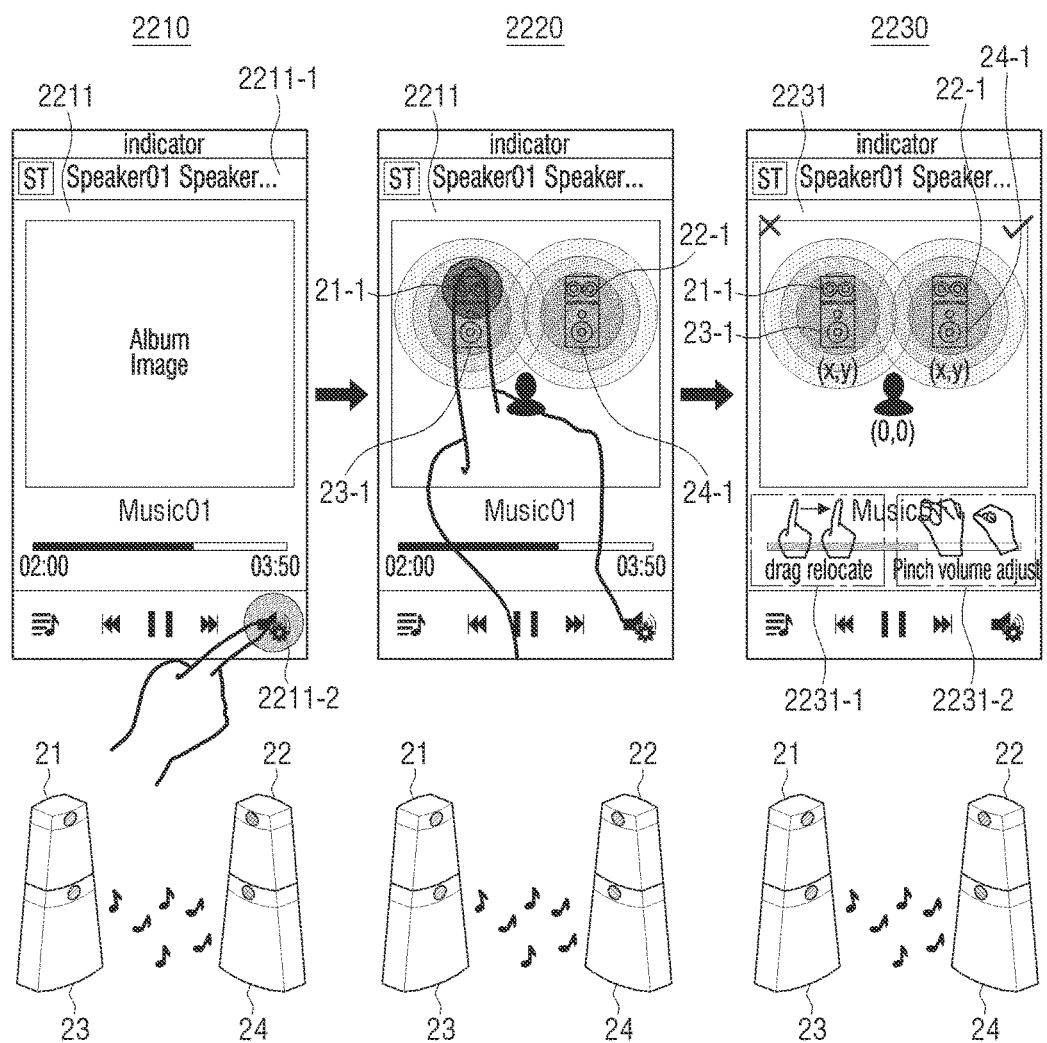

Referring to 2210 of FIG. 22, the controller 190 may control the display 130 to display the content playing screen 2211 by implementing the content playing application. Herein, the content playing screen may display information regarding the currently played content and the information 2211-1 regarding the peripheral apparatus to output the content. In this case, the sensor 180 may sense a user input to select the peripheral apparatus setting UI element 2211-2.

In response to the user input, referring to 2220 of FIG. 22, the controller 190 may control the display 130 to display the peripheral apparatus setting screen 2221. Thereby, the content playing application providing the peripheral apparatus setting screen 2221 may be one example of the peripheral apparatus setting application. The peripheral apparatus setting screen 2221 may display the representative information 21-1~24-1 representing the peripheral apparatuses 21~24 to play the content on the coordinate system. Herein, the representative information 21-1~24-1 of the peripheral apparatuses 21~24 may be displayed on the relative positions between the peripheral apparatuses 21~24 instead of the absolute positions. For example, the representative information 21-1~24-1 of the peripheral apparatuses 21~24 may be displayed on the positions corresponding to the directions respectively by considering the relative directions such as front/back/left/right directions between the peripheral apparatuses 21~24.

For example, referring to 2220 of FIG. 22, the peripheral apparatuses 21~24 may be grouped per two items and may output the sounds as two channels of the speakers. Herein, the emitters of the peripheral apparatuses 21~24 within the uniform groups may emit the uniform colors.

The peripheral apparatus setting screen 2221 may display the setting information of the peripheral apparatuses 21~24 together. For example, the positions respectively regarding the representative information 21-1~24-1 of the peripheral apparatuses 21~24 may be roughly displayed for the actual positions of the peripheral apparatuses 21~24 on the peripheral apparatus setting screen 2221. Further, the number of the circle lines surrounding the representative information 21-1~24-1 of the peripheral apparatuses 21~24 or the volume size of the sounds outputted form the peripheral apparatuses 21~24 (e.g., speakers) may be roughly displayed. Next, the sensor 180 of the electronic device 11 may sense a user input to select the representative information 21-1 of at least one peripheral apparatus 21 among the representative information 21-1~24-1 of the peripheral apparatuses 21~24.

In response to the user input, referring to 2230 of FIG. 22, the controller 190 may control the display 130 to display the guide information 2231-1, 2231-2 in which the peripheral apparatus 21 corresponding to the selected representative information 21-1 can be set. The guide information 2231-1, 2231-2 may be information guiding so that gestures to touch and drag the representative information 21-1 and pinch in or pinch out the representative information 21-1 can be performed. In this case, when a user touches and drags the representative information 21-1, the controller 190 may provide the adjustment values of the output data from the peripheral apparatus 21 to the peripheral apparatus 21 so that a user can recognize that the actual position of the peripheral apparatus 21 is modified. Further, when a user performs the pinch-in or the pinch-out gestures on the representative information 21-1, the controller 190 may provide the adjustment values of the output data which modify the volume size of the sounds in the peripheral apparatus 21 to the peripheral apparatus 21.

Figure 23:
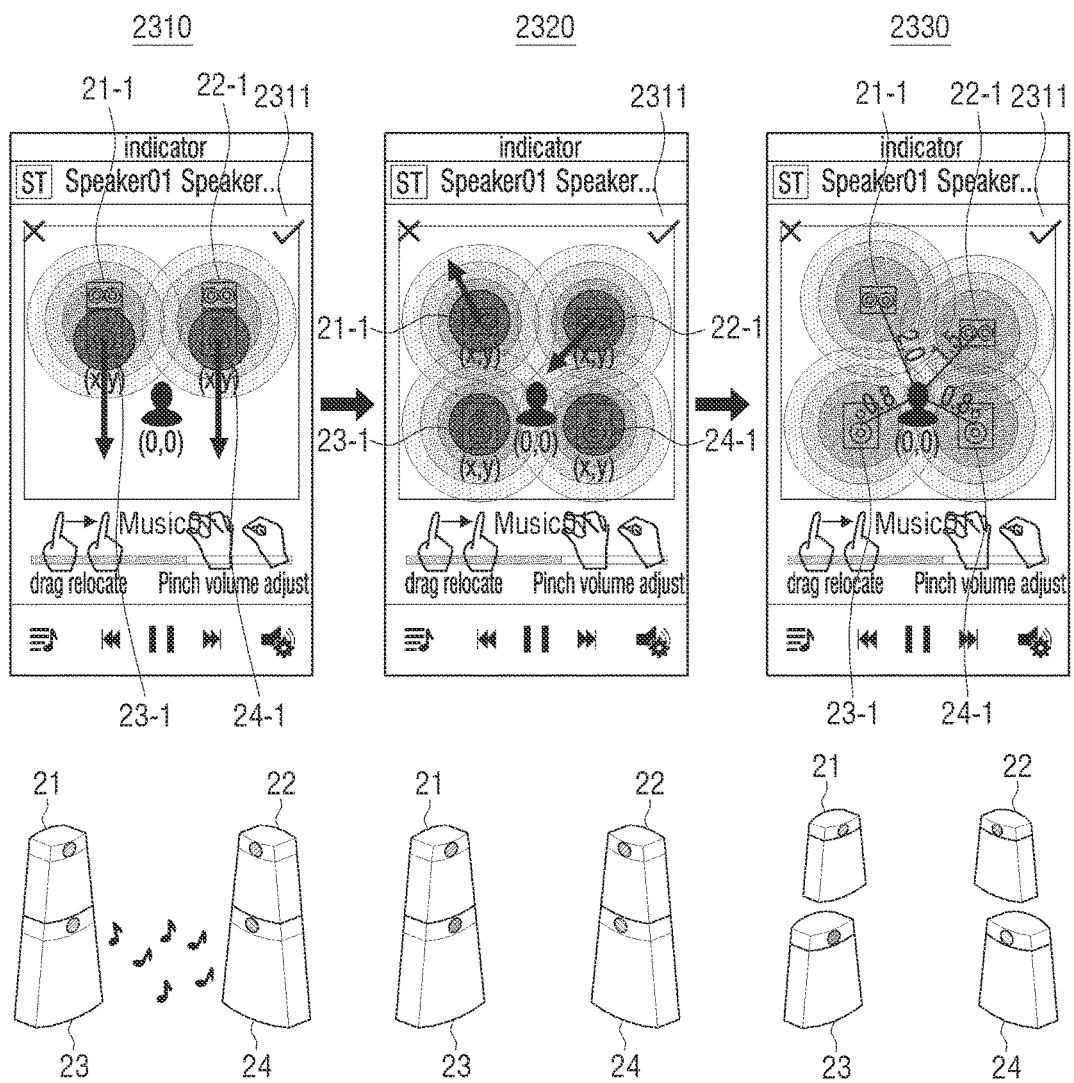

Referring to 2310 of FIG. 23, while the representative information 21-1-24-1 of the peripheral apparatuses 21~24 (e.g., images of the peripheral apparatuses) are displayed on the coordinate system, the sensor 180 of the electronic device 11 may sense a user input to select at least one representative information 23-1, 24-1 representing the peripheral apparatuses 23, 24. For example, the sensor 180 may sense a user input to touch and drag the representative information 23-1-24-1. Herein, a user input may be performed simultaneously or consecutively on all of the representative information 23-1, 24-1.

In response to the user input, referring to 2320 of FIG. 23, the controller 190 may control the display 130 to move and display the position of the representative information 23-1 so that the grouped representative information 21-1 can be separated from the representative information 23-1. Further, the controller 190 may control the display 130 to move and display the position of the representative information 24-1 so that the grouped representative information 22-1 can be separated from the representative information 24-1. Thereby, because the grouped representative information 21-1~24-1 are respectively separated, the peripheral apparatuses 21~24 may output the sounds as four channels of the speakers. Herein, the emitters of the peripheral apparatuses 21~24 may respectively emit the different colors to each other, and at least one among the volume size, the sound bandwidths, and the sound output times regarding the sounds outputted from the peripheral apparatuses 21~24 may be modified. Next, the sensor 180 may sense a user input to select the representative information 21-1~22-1. For example, the sensor 180 may sense a user input to touch and drag the representative information 21-1~22-1. Herein, a user input may be performed simultaneously or consecutively on all of the representative information 21-1~22-1.

In response to the user input, referring to 2330 of FIG. 23, the controller 190 may respectively move the positions of the representative information 21-1~22-1. At least one among the volume size, the sound bandwidths, and the sound output times regarding the sounds outputted form the peripheral apparatuses 21~24 may be modified by considering the moved positions. Thereby, the setting of the peripheral apparatuses can be easily adjusted according to a user input through the peripheral apparatus setting screen 2311. Further, the sounds of the peripheral apparatuses 21~24 may be rendered at real time with a user input on the representative information 21-1~24-1 representing the peripheral apparatuses 21~24.

For another example, referring to 2410 of FIG. 24, while the representative information 21-1~24-1 representing the peripheral apparatuses 21~24 (e.g., images of the peripheral apparatuses) are displayed on the coordinate system, the sensor 180 of the electronic device 11 may sense a user input to select at least one representative information 22-1, 24-1 representing the peripheral apparatuses 22, 24. For example, the sensor 180 may sense a user input to perform the multi touch and drag so that the representative information 22-1 and the representative information 24-1 can contact with each other, or a user input to touch and drag so that the representative information 22-1 can move toward the direction of the representative information 24-1.

In response to the user input, referring to 2420 of FIG. 24, the controller 190 may control the display 130 to group and display the representative information 22-1 and the representative information 24-1. Thereby, the peripheral apparatuses 21~24 may output the sounds as three channels of the speakers. Further, the grouped peripheral apparatuses 22, 24 may have the uniform emitting color or may output the data with the uniform setting value.

Figure 25:
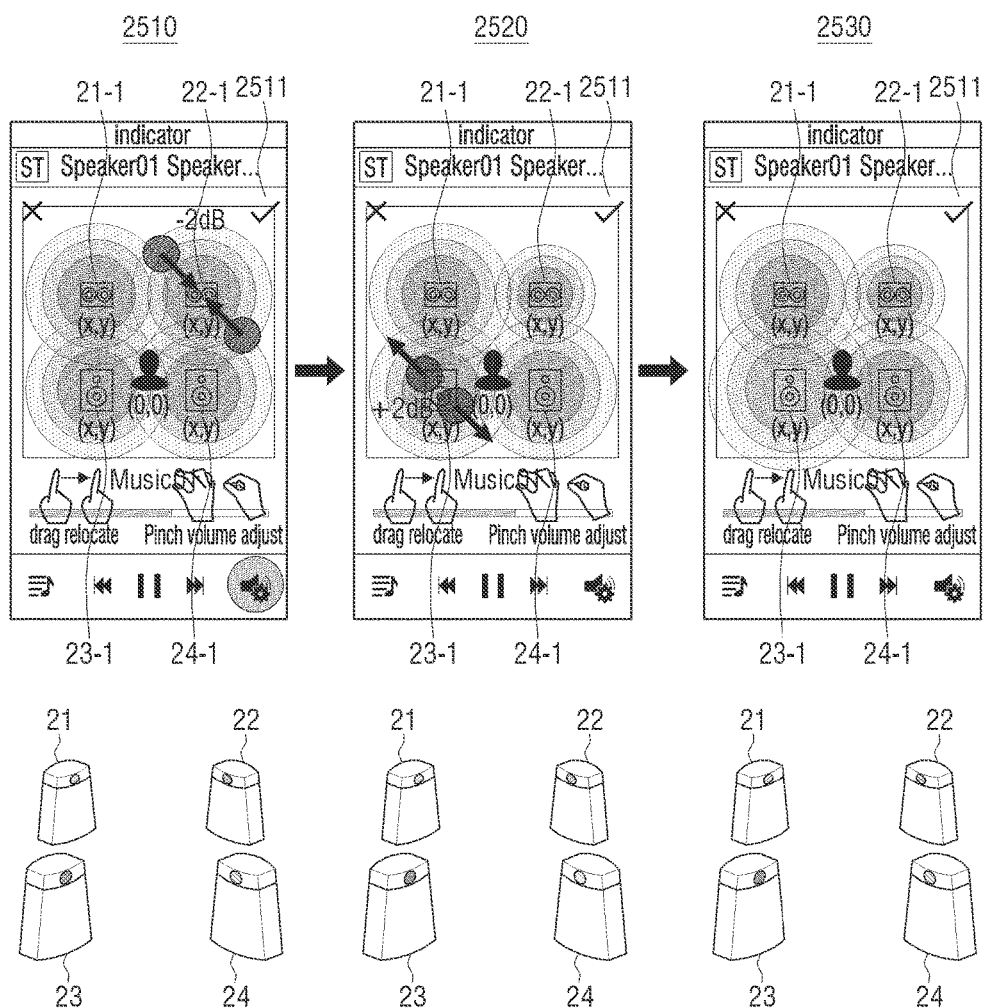

According to an embodiment of the present disclosure, referring to 2510 of FIG. 25, while the representative information 21-1~24-1 representing the peripheral apparatuses 21~24 (e.g., images of the peripheral apparatuses) are displayed on the coordinate system, the sensor 180 of the electronic device 11 may sense a user input to pinch in toward the circle line surrounding the representative information 22-1. Herein, the size of the circle line may indicate the volume size of the sounds outputted from the peripheral apparatus 22. For example, the size of the circle line may be proportional to the volume size of the sounds.

Referring to 2520 of FIG. 25, in response to the user input to pinch in, the controller 190 may control the display 130 to reduce the size of the circle line surrounding the representative information 22-1 and display the reduced size. Further, the controller 190 may control the communicator 140 to transmit the adjustment values setting so that the volume size of the sounds outputted from the peripheral apparatus 22 can be smaller to the peripheral apparatus 22 by considering the size of the circle line.

Next, the sensor 180 of the electronic device 11 may sense a user input to pinch out toward the circle line surrounding the representative information 23-1.

Referring to 2530 of FIG. 25, in response to the user input, the controller 190 may control the display 130 to expand the size of the circle line surrounding the representative information 23-1 and display the expanded size. Further, the controller 190 may control the communicator 180 to transmit the adjustment values setting so that the volume size of the sounds outputted from the peripheral apparatus 23 can be greater to the peripheral apparatus 23 by considering the size of the circle line.

Thereby, a user can intuitively and finely adjust the volume size of the sounds in the peripheral apparatuses 21~24 by performing a user input toward the representative information 21-1~24-1 representing the peripheral apparatuses 21~24 on the peripheral apparatus setting screen 2511. Further, because the size or the shape of the graphic such as circle line is modified according to the volume size, a user can confirm the volume state of the sounds in the peripheral apparatuses 21~24 at real time.

Figure 26:
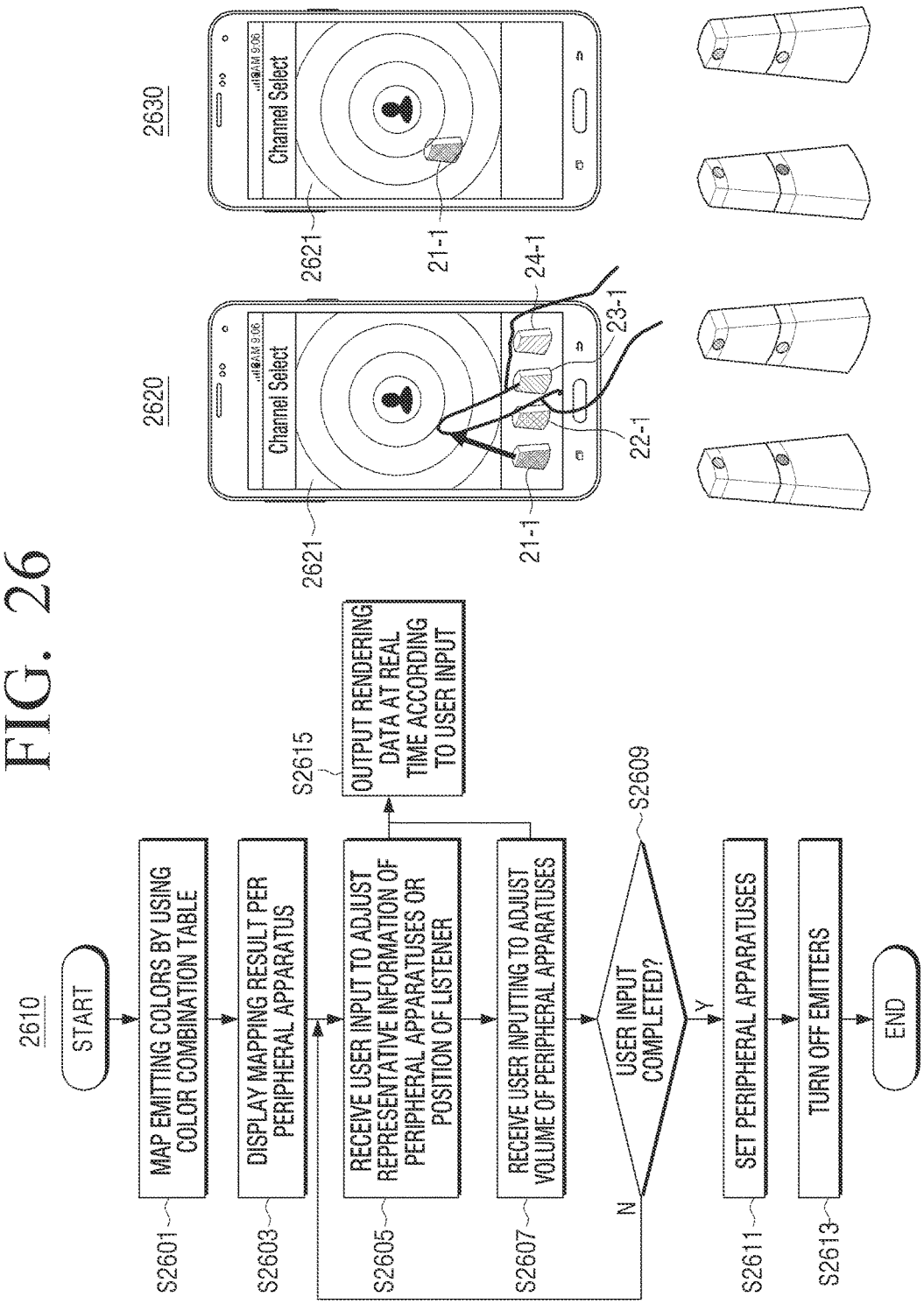

According to an embodiment of the present disclosure, referring to 2610 of FIG. 26, the controller 190 may perform the color coding to map the emitting colors per identification information of the peripheral apparatuses 21~24 by using the color combination table at operation S2601. As a result of the color coding in 2620 of FIG. 26, the controller 190 may control the display 130 to display the peripheral apparatus setting screen 2621 including the representative information 21-1~24-1 representing the peripheral apparatuses 21~24 at operation S2603. Herein, the peripheral apparatus setting screen 2621 may display the emitting colors emitted from the emitters of the peripheral apparatuses 21~24 and the colors of the representative information 21-1~24-1 representing the peripheral apparatuses 21~24 to be uniform or similar. Next, the sensor 180 may receive a user input to adjust at least one position of the representative information 21-1~24-1 or the position of a listener at operation S2605.

In response to the user input, referring to 2630 of FIG. 26, the controller 190 may control the display 130 to move and display at least one among the position of the representative information 21-1 and the position of a listener.

Next, the controller 190 may receive a user input to adjust the volume size of at least one among the peripheral apparatuses 21~24 at operation S2607. A user input to adjust the volume size may be user input to expand the representative information 21-1 representing the peripheral apparatus 21 or the circle line surrounding the representative information 21-1.

Next, the controller 190 may determine whether a user input to set the peripheral apparatuses 21~24 completed or not at operation S2609. For example, when a user input to select a button completing the setting of the peripheral apparatuses 21~24 is received through the sensor 180, the controller 190 may determine that a user input to set the peripheral apparatuses 21~24 completed. When a user input completed at operation S2609-Y, the controller 190 may transmit the adjustment values to adjust the output data of the peripheral apparatus 21 to the peripheral apparatus 21 or the hub 31. In response to the received adjustment values, the peripheral apparatus 21 may set the output data of the peripheral apparatus 21 to be modified at operation S2611. At operation S2613, the peripheral apparatus 21 may turn off the emitter. Meanwhile, when a user input does not complete at operation S2609-N, the controller 190 may continue to receive a user input toward the representative information 21-1 on the peripheral apparatus setting screen 2621 until a user input completed.

Meanwhile, before the setting of the peripheral apparatuses 21~24 completed, the controller 190 may transmit the adjustment values to adjust the output data of the peripheral apparatuses 21~24 to the peripheral apparatus 21 or the hub 31 at real time in response to the user input. In this case, the peripheral apparatuses 21~24 may output the data which are rendered at real time according to a user input at operation S2615.

According to an embodiment of the present disclosure, referring to 2710 of FIG. 27, the controller 190 may control the display 130 to display the peripheral apparatus setting screen 2711 including the peripheral apparatus list. Herein, the peripheral apparatus list may be displayed by being divided per at least one group. For example, the first group 2711-1 may include the first peripheral apparatus 21 and the second peripheral apparatus 22, and the second group 2711-2 may include the third peripheral apparatus 23 and the fourth peripheral apparatus 24. In this case, the peripheral apparatuses 21~24 within the uniform groups may provide the uniform output data. Further, the emitters of the peripheral apparatuses 21~24 included within the uniform groups may display the uniform colors. Thereby, because the peripheral apparatuses 21-24 are grouped, various forms of the multi room mode may be provided. Various embodiments of the present disclosure regarding the multi room mode will be described below.

While the grouped peripheral apparatus list is displayed, the sensor 180 may sense a user input to select the first group 2711-1.

In response to the user input, referring to 2720 of FIG. 27, the controller 190 may control the display 130 to display the list of the peripheral apparatuses 21, 22 included in the first group. Further, the field related with the second group 2711-2 may be moved toward the lower and displayed.

Figure 28:
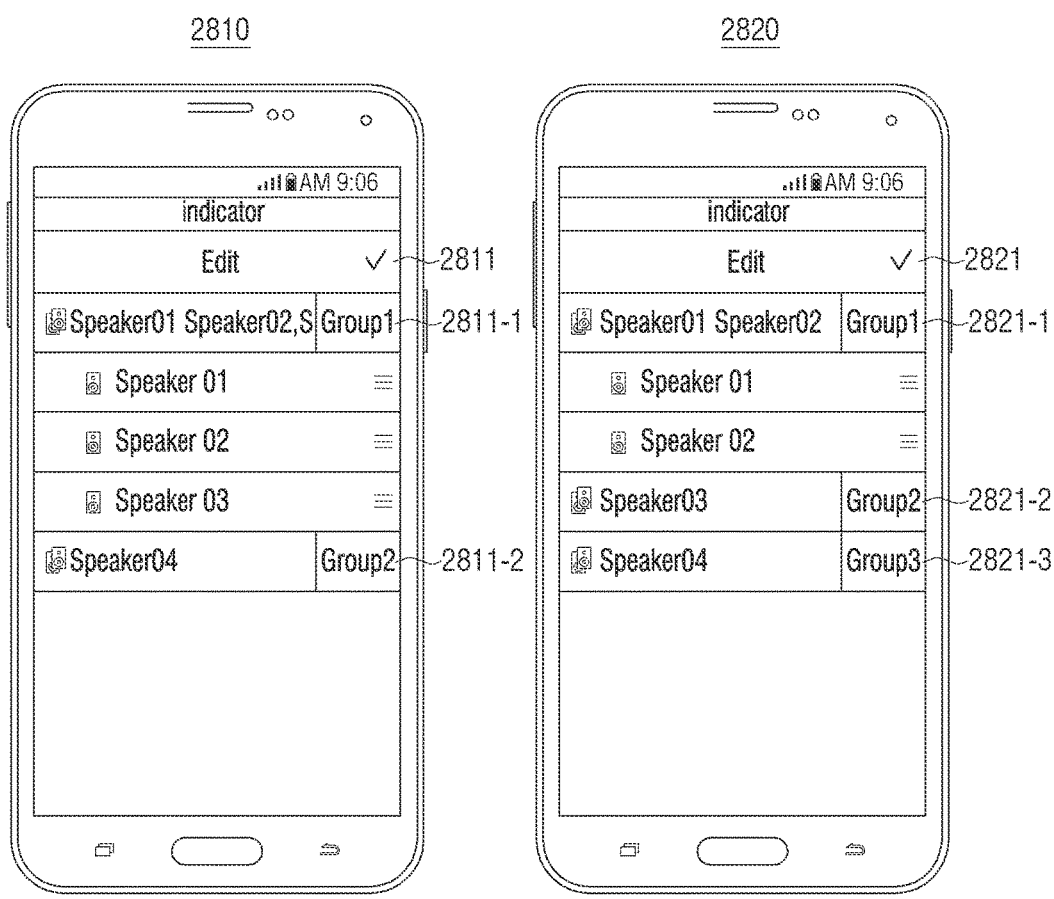

According to an embodiment of the present disclosure, referring to 2810 of FIG. 28, the controller 190 may control the display 130 to display the peripheral apparatus setting screen 2811 including the peripheral apparatus list in which the peripheral apparatuses are divided per at least one group. For example, the first group 2811-1 may include the first peripheral apparatus 21, the second peripheral apparatus 22, and the third peripheral apparatus 23, and the second group 2811-2 may include the fourth peripheral apparatus 24. In this case, the peripheral apparatuses 21~24 within the uniform groups may provide the uniform output data. Further, the emitters of the peripheral apparatuses 21~24 within the uniform groups may display the uniform colors.

According to an embodiment of the present disclosure, referring to 2820 of FIG. 28, the controller 190 may control the display 130 to display the peripheral apparatus setting screen 2821 including the peripheral apparatus list in which the peripheral apparatuses are divided per at least one group. For example, the first group 2821-1 may include the first peripheral apparatus 21 and the second peripheral apparatus 22, the second group 2821-2 may include the third peripheral apparatus 23, and the third group 2821-3 may include the fourth peripheral apparatus 24. In this case, the emitters of the peripheral apparatuses 21~22 included within the first group may emit the first color (e.g., the red), the emitter of the peripheral apparatus 23 included within the second group may emit the second color (e.g., the green), and the emitter of the peripheral apparatus 24 included within the third group may emit the third color (e.g., the yellow).

Figure 29:
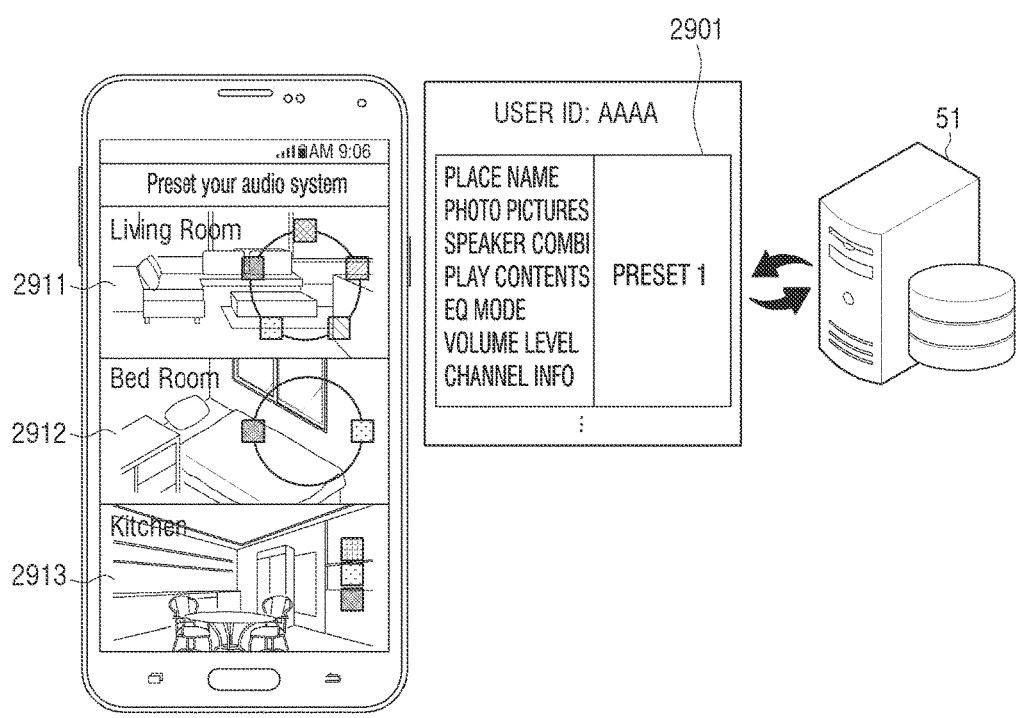
FIG. 29 is a diagram illustrating a method for storing the information of setting the peripheral apparatuses in a preset according to an embodiment of the present disclosure.

FIG. 29 is a diagram illustrating a method in which the information of setting the peripheral apparatuses are stored as preset form according to an embodiment of the present disclosure.

Herein, the preset 2901 may be data in which the information of setting the peripheral apparatuses with the various data structures such as predetermined table, connecting list, or stack form are recorded.

Referring to FIG. 29, the controller 190 may generate the preset 2901 based on the setting records of the peripheral apparatuses. The peripheral apparatus setting information included in the preset 2901 may be at least one among a place name in which at least one peripheral apparatus is set, the image data in which at least one peripheral apparatus is photographed, the relation information between the peripheral apparatuses, the content information outputted through at least one peripheral apparatus (e.g., the content outputted recently), the equalizer mode of the output content, the volume information of the sounds recently outputted from at least one peripheral apparatus and the channel information allocated to at least one peripheral apparatus.

The preset data including the peripheral apparatus setting information may be divided per user, setting time, or setting place (e.g., living room 2911, bed room 2912, and kitchen 2913) and stored. The preset including the peripheral apparatus setting information may be stored at the server 51. Meanwhile, a user may modify the part of the peripheral apparatus setting information included in the preset. In this case, the electronic device 11 and the server 51 may be synchronized, and the peripheral apparatus setting information of the preset stored at the server 51 may be automatically modified.

Further, when a third party acquires the preset, at least one among the peripheral apparatus setting information included in the preset may be provided to a third party as separate UI element. In this case, when a third party selects UI element, the electronic device 11 of a third party may adjust the output data values of the peripheral apparatuses 21~2N near to the electronic device 11 of a third party based on the peripheral apparatus setting values corresponding to UI element.

For example, when the channel information, the equalizer mode and the volume information of the sounds are provided as UI elements and when a user selects UI elements, the electronic device 11 of a third party may adjust the output data values of the peripheral apparatuses 21~2N with the setting values corresponding to the channel information, the equalizer mode and the volume information of the sounds among the peripheral apparatuses setting values included in the preset.

Further, when the preset that can be provided to a user are plural, the controller 190 may control the display 130 to arrange and display the preset. Herein, the standard to arrange the preset may be executed by considering the recently used time, the alphabetical order of the place names, or the favorite registration of a user.

Thereby, the information of setting the peripheral apparatuses 21~2N may be maintained in the preset form in the server 51 or the storage 150. Thus, when a user wants to sense the past experience acquired through the peripheral apparatuses 21~2N, a user can easily re-set the peripheral apparatuses with the peripheral apparatus setting information values included in the preset by calling the stored preset.

Figure 30:
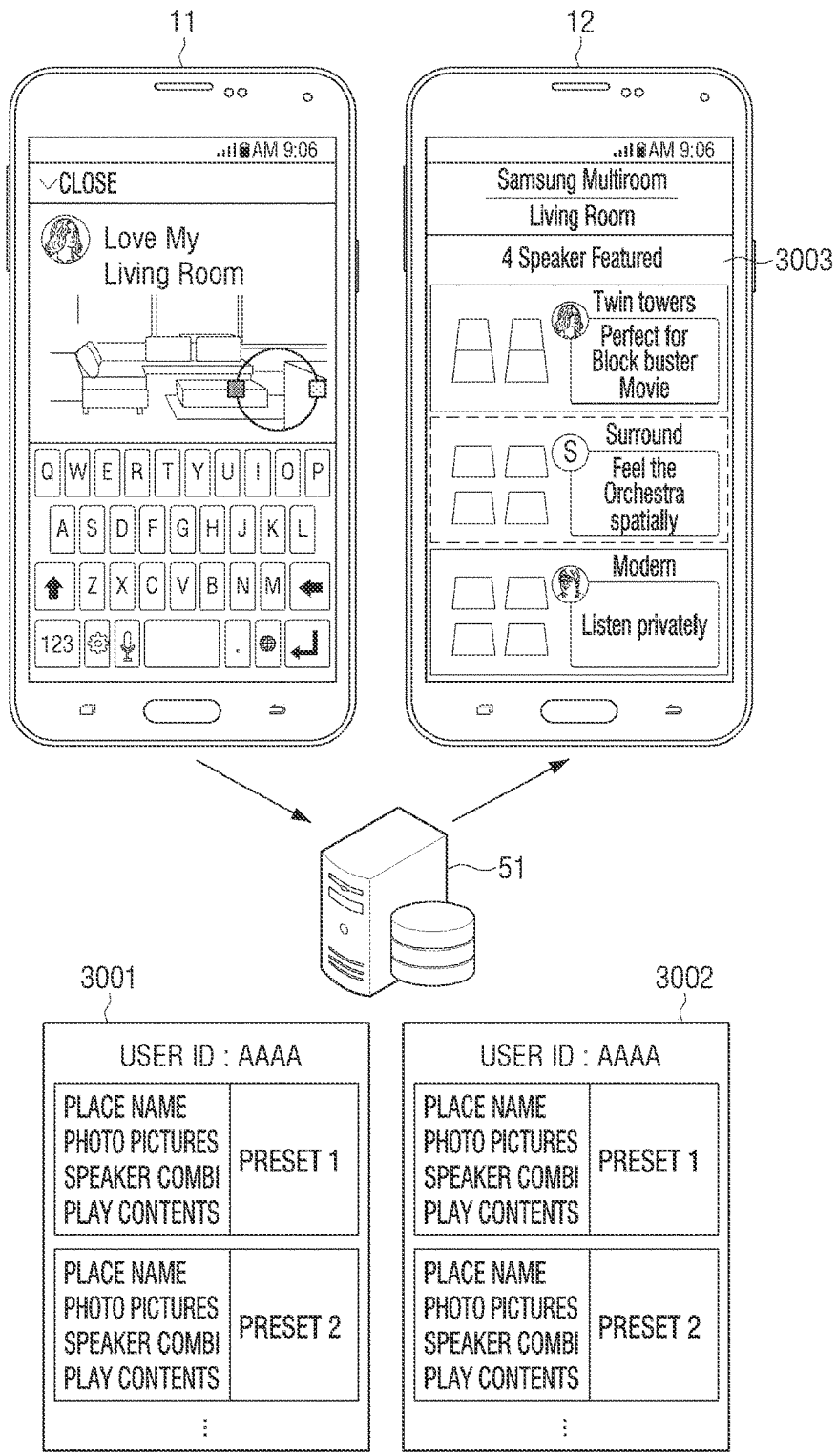
FIG. 30 is a diagram illustrating a method for sharing the peripheral apparatus setting information stored as preset with a third party according to an embodiment of the present disclosure.

FIG. 30 is a diagram illustrating a method in which the peripheral apparatus setting information stored as preset are shared with a third party according to an embodiment of the present disclosure.

Referring to FIG. 30, the electronic device 11 or the server 51 may share at least one preset 3001, 3002 including the peripheral apparatus setting information with the electronic device 12 of a third party. Herein, the preset may be set by a specific user, or provided from a manufacturer providing the peripheral apparatuses 21~2N, the hub 31, or the controlling device 41. Herein, the preset combining the user setting information and the manufacturer setting information may be provided. The electronic device 12 may display the preset list 3003 including the peripheral apparatus setting information by using the shared preset. The information to respectively explain the preset may be displayed together.

Meanwhile, the peripheral apparatus setting information provided through the preset list 3003 may include a place name where the preset is set, the type/features/genre of the content outputted from the peripheral apparatuses 21~2N when setting the preset, and the arrangement or the number of the peripheral apparatuses. Further, the peripheral apparatus setting information may be continuously updated so as to re-set a part of the peripheral apparatus setting information according to a request of a user initially setting the preset or a manufacturer.

Meanwhile, a user providing the preset or a third party sharing with the preset may register the review regarding the preset (e.g., star points or comments) through the peripheral apparatus setting application or the web page provided from the server 51. In this case, the preset list 3003 may be displayed together with the review of the preset.

A third party sharing with the preset may search a preset to be needed. For example, a third party may search a proper preset by input the identification information of the peripheral apparatuses 21~2N, the place names where the peripheral apparatuses 21~2N are set, the number of the peripheral apparatuses, and the viewing mode. Further, a third party may automatically receive a recommendation regarding a proper preset. For example, when a third party initially connects the peripheral apparatuses 21~2N, moves the place where the peripheral apparatuses are connected, implements the specific content using the peripheral apparatuses 21~2N, connects the peripheral apparatuses 21~2N at specific time or specific weather, adds or deletes the number of the peripheral apparatuses 21~2N, or modifies the positions of the peripheral apparatuses 21~2N to each other, a third party may automatically receive a recommendation regarding a proper preset for the current using of the peripheral apparatuses 21~2N.

Regarding the above, when a third party requests the setting of the peripheral apparatuses 21~2N according to the searched preset or the recommended preset, the output values of the peripheral apparatuses 21~2N may be automatically modified into the peripheral apparatus setting values included in the preset requested by a user.

Thereby, when the peripheral apparatuses are needed to be set so as to be proper for specific content or specific place, a user can quickly and easily set the peripheral apparatuses by using the peripheral apparatus setting information provided by another user or a manufacturer.

Figure 31A:
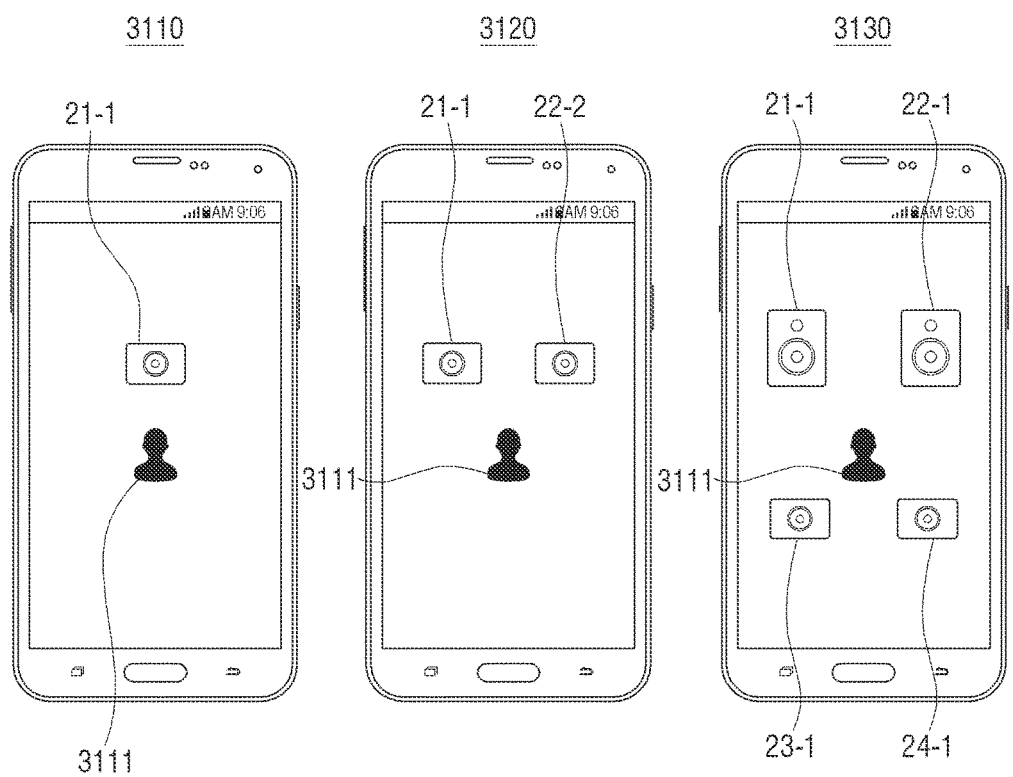
FIGS. 31A, 31B, and 31C are diagrams illustrating representative information of the peripheral apparatuses displayed on a peripheral apparatus setting screen according to various embodiments of the present disclosure.
Figure 31B:
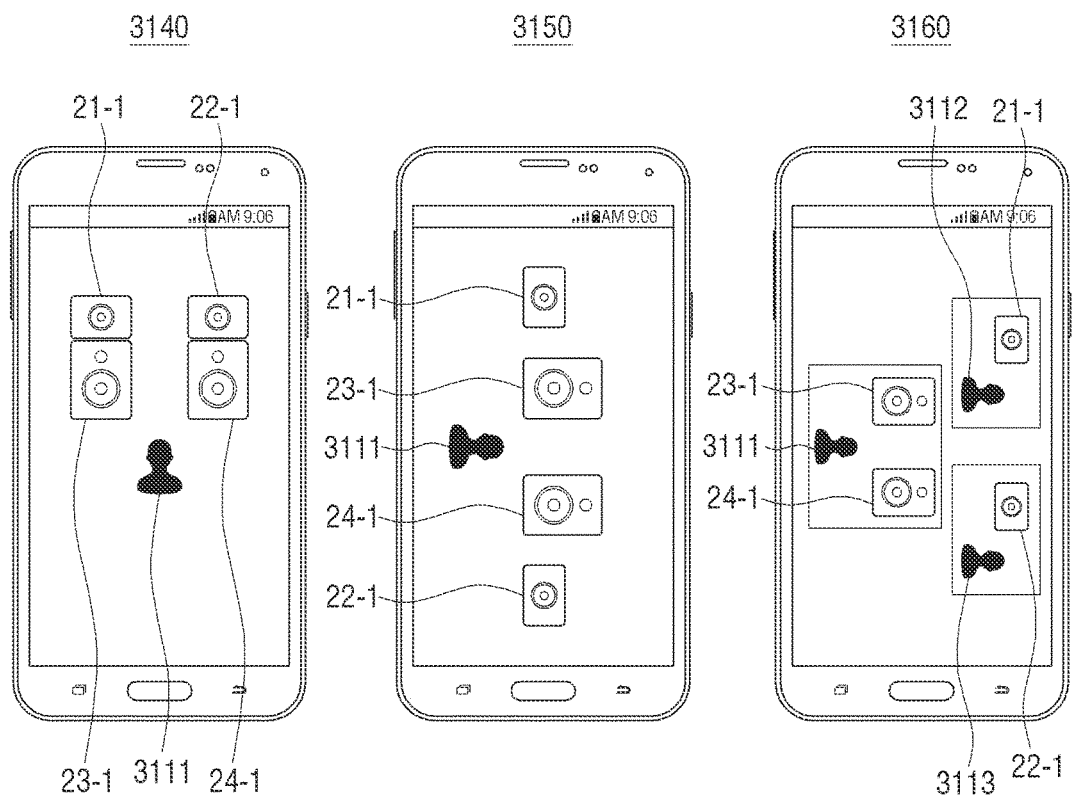
Figure 31C:
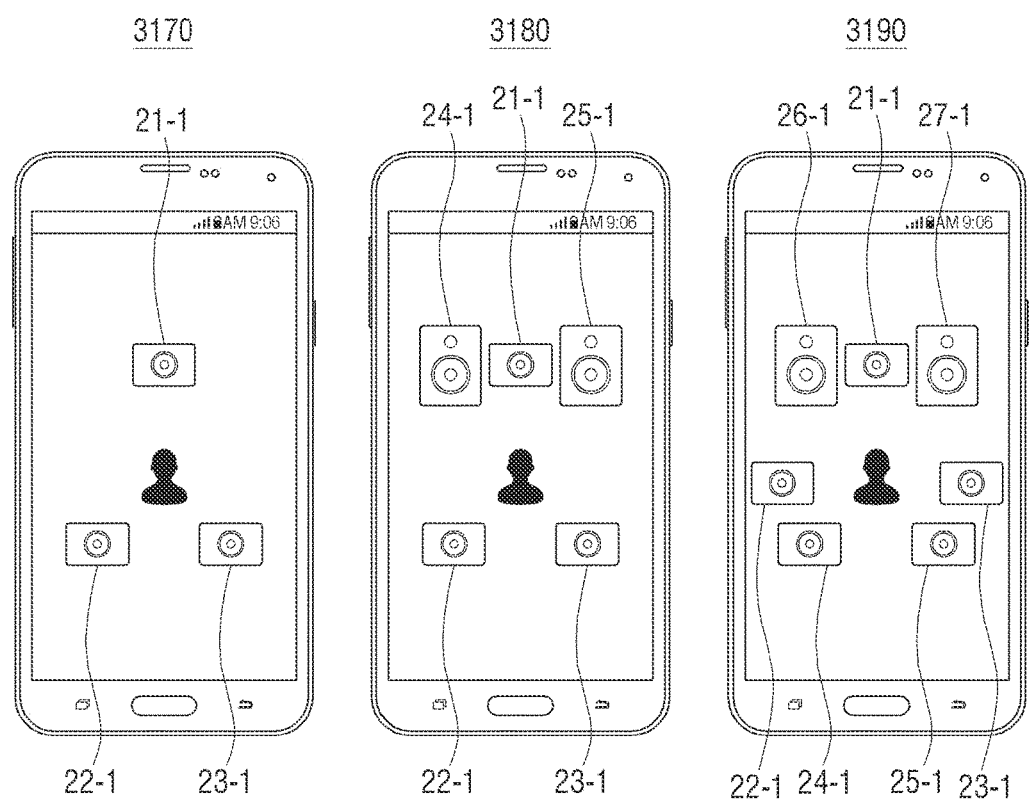

FIGS. 31A to 31C are diagrams illustrating the representative information of the peripheral apparatuses displayed on the peripheral apparatus setting screen according to various embodiments of the present disclosure.

Referring to FIGS. 31A to 31C, the controller 190 may map the emitting colors to be emitted by the emitters of the peripheral apparatuses 21~2N, and control the display 130 to display the representative information 21-1~2N-1 of the peripheral apparatuses 21~2N as a result of the mapping.

Further, while the representative information 21-1~2N-1 of the peripheral apparatuses 21~2N are displayed on the peripheral apparatus setting screen, the controller 190 may control the display 130 to display the representative information 21-1~2N-1 of the peripheral apparatuses 21~2N moved in response to the user input (e.g., touch drag) in FIGS. 31A to 31C.

Referring to 3110 of FIG. 31A, the peripheral apparatus setting screen may display the representative information 3111 representing a user and the representative information 21-1 representing the peripheral apparatus. When the peripheral apparatus 21 is speaker, the mode applied with the peripheral apparatus setting may be portable mode with a single channel using a single speaker.

For another example, referring to 3120 of FIG. 31A, the peripheral apparatus setting screen may display the representative information 3111 representing a user and the representative information 21-1, 22-1 representing the peripheral apparatuses. When the peripheral apparatuses 21, 22 are speakers, the mode applied with the peripheral apparatus setting may be stereo mode using the two speakers.

For another example, referring to 3130 of FIG. 31A, the peripheral apparatus setting screen may display the representative information 3111 representing a user and the representative information 21-1~24-1 representing the peripheral apparatuses. When the peripheral apparatuses 21~24 are speakers, the mode applied with the peripheral apparatus setting may be surround mode using the four speakers.

For another example, referring to 3140 of FIG. 31B, the peripheral apparatus setting screen may display the representative information 3111 representing a user and the representative information 21-1~24-1 representing the peripheral apparatuses. When the peripheral apparatuses 21~24 are speakers, the mode applied with the peripheral apparatus setting may be stack mode in which the four speakers are grouped into the two groups.

For another example, referring to 3150 of FIG. 31B, the peripheral apparatus setting screen may display the representative information 3111 representing a user and the representative information 21-1~24-1 representing the peripheral apparatuses. When the peripheral apparatuses 21~24 are speakers, the mode applied with the peripheral apparatus setting may be Front 4$ch$ mode in which the four speakers are placed on the front of a user. Herein, the peripheral apparatus setting screen may display the representative information 3111 representing a user and the representative information 21-1~24-1 representing the peripheral apparatuses based on the horizontal mode.

For another example, referring to 3160 of FIG. 31B, the peripheral apparatus setting screen may display the representative information 3111, 3112, 3113 representing a plurality of users and the representative information 21-1~24-1 representing the peripheral apparatuses. When the peripheral apparatuses 21~24 are speakers, the mode applied with the peripheral apparatus setting may be multi room mode in which the sounds of the speakers are outputted respectively toward a plurality of users.

In this case, the stereo mode using the two speakers may be respectively provided toward a plurality of users. Thereby, when the number of the speakers is limited, the multi room mode may provide virtual room so that a plurality of users can respectively listen on the different positions to each other.

For another example, referring to 3170 of FIG. 31C, the peripheral apparatus setting screen may display the representative information 3111 representing a user and the representative information 21-1~23-1 representing the peripheral apparatuses. When the peripheral apparatuses 21~23 are speakers, the mode applied with the peripheral apparatus setting may be 3.1 ch mode in which the three speakers are dimensionally arranged based on a user.

For another example, referring to 3180 of FIG. 31C, the peripheral apparatus setting screen may display the representative information 3111 representing a user and the representative information 21-1~25-1 representing the peripheral apparatuses. When the peripheral apparatuses 21~25 are speakers, the mode applied with the peripheral apparatus setting may be 5.1ch mode in which the five speakers are dimensionally arranged based on a user.

For another example, referring to 3190 of FIG. 31C, the peripheral apparatus setting screen may display the representative information 3111 representing a user and the representative information 21-1~27-1 representing the peripheral apparatuses. When the peripheral apparatuses 21~26 are speakers, the mode applied with the peripheral apparatus setting may be 7.1 ch mode in which the seven speakers are dimensionally arranged based on a user.

Besides, some speakers may be added or removed and the combination of the speakers may be modified on the peripheral apparatus setting screen of FIGS. 31A to 31C.

According to the above embodiments of the present disclosure, a user can intuitively modify the setting between the peripheral apparatuses and confirm the modifying result.

FIGS. 32 to 37 are diagrams illustrating various examples in which the system 10 is configured according to various embodiments of the present disclosure.

Figure 32:
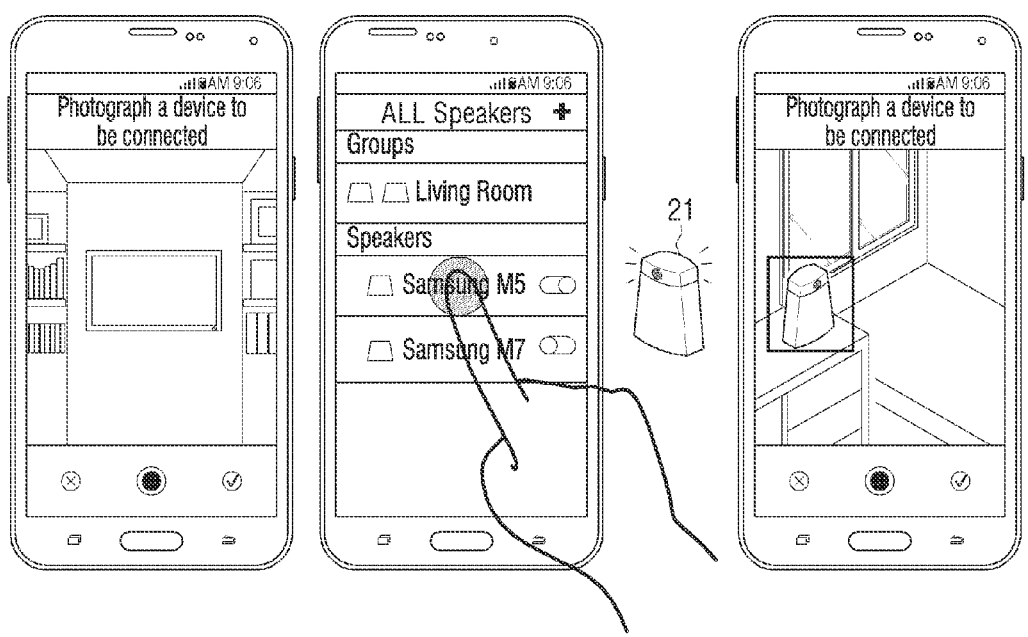

Referring to FIG. 32, the system 10 may include the smart phone as electronic device 11, the digital TV as controlling device 41, and the speaker as peripheral apparatus 21.

In this case, example 3210 of FIG. 32 illustrates that the camera of the smart phone photographs the emitter of the digital TV in order to connect the smart phone and the digital TV.

The process 3220 of FIG. 32 shows when the representative information of the speaker is selected on the peripheral apparatus setting screen displayed on the smart phone in order to receive the feedback from the speaker connected to the smart phone.

The process 3230 of FIG. 32 shows when the camera of the smart phone photographs the emitter of the speaker in order to connect the smart phone and the peripheral apparatus.

Figure 33:
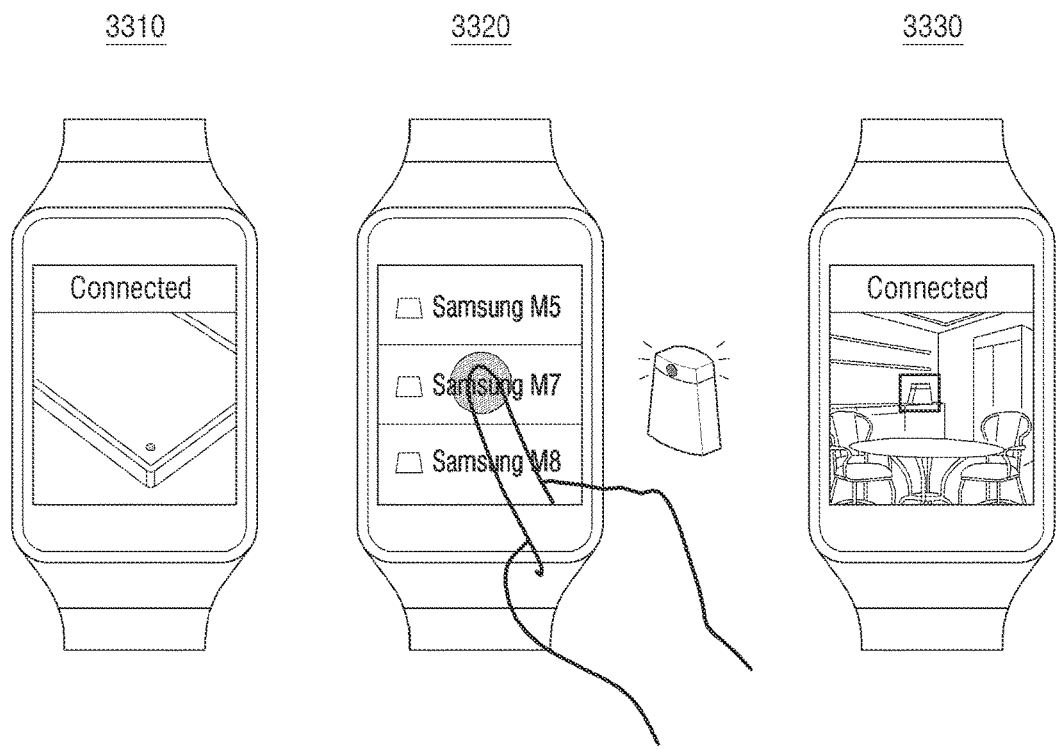

According to an embodiment of the present disclosure, referring to FIG. 33, the system 10 may include the wearable watch device as electronic device 11, the laptop PC as controlling device 41, and the speaker as peripheral apparatus 21.

In this case, 3310 of FIG. 33 illustrates a process in which the wearable watch device and the laptop PC are connected to each other by photographing the emitter of the laptop PC with the camera of the wearable watch device.

Further, the process 3320 of FIG. 33 shows when the representative information of the speaker is selected on the peripheral apparatus setting screen displayed on the wearable watch device in order to receive the feedback from the speaker connected to the wearable watch device.

Further, the process 3330 of FIG. 33 shows when the wearable watch device and the speaker are connected to each other by photographing the emitter of the speaker with the camera of the wearable watch device.

According to an embodiment of the present disclosure, referring to FIG. 34, the system 10 may include the wearable glass device as electronic device 11, the digital TV as controlling device 41, and the speaker as peripheral apparatus 21.

In this case, the process 3410 of FIG. 34 shows when the wearable glass device and the digital TV are connected to each other by photographing the emitter of the digital TV with the camera of the wearable glass device.

Further, the process 3420 of FIG. 34 shows when the identification information of the speaker is displayed on the wearable glass device when the speaker is viewed through the wearable glass device in order to receive the feedback from the speaker connected to the wearable glass device.

Further, the process 3430 of FIG. 34 shows when the wearable glass device and the speaker are connected to each other by photographing the emitter of the speaker with the camera of the wearable glass device.

Figure 35A:
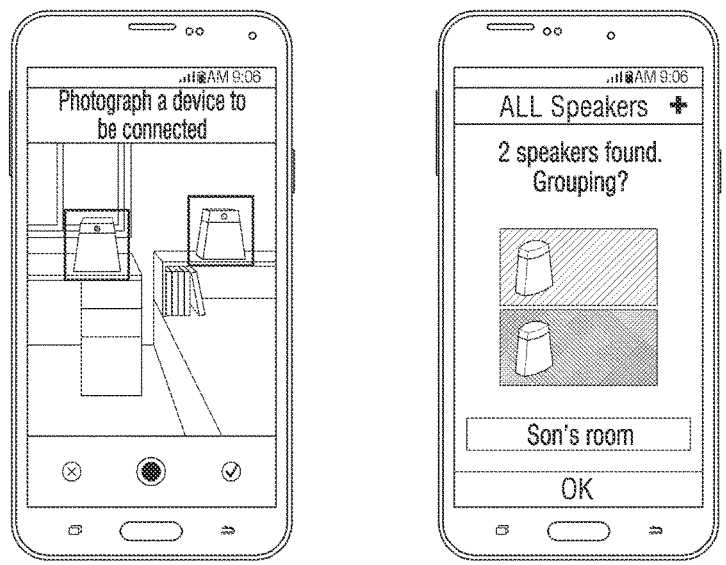
Figure 35B:
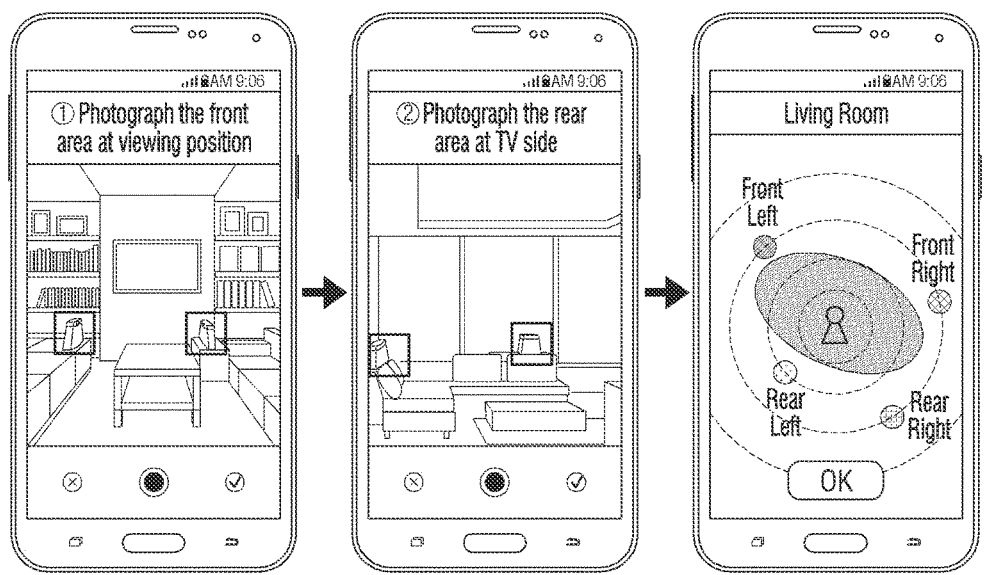

According to an embodiment of the present disclosure, referring to FIGS. 35A to 35B, the system 10 may include the smart phone as electronic device 11, the digital TV as controlling device 41, and the plurality of speakers as peripheral apparatuses 21~2N.

In this case, process 3510 of FIG. 35A shows when the emitters of the speakers are photographed by using the camera of the smart phone in order to connect the smart phone and the speakers.

Further, process 3520 of FIG. 35A shows when the perceived speakers are grouped to be one group.

Further, processes 3530 and 3540 of FIG. 35B show when the emitters of the speakers are photographed from the different directions to each other by using the camera of the smart phone in order to connect the smart phone and the speaker.

Further, process 3550 of FIG. 35B shows when the representative information representing the perceived speakers are displayed.

According to an embodiment of the present disclosure, referring to FIG. 36A, the system 10 may include the wearable watch device as electronic device 11 and the plurality of speakers as peripheral apparatuses 21~2N.

In this case, process 3610 of FIG. 36A shows when the wearable watch device and the speakers are connected to each other by photographing the emitters of the speakers with the camera of the wearable watch device.

Further, process 3620 of FIG. 36A shows when the list of the perceived speakers is displayed through the display of the wearable watch device.

Further, processes 3630 and 3640 of FIG. 36B show when the wearable watch device and the speakers are perceived by photographing the emitters of the speakers with the camera of the wearable watch device.

Further, process 3650 of FIG. 36B shows when the representative information representing the perceived speakers are displayed through the display of the wearable watch device.

According to an embodiment of the present disclosure, referring to FIG. 37, the system 10 may include the wearable glass device as electronic device 11 and the plurality of speakers as peripheral apparatuses 21~2N.

In this case, process 3710 of FIG. 37 shows when the perceived speakers are grouped when the plurality of speakers are perceived by photographing the emitters of the speakers with the camera of the wearable glass device.

Further, process 3720 of FIG. 37 shows when the positions of the speakers are displayed on the peripheral apparatus setting screen through the display of the wearable glass device.

FIGS. 38A to 38D are diagrams illustrating various examples of applying manual presetting according to various embodiments of the present disclosure.

For example, processes 3810 and 3820 of FIG. 38A show when the preset list that can be selected by a user is displayed when a user logs onto the server 51. Herein, the preset included in the preset list may respectively include the peripheral apparatus setting information such as dimension information, content information, arrangement information of the peripheral apparatuses (e.g., the number of the peripheral apparatuses, positions of the peripheral apparatuses and combination of the peripheral apparatuses).

Figure 38B:
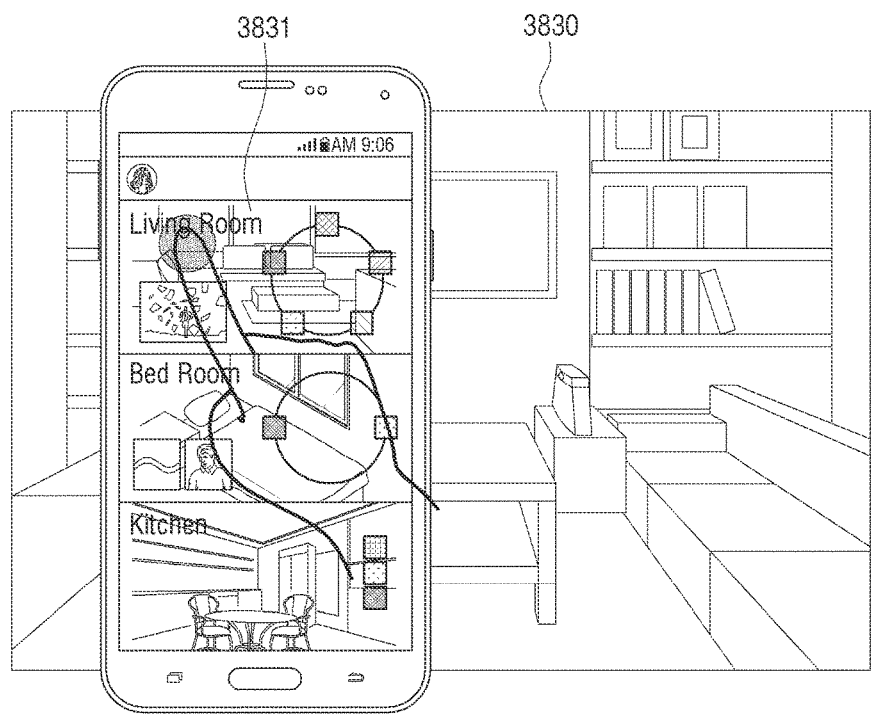

In this case, process 3830 of FIG. 38B shows when the peripheral apparatuses 21~2N near to the electronic device 11 are set by using the peripheral apparatus setting values related with the dimension information among the peripheral apparatus setting values included in the selected preset when a user selects UI element 3831 related with the dimension information included in one preset on the preset list.

Figure 38C:
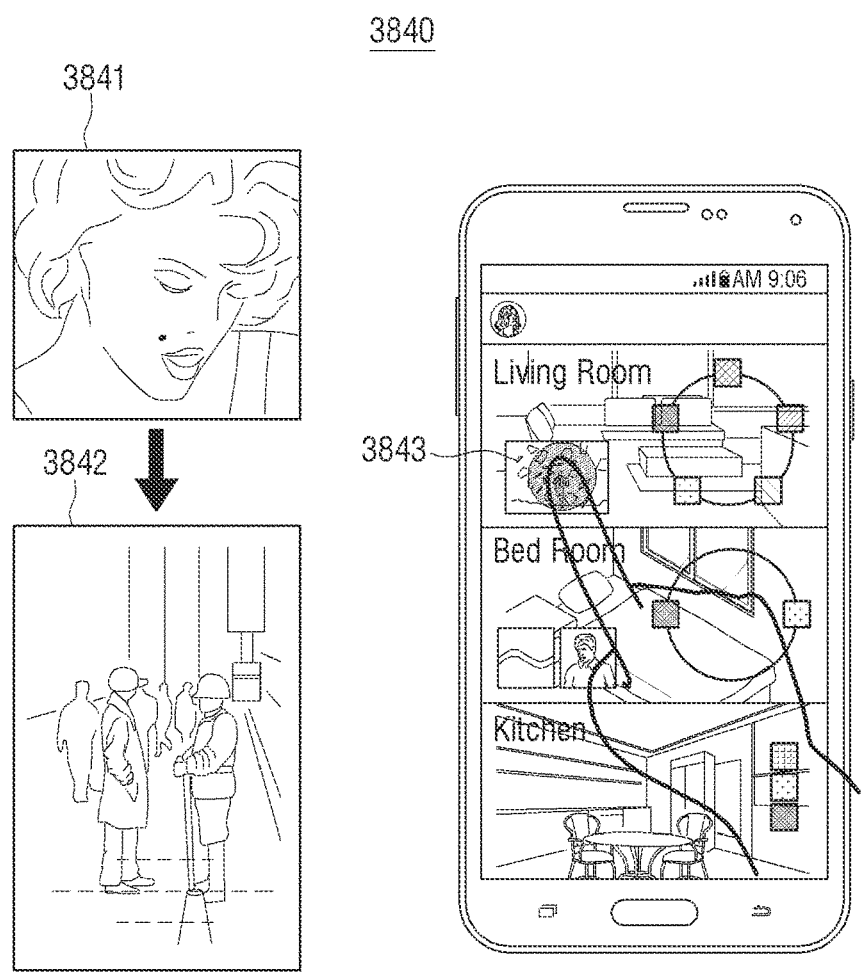

According to an embodiment of the present disclosure, process 3840 of FIG. 38C shows when the peripheral apparatuses 21~2N near to the electronic device 11 are set by using the peripheral apparatus setting values related with the second content information 3842 among the peripheral apparatus setting values included in the selected preset in response to selecting of UI element 3843 related with the second content information 3842 included in one preset on the preset list, when the second content 3842 is played after the first content 3841 is played.

Figure 38D:
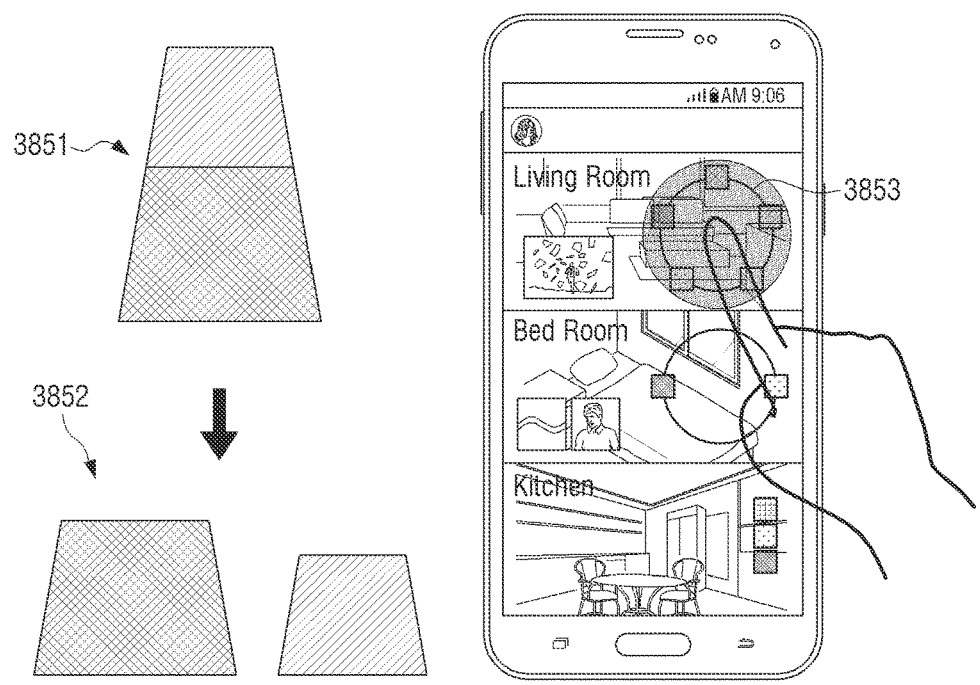

According to an embodiment of the present disclosure, process 3850 of FIG. 38D shows when the peripheral apparatuses 21~2N near to the electronic device 11 are set by using the peripheral apparatus setting values related with the second arrangement 3852 information among the peripheral apparatus setting values included in the selected preset in response to selecting of UI element 3853 related with the second arrangement 3852 included in one preset on the preset list, when the peripheral apparatuses 21~2N are modified from the first arrangement form 3851 into the second arrangement form 3852.

FIGS. 39A to 39D are diagrams illustrating various examples of applying automatic presetting according to various embodiments of the present disclosure.

Figure 39A:
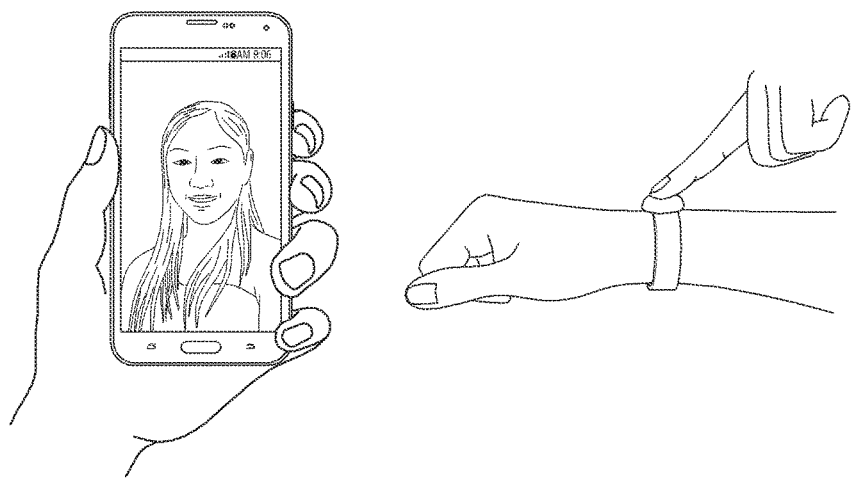

Referring to the embodiment of the present disclosure shown in FIG. 39A, process 3910 shows when a preset proper for a user is recommended when a user logs onto the server 51, and the peripheral apparatuses 21~2N near to the electronic device 11 are set by using the peripheral apparatus setting values included in the recommended preset.

According to an embodiment of the present disclosure, process 3920 of FIG. 39A shows when a user is perceived by acquiring the body information of a user (e.g., fingerprints or the blood pressure), a preset proper for a user is recommended, the peripheral apparatuses 21~2N near to the electronic device 11 are set by using the peripheral apparatus setting values included in the recommended preset.

According to an embodiment of the present disclosure, processes 3930 and 3940 of FIG. 39B show when the moving is sensed when a user moves to another place, and a preset proper for the new place is recommended on the preset list.

According to an embodiment of the present disclosure, processes 3950 and 3960 of FIG. 39C show when the type, the genre or the mood of the specific content is sensed when a user plays specific content, and a preset proper for the specific content is recommended on the preset list.

According to an embodiment of the present disclosure, processes 3970 and 3980 of FIG. 39D show when a preset proper for the modified arrangement form of the peripheral apparatuses 21~2N is recommended on the preset list when a user modifies the arrangement form of the peripheral apparatuses 21~2N.

Figure 40:
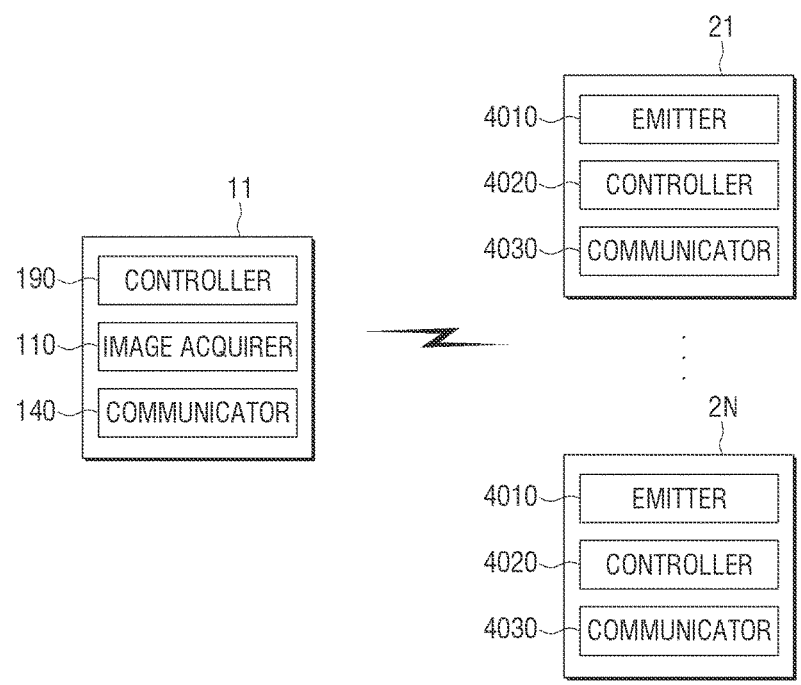
FIG. 40 is a brief block diagram of a system according to an embodiment of the present disclosure.

FIG. 40 is a brief block diagram of the system 10 according to an embodiment of the present disclosure.

Referring to FIG. 40, the system 10 may include the electronic device 11 and the peripheral apparatuses 21~2N placed near to the electronic device 11. The electronic device 11 and the peripheral apparatuses 21~2N may be connected to each other through various communication methods. For example, communication may be performed between the devices by using a wireless communication module such as Bluetooth or Wi-Fi.

The electronic device 11 may include the image acquirer 110, the controller 190 and the communicator 140. An embodiment of the present disclosure regarding the constitution of the image acquirer 110, the controller 190 and the communicator 140 is already described above, which will not be further explained below.

The peripheral apparatuses 21~2N may include the emitter 4010, the controller 4020, and the communicator 4030. The emitter 4010 may be a module to emit the light, and may be LED having the various color types, but not limited to the above. Accordingly, the display devices that can emit the light may be one example of the emitter 4010. The communicator 4030 may be configured to perform the communication with the electronic device 11, the hub 31 or the controlling device 41 according to the various types of the communication method.

The communicator 4030 may include at least one among Wi-Fi chip, Bluetooth chip, the wireless communication chip and NFC chip. However, it may not be limited to the above, other various communication modules may be included. The controller 4020 may control general operation of the peripheral apparatus 21 by using the various programs stored in the peripheral apparatus 21. For example, the controller 4020 may control the communicator 4030 to acquire the adjustment values of the output data from the electronic device 11, and adjust the output data outputted from the peripheral apparatus 21 by using the adjustment values of the output data acquired from the communicator 4030. For example, the output time of the output data and the volume size of the output sounds may be adjusted.

Further, the peripheral apparatuses 21~2N may include the display (not illustrated). The displays of the peripheral apparatuses 21~2N may display the operating state of the peripheral apparatuses 21~2N or the connecting state with the electronic device 11. For example, when the electronic device 11 is connected to the peripheral apparatuses 21~2N, the displays of the peripheral apparatuses 21~2N may display the notice information indicating that the connecting to the electronic device 11 is performed.

According to an embodiment of the present disclosure, the image acquirer 110 of the electronic device 11 may acquire the image data regarding the emitter 4010 of the peripheral apparatus 21. Further, the controller 190 of the electronic device 11 may acquire the identification information of the peripheral apparatus 21 mapped with the emitting color emitted from the emitter 4010 based on the image data acquired from the image acquirer 110.

Figure 41:
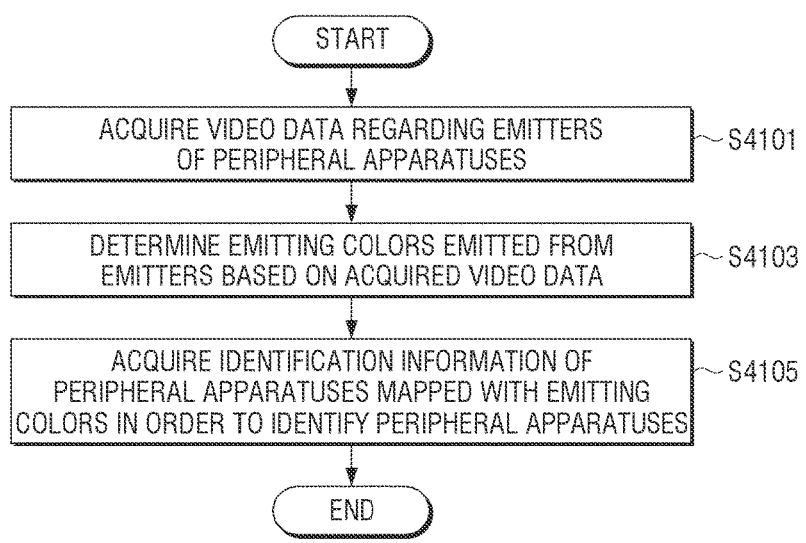
FIGS. 41 and 42 are flowcharts provided to explain a method for controlling a portable terminal according to various embodiments of the present disclosure.
Figure 42:
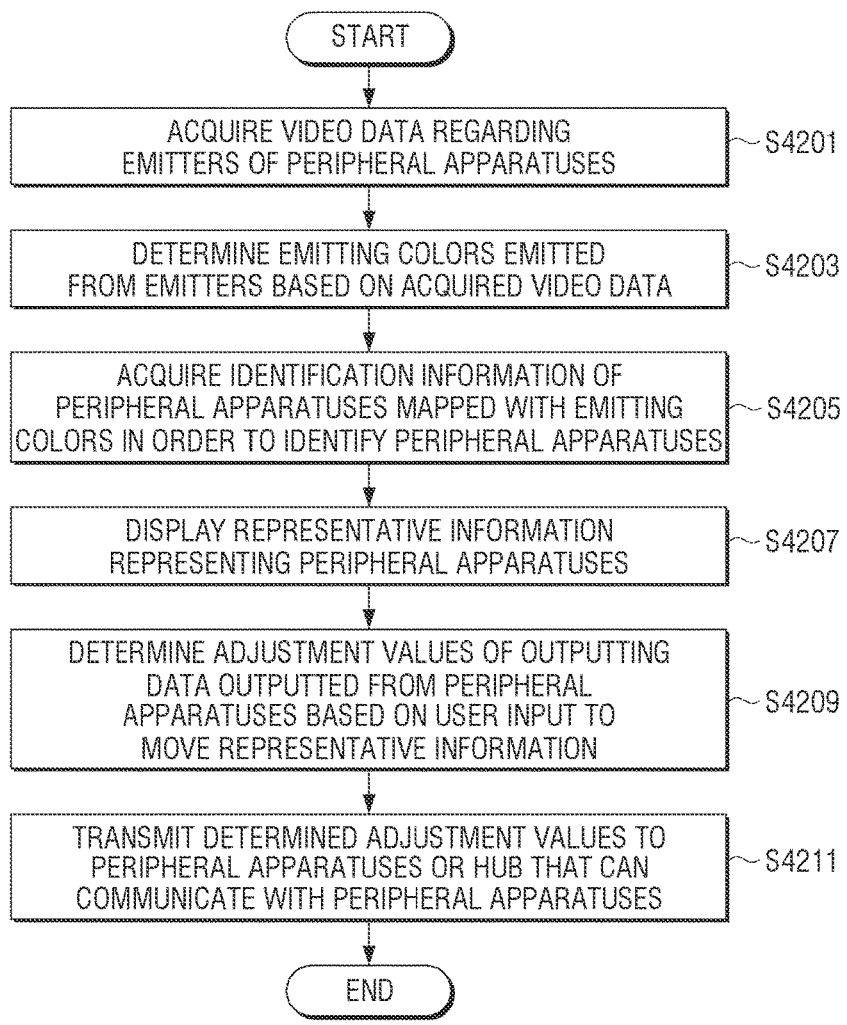

FIGS. 41 and 42 are flowcharts provided to explain a method for controlling the portable device according to various embodiments of the present disclosure.

Referring to FIG. 41, the electronic device 11 may acquire the image data regarding the emitter of the peripheral apparatus 21 at operation S4101. At operation S4103, the electronic device 11 may determine the emitting color emitted from the emitter of the peripheral apparatus 21 based on the acquired image data. At operation S4105, the electronic device 11 may acquire the identification information of the peripheral apparatus 21 mapped with the emitting color in order to identify the peripheral apparatus 21.

According to an embodiment of the present disclosure, referring to FIG. 42, the electronic device 11 may acquire the image data regarding the emitter of the peripheral apparatus 21 at operation S4201. For example, the electronic device 11 may acquire the image data regarding the emitter of the peripheral apparatus 21 in response to the user input to photograph the emitter of the peripheral apparatus 21.

At operation S4203, the electronic device 11 may determine the emitting color emitted from the emitter of the peripheral apparatus 21 based on the acquired image data. At operation S4205, the electronic device 11 may acquire the identification information of the peripheral apparatus 21 mapped with the emitting color in order to identify the peripheral apparatus 21. Specifically, when there are the plurality of peripheral apparatuses 21~2N, the electronic device 11 may acquire the identification information of the peripheral apparatus mapped with the determined emitting color among the plurality of peripheral apparatuses 21~2N while the different emitting colors are respectively mapped with the plurality of peripheral apparatuses 21~2N.

At operation S4207, the electronic device 11 may display the representative information representing the peripheral apparatus 21 (e.g., image of the peripheral apparatus 21). At operation S4209, the electronic device 11 may determine the adjustment values of the output data outputted from the peripheral apparatus based on the user input to move the representative information. At operation S4211, the electronic device 11 may transmit the determined adjustment values to the peripheral apparatus 21 or the hub 31 that can communicate with the peripheral apparatus 21.

The method for identifying the peripheral apparatuses according to various embodiments of the present disclosure described above may be implemented to be programs and provided on the electronic device 11. Specifically, a non-transitory computer readable recording medium storing the program including the method for identifying the peripheral apparatuses may be provided.

The non-transitory computer readable recording medium refers to a medium which stores data semi-permanently and can be read by devices, rather than a medium which stores data temporarily, such as register, cache, or memory. Specifically, the above various applications or programs may be stored and provided in non-transitory computer readable recording medium such as compact disc (CD), digital versatile disc (DVD), hard disk, Blu-ray disc, universal serial bus (USB), memory card, or ROM.

Further, the programs described above may be stored and provided in the storage 150 of the electronic device 11 as one example of non-transitory computer readable recording medium.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed at an electronic device for identifying peripheral apparatuses, the method comprising:
    obtaining image data regarding emitters of the peripheral apparatuses;

identifying colors of lights emitted from the emitters based on the obtained image data;

identifying the peripheral apparatuses based on identification information of the peripheral apparatuses mapped with the identified colors; and obtaining an adjustment value of output data outputted from at least one of the identified peripheral apparatuses based on a user input on representative information which is corresponding to the at least one of the identified peripheral apparatuses.

2. The method of claim 1, wherein the obtaining of the image data comprises:

obtaining the image data regarding the emitters of the peripheral apparatuses in response to a user input to photograph the emitters of the peripheral apparatuses.

3. The method of claim 1, wherein the identifying the peripheral apparatuses comprises:

obtaining the identification information of the peripheral apparatuses mapped with the identified colors among the peripheral apparatuses in a state in which different colors are mapped respectively regarding the peripheral apparatuses.

4. The method of claim 1, wherein the identifying of the colors comprises determining blinking patterns of lights emitted from the emitters based on the obtained image data, and wherein the identifying the peripheral apparatuses comprises obtaining the identification information of the peripheral apparatuses mapped with the colors and with the blinking patterns.

5. The method of claim 1, further comprising:

transmitting the obtained adjustment value to at least one of the peripheral apparatuses, a hub that can communicate with the peripheral apparatuses, and a server which shares the obtained adjustment value with a third party.

6. The method of claim 1, further comprising:

displaying the representative information representing at least one of the peripheral apparatuses, wherein the obtaining the adjustment value comprises obtaining the adjustment value of output data outputted from at least one of the peripheral apparatuses based on the user input to move the representative information.

7. The method of claim 1, wherein the obtaining of the adjustment value comprises obtaining an adjustment value of output data outputted from at least one of the peripheral apparatuses by considering positions of the emitters in the peripheral apparatuses included within the image data.

8. The method of claim 1, prior to the obtaining of the image data, further comprising:

transmitting information regarding at least one from among the colors and blinking patterns to be mapped with the peripheral apparatuses to the peripheral apparatuses or a hub connected to the peripheral apparatuses.

9. The method of claim 1, further comprising:

displaying the representative information representing at least one of the peripheral apparatuses; and transmitting a signal to control the emitters of the peripheral apparatuses to the peripheral apparatuses or to a hub that can communicate with the peripheral apparatuses in response to a user input to select the representative information.

10. The method of claim 1, further comprising:

displaying notice information indicating that the peripheral apparatuses are perceived.

11. The method of claim 5, wherein the adjustment value adjusts at least one of a volume size or a delay time regarding output data outputted from the peripheral apparatuses.

12. The method of claim 1, wherein the identification information of the peripheral apparatuses is at least one among an image, a model name, and an original ID regarding the peripheral apparatuses.

13. An electronic device for identifying peripheral apparatuses, the electronic device comprising:

an image acquirer configured to obtain image data regarding emitters of the peripheral apparatuses; and at least one processor configured to:

identify peripheral apparatuses based on identification information of the peripheral apparatuses mapped with colors of lights emitted from the emitters based on the image data obtained from the image acquirer, and obtain an adjustment value of output data outputted from at least one of the identified peripheral apparatuses based on a user input on representative information which is corresponding to the at least one of the identified peripheral apparatuses.

14. The electronic device of claim 13, wherein the image acquirer is configured to obtain the image data regarding the emitters of the peripheral apparatuses in response to a user input to photograph the emitters of the peripheral apparatuses.

15. The electronic device of claim 13, wherein the at least one processor is further configured to obtain the identification information of the peripheral apparatuses mapped with the colors among the peripheral apparatuses in a state in which different colors are mapped respectively regarding the peripheral apparatuses.

16. The electronic device of claim 13, wherein the at least one processor is further configured to obtain the identification information of the peripheral apparatuses mapped with the colors and with blinking patterns of lights emitted from the emitters based on the obtained image data.

17. The electronic device of claim 13, wherein the electronic device further comprises:

a communicator configured to transmit the obtained adjustment value to at least one of the peripheral apparatuses, a hub that can communicate with the peripheral apparatuses, and a server which shares the obtained adjustment value with a third party.

18. The electronic device of claim 13, further comprising:

a display configured to display the representative information representing at least one of the peripheral apparatuses, wherein the at least one processor is further configured to obtain the adjustment value of output data outputted from at least one of the peripheral apparatuses based on a user input to move the representative information on the display.

19. The electronic device of claim 13, wherein the at least one processor is further configured to obtain an adjustment value of output data outputted from the peripheral apparatuses by considering positions of the emitters in the peripheral apparatuses included within the image data.

20. The electronic device of claim 13, further comprising:

a communicator configured to transmit information regarding at least one of the colors and blinking patterns to be mapped with the peripheral apparatuses to the peripheral apparatuses or a hub connected to the peripheral apparatuses before obtaining the image data.

21. The electronic device of claim 13, further comprising:
a display configured to display the representative information representing at least one of the peripheral apparatuses; and
a communicator configured to transmit a signal to control the emitters of the peripheral apparatuses to the peripheral apparatuses or to a hub that can communicate with the peripheral apparatuses in response to a user input to select the representative information.

22. The electronic device of claim 13, further comprising:
a display configured to display notice information indicating that the peripheral apparatuses are perceived.

23. The electronic device of claim 17, wherein the adjustment value adjusts at least one of a volume size or a delay time regarding the output data outputted from the peripheral apparatuses.

24. The electronic device of claim 13, wherein the identification information of the peripheral apparatuses is at least one among an image, a model name and an original identification (ID) regarding the peripheral apparatuses.

* * * * *